(12) United States Patent
Haag et al.

(10) Patent No.: US 12,429,643 B2
(45) Date of Patent: *Sep. 30, 2025

(54) HIGH CONTRAST OPTICAL FILM AND DEVICES INCLUDING THE SAME

(71) Applicant: 3M INNOVATIVE PROPERTIES COMPANY, St. Paul, MN (US)

(72) Inventors: Adam D. Haag, Woodbury, MN (US); Timothy J. Nevitt, Red Wing, MN (US); Carl A. Stover, St. Paul, MN (US); Andrew J. Ouderkirk, Kirkland, WA (US); Robert D. Taylor, Stacy, MN (US); Zhaohui Yang, North Oaks, MN (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 18/511,500

(22) Filed: Nov. 16, 2023

(65) Prior Publication Data

US 2024/0085608 A1 Mar. 14, 2024

Related U.S. Application Data

(60) Continuation of application No. 17/448,540, filed on Sep. 23, 2021, now Pat. No. 11,846,792, which is a
(Continued)

(51) Int. Cl.
*G02B 5/30* (2006.01)
*G02B 5/08* (2006.01)
(Continued)

(52) U.S. Cl.
CPC ......... *G02B 5/3041* (2013.01); *G02B 5/0825* (2013.01); *G02B 5/1814* (2013.01);
(Continued)

(58) Field of Classification Search
CPC ........ G02B 5/30; G02B 5/305; G02B 5/3025; G02B 5/3033; G02B 5/3083;
(Continued)

(56) References Cited

U.S. PATENT DOCUMENTS

| 5,882,774 A | 3/1999 | Jonza et al. |
| 6,025,897 A | 2/2000 | Weber et al. |

(Continued)

FOREIGN PATENT DOCUMENTS

| CN | 101300517 A | 11/2008 |
| CN | 101410738 A | 4/2009 |

(Continued)

OTHER PUBLICATIONS

International Search Report for PCT International Application No. PCT/IB2018/051186, mailed on May 18, 2018, 7 pages.

(Continued)

*Primary Examiner* — Jie Lei
(74) *Attorney, Agent, or Firm* — Clifton F. Richardson

(57) ABSTRACT

Optical films are disclosed that include a plurality of interference layers. Each interference layer reflects or transmits light primarily by optical interference. The total number of the interference layers is less than about 1000. For a substantially normally incident light in a predetermined wavelength range, the plurality of interference layers has an average optical transmittance greater than about 85% for a first polarization state, an average optical reflectance greater than about 80% for an orthogonal second polarization state, and an average optical transmittance less than about 0.2% for the second polarization state.

14 Claims, 10 Drawing Sheets

Related U.S. Application Data continuation of application No. 16/789,539, filed on Feb. 13, 2020, now Pat. No. 11,156,757, which is a division of application No. 16/487,109, filed as application No. PCT/IB2018/051186 on Feb. 26, 2018, now Pat. No. 11,493,677.

(60) Provisional application No. 62/467,712, filed on Mar. 6, 2017.

(51) Int. Cl.
 *G02B 5/18* (2006.01)
 *G02B 5/28* (2006.01)
 *G02B 27/10* (2006.01)
 *G02B 27/28* (2006.01)
 *G02F 1/1335* (2006.01)

(52) U.S. Cl.
 CPC .............. *G02B 5/285* (2013.01); *G02B 5/305* (2013.01); *G02B 5/3083* (2013.01); *G02B 27/10* (2013.01); *G02B 27/28* (2013.01); *G02F 1/133536* (2013.01)

(58) Field of Classification Search
 CPC ........ G02B 5/3041; G02B 5/208; G02B 1/04; G02B 5/285; G02B 5/1814; G02B 5/0825; G02B 27/10; G02B 27/28; G02F 1/1335; G02F 1/133536; G02F 1/1336; G02F 2201/086; B32B 27/08; B32B 27/36
 USPC ............ 359/485.01, 485.03, 488.01, 488.11, 359/488.12; 349/67, 96, 117; 428/1.1, 428/1.3, 1.33

See application file for complete search history.

(56) References Cited

U.S. PATENT DOCUMENTS

| | | | |
|---|---|---|---|
| 6,072,629 | A | 6/2000 | Fan et al. |
| 6,096,375 | A | 8/2000 | Ouderkirk et al. |
| 6,543,153 | B1 | 4/2003 | Weber et al. |
| 6,916,440 | B2 | 7/2005 | Jackson et al. |
| 7,826,009 | B2 | 11/2010 | Weber et al. |
| 8,469,575 | B2 | 6/2013 | Weber et al. |
| 8,703,252 | B2 | 4/2014 | Oya et al. |
| 9,158,155 | B2 | 10/2015 | Weber |
| 9,366,792 | B2 | 6/2016 | Oya et al. |
| 9,405,048 | B2 | 8/2016 | Oya et al. |
| 11,156,757 | B2 | 10/2021 | Haag et al. |
| 11,493,677 | B2 * | 11/2022 | Haag .................. G02B 5/1814 |
| 2002/0113923 | A1 | 8/2002 | Kashima et al. |
| 2002/0180916 | A1 | 12/2002 | Schadt et al. |
| 2003/0028048 | A1 | 2/2003 | Cherkaoui et al. |
| 2004/0066471 | A1 | 4/2004 | Bierhuizen |
| 2005/0072959 | A1 | 4/2005 | Moia et al. |
| 2006/0227421 | A1 | 10/2006 | Stover et al. |
| 2009/0079909 | A1 | 3/2009 | Ouderkirk et al. |
| 2010/0182546 | A1 | 7/2010 | Maezawa |
| 2011/0249332 | A1 | 10/2011 | Merrill et al. |
| 2011/0279997 | A1 | 11/2011 | Weber et al. |
| 2012/0161344 | A1 | 6/2012 | Greener et al. |
| 2012/0206806 | A1 | 8/2012 | Weber |
| 2012/0293742 | A1 | 11/2012 | Banerjee |
| 2013/0063818 | A1 | 3/2013 | Weber et al. |
| 2014/0268346 | A1 | 9/2014 | Weber et al. |
| 2015/0047766 | A1 | 2/2015 | Yura et al. |
| 2015/0124194 | A1 | 5/2015 | Oya et al. |
| 2017/0017117 | A1 | 1/2017 | Shimizu et al. |
| 2017/0068100 | A1 | 3/2017 | Ouderkirk et al. |

FOREIGN PATENT DOCUMENTS

| | | |
|---|---|---|
| CN | 1669066 B | 5/2010 |
| CN | 101516634 B | 2/2011 |
| CN | 102602001 A | 7/2012 |
| CN | 102016659 B | 4/2014 |
| CN | 102282014 B | 1/2015 |
| CN | 102906605 B | 2/2016 |
| EP | 0890866 A2 | 4/2004 |
| EP | 1826592 A2 | 8/2007 |
| EP | 3121627 A1 | 1/2017 |
| JP | H08-286034 A | 11/1996 |
| JP | H11508378 A | 7/1999 |
| JP | 2007298958 A | 11/2007 |
| JP | 2012013919 A | 1/2012 |
| JP | 2012088613 A | 5/2012 |
| JP | 2015169769 A | 9/2015 |
| JP | 2017021321 A | 1/2017 |
| SG | 180318 B | 1/2015 |
| TW | I288860 B | 10/2007 |
| WO | 1997001774 A1 | 1/1997 |
| WO | 9936813 A1 | 7/1999 |
| WO | 2015035030 A1 | 3/2015 |

OTHER PUBLICATIONS

Lim, "New Configuration of Normally Black Transflective ECB LCD with Low Cost", International Symposium Digest of Technical Papers, vol. XL, Books I-III, 2009, pp. 1665-1668.

Yeo, Optical Properties of the Retro-reflective Polarization Film Fabricated by Stacking Anisotropic and Isotropic Materials:, Molecular Crystals and Liquid Crystals, vol. 612, 2015, pp. 238-244.

* cited by examiner

HIGH CONTRAST OPTICAL FILM AND DEVICES INCLUDING THE SAME

TECHNICAL FIELD

The present disclosure relates to a reflective polarizer film, which may be used in a liquid crystal display.

BACKGROUND

Optical displays are widely used for lap-top computers, hand-held calculators, digital watches and the like. The familiar liquid crystal display (LCD) is a common example of such an optical display. In the LCD display, portions of the liquid crystal have their optical state altered by the application of an electric field. This process generates the contrast necessary to display "pixels" of information. In some examples, the LCD displays may include combinations of various optical films, including reflective polarizers, to modify the light properties of the display assembly.

LCD displays can be classified based on the type of illumination. "Reflective" displays are illuminated by ambient light that enters the display from the "front." Typically a brushed aluminum reflector is placed "behind" the LCD assembly. Another common example is to incorporates a "backlight" assembly for the reflective brushed aluminum surface in applications where the intensity of the ambient light is insufficient for viewing. The typical backlight assembly includes an optical cavity and a lamp or other structure that generates light. Displays intended to be viewed under both ambient light and backlit conditions are called "transflective." One problem with transflective displays is that the typical backlight is not as efficient a reflector as the traditional brushed aluminum surface. Further, backlights tend to randomize the polarization of the light and further reduce the amount of light available to illuminate the LCD display. Consequently, the addition of the backlight to the LCD display generally makes the display less bright when viewed under ambient light.

SUMMARY

In some examples, the disclosure describes an optical film that includes a plurality of interference layers, each interference layer reflecting or transmitting light primarily by optical interference, a total number of the interference layers less than about 1000, such that for a substantially normally incident light in a predetermined wavelength range, the plurality of interference layers has an average optical transmittance greater than about 85% for a first polarization state, an average optical reflectance greater than about 80% for an orthogonal second polarization state, and an average optical transmittance less than about 0.2% for the second polarization state.

In some examples, the disclosure describes an optical film that includes a plurality of interference layers, each interference layer reflecting or transmitting light primarily by optical interference, a total number of the interference layers less than about 1000, such that for a substantially normally incident light in a predetermined wavelength range, the optical film has an average optical transmittance ($T_a$) and an average optical reflectance ($R_a$) for a first polarization state (a), and an average optical transmittance ($T_b$) and an average optical reflectance ($R_b$) for an orthogonal second polarization state (b), a $T_b/R_b$ less than about 0.002 and a $R_a/T_a$ less than about 0.17.

In some examples, the disclosure describes an optical film that includes (N) sequentially numbered layers, (N) is an integer greater than 200 and less than 1000, each layer having an average thickness less than about 200 nm, a fitted curve being a best-fit regression applied to a layer thickness profile plotting a thickness of each layer as a function of layer number, wherein an average slope of the fitted curve in a region extending from the first layer to the (Nth) layer being less than about 0.2 nm/layer, such that for a substantially normally incident light in a predetermined wavelength range, the optical film has an average optical transmittance greater than about 85% for a first polarization state and an average optical reflectance greater than about 80% for an orthogonal second polarization state.

In some examples, the disclosure describes an optical film that includes (N) sequentially numbered layers, (N) is an integer greater than 200, with fewer than 10% of the layers having a thickness greater than about 200 nm, a fitted curve being a best-fit regression applied to a layer thickness of the optical film as a function of layer number, an average slope of the fitted curve in a region extending from the first layer to the (Nth) layer being less than about 0.2 nm.

In some examples, the disclosure describes an optical film that includes a plurality of layers sequentially numbered from one to (N), wherein (N) is an integer greater than 50 and less than 1000, the optical film transmitting at least 80% of light having a first polarization state in a predetermined wavelength range and reflecting at least 80% of light having an orthogonal second polarization state in the predetermined wavelength range, a fitted curve being a best-fit regression applied to a layer thickness of the optical film as a function of layer number, such that in a region extending from the first layer to the (Nth) layer, a difference between a maximum slope and a minimum slope of the fitted curve is less than about 0.70 nm/layer where the maximum slope and the minimum slope are each evaluated over any group of 25 to 50 adjacent layers.

In some examples, the disclosure describes an optical film transmitting at least 80% of light having a first polarization state in a predetermined wavelength range and reflecting at least 80% of light having an orthogonal second polarization state in the predetermined wavelength range, the optical film includes a stack of (N) layers, wherein (N) is an integer greater than 50 and less than 1000, such that, for a plurality of non-overlapping groups of sequentially arranged layers in the stack of (N) layers, the layers in each group numbered from one to (m), (m) being greater than 25, for each non-overlapping group a fitted curve is a best-fit regression applied to a layer thickness of the group as a function of layer number, wherein in a region extending from the first layer in the group to the (mth) layer in the group, the fitted curve has an average slope such that, a maximum difference between the average slopes of the fitted curves in the plurality of non-overlapping groups is less than 0.70 nm/layer.

In some examples, the disclosure describes an optical film that includes a plurality of alternating first and second layers, each first layer and each second layer reflecting or transmitting light primarily by optical interference, a total number of each of the first and second layers being less than 400 and greater than 100, for each pair of adjacent first and second layers: in a plane of the first layer, the first layer has a maximum index of refraction $n1_x$ along an x-direction, the second layer has an index of refraction n2, along the x-direction, a difference between $n1_x$ and n2, is greater than about 0.24, and a maximum angular range of the x-directions of the first layers is less than about 2 degrees.

In some examples, the disclosure describes an optical film that includes a plurality of alternating higher index of refraction and lower index of refraction interference layers, each interference layer reflecting or transmitting light primarily by optical interference, a total number of the interference layers greater than 300, an optical power of the optical film per interference layer greater than about 0.7.

In some examples, the disclosure describes an optical film that includes a plurality of alternating higher index of refraction and lower index of refraction interference layers, each interference layer reflecting or transmitting light primarily by optical interference, an optical power of the plurality of the interference layers per interference layer being greater than (−0.0012*N+1.46), where (N) is a total number of the alternating higher index of refraction and lower index of refraction interference layers, (N) being greater than 100 and less than 1000.

In some examples, the disclosure describes an optical film that includes a plurality of interference layers reflecting and transmitting light primarily by optical interference, such that for a substantially normally incident light in a predetermined wavelength range, the plurality of the interference layers transmit at least 80% of light having a first polarization state, reflect at least 80% of light having an orthogonal second polarization state, and have an average optical density greater than about 2.5, the plurality of the interference layers divided into a plurality of optical stacks, each pair of adjacent optical stacks separated by one or more spacer layers not reflecting or transmitting light primarily by optical interference, each optical stack transmitting at least 50% of light having the first polarization state in the predetermined wavelength range and reflecting at least 50% of light having the second polarization state in the predetermined wavelength range, the interference layers in each optical stack sequentially numbered, each optical stack having a best-fit linear equation correlating a thickness of the optical stack to interference layer number, the linear equation having an average slope in a region extending from the first interference layer in the stack to the last interference layer in the stack, a maximum difference between the average slopes of the linear equations of the plurality of optical stacks being less than about 20%

In some examples, the disclosure describes an optical film transmitting at least 80% of light having a first polarization state in a predetermined wavelength range and reflecting at least 80% of light having an orthogonal second polarization state in the predetermined wavelength range, the optical film includes: no less than 200 and no greater than 400 sequentially arranged unit cells, each unit cell comprising a lower index or refraction first layer and an adjacent higher index of refraction second layer, a difference between the higher and lower indices of refraction for each unit cell greater than about 0.24, each unit cell having a total optical thickness equal to one half of a central wavelength in a predetermined wavelength range, such that for each of at least 80% of pairs of adjacent unit cells in the sequentially arranged unit cells, a ratio of a difference of the central wavelengths of adjacent unit cells to an average of the central wavelengths of the adjacent unit cells is less than about 2%.

In some examples, the disclosure describes an optical film that includes a plurality of interference layers reflecting or transmitting light primarily by optical interference in a predetermined wavelength range, a maximum difference between indices of refraction of the interference layers being $\Delta n$, a fitted curve being a best-fit regression applied to a layer thickness of the optical film as a function of layer number, the fitted curve having an average slope K in a region extending across the plurality of interference layers, $\Delta n/K$ greater than about 1.2.

In some examples, the disclosure describes an optical film that includes ($M_a$) sequentially arranged first unit cells optimized to transmit or reflect light in a first, but not second, predetermined wavelength range, each of the first unit cells comprising a first high index of refraction layer and a second low index of refraction layer, and ($M_b$) sequentially arranged second unit cells optimized to transmit or reflect light in the second, but not the first, predetermined wavelength range, each of the second unit cells comprising a third high index of refraction layer and a fourth low index of refraction layer, such that: for the ($M_a$) sequentially arranged first unit cells, a ratio of an average of indices of refraction of the first high index of refraction layers to an average of indices of refraction of the second low index of refraction layers times ($M_a$) is greater than about 300, and for the ($M_b$) sequentially arranged second unit cells, a ratio of an average of indices of refraction of the third high index of refraction layers to an average of indices of refraction of the fourth low index of refraction layer times ($M_b$) is greater than about 300, where for light incident on the optical film at any incidence angle from about zero degree to about 30 degrees having any wavelength in the first and second predetermined wavelength ranges, a ratio of an average optical transmittance ($T_a$) of the optical film for a first polarization state to an average optical transmittance ($T_b$) of the optical film for an orthogonal second polarization state is no less than about 1000:1.

In some examples, the disclosure describes a display assembly that includes a light source, a liquid crystal display assembly, and one of the preciously described optical films disposed between the liquid crystal display assembly and the light source.

In some examples, the disclosure describes a display assembly that includes a light source, a liquid crystal layer configured to be illuminated by the light source, one or more brightness enhancement films disposed between the light source and the liquid crystal layer for increasing an axial brightness of the display assembly, and a reflective polarizer disposed between the one or more brightness enhancement films and the liquid crystal layer and configured to substantially transmit light having a first polarization state and substantially reflect light having an orthogonal second polarization state, the reflective polarizer having an average optical transmittance less than about 0.2% for the second polarization state, wherein no absorbing polarizer is disposed between the light source and the liquid crystal layer, and wherein a contrast ratio of the display assembly is at least twice that of a comparative display assembly having the same construction except that the average transmittance of the reflective polarizer of the comparative display assembly for the second polarization state is greater than about 1.0%.

In some examples, the disclosure describes a display assembly that includes a light source, a liquid crystal layer configured to be illuminated by the light source, one or more brightness enhancement films disposed between the light source and the liquid crystal layer for increasing an axial brightness of the display assembly, and a reflective polarizer disposed between the one or more brightness enhancement films and the liquid crystal layer and comprising a plurality of interference layers transmitting or reflecting light primarily by optical interference, such that for a substantially normally incident light in a predetermined wavelength range, the plurality of the interference layers transmits at least 80% of light having a first polarization state and transmits less than about 0.2% of light having an orthogonal second polarization state, wherein no absorbing polarizer is disposed between the light source and the liquid crystal layer.

In some examples, the disclosure describes an optical stack including a reflective polarizer including a plurality of interference layers, each interference layer reflecting or transmitting light primarily by optical interference, for a substantially normally incident light having a predetermined wavelength, the plurality of interference layers having an optical transmittance greater than about 85% for a first polarization state, an optical reflectance greater than about 80% for an orthogonal second polarization state, and an optical transmittance less than about 0.1% for the second polarization state; and an absorbing polarizer bonded to and substantially co-extensive with the reflective polarizer, for a substantially normally incident light having the predetermined wavelength, the absorbing polarizer having a first optical transmittance for the first polarization state, an optical absorption greater than about 50% for the second polarization state, and a second optical transmittance for the second polarization state, a ratio of the second optical transmittance to the first optical transmittance being greater than about 0.001.

In some examples, the disclosure describes an optical system for displaying an object to a viewer centered on an optical axis and including: at least one optical lens having a non-zero optical power;

a reflective polarizer disposed on and conforming to a first major surface of the optical lens, the reflective polarizer substantially transmitting light having a first polarization state and substantially reflecting light having an orthogonal second polarization state; and a partial reflector disposed on and conforming to a different second major surface of the optical lens, the partial reflector having an average optical reflectance of at least 30% for a predetermined wavelength range, such that an average optical transmittance of the optical system for an incident light along the optical axis having the second polarization state is less than about 0.1%.

In some examples, the disclosure describes a polarizing beam splitter (PBS) including: a first and second prism; and a reflective polarizer disposed between and adhered to the first and second prisms, the reflective polarizer substantially reflecting polarized light having a first polarization state and substantially transmitting polarized light having an orthogonal second polarization state, such that when an incident light having a predetermined wavelength enters the PBS from an input side of the PBS and exits the PBS from an output side of the PBS after encountering the reflective polarizer at least once, a ratio of an average intensity of the exiting light to an average intensity of the incident light is: greater than about 90% when the incident light has the first polarization state, and less than about 0.2% when the incident light has the second polarization state.

In some examples, the disclosure describes a liquid crystal display projection system including the optical film as described herein.

In some examples, the disclosure describes a display assembly including: a light source; a liquid crystal layer configured to be illuminated by the light source; and a reflective polarizer including the optical film of any one of clauses 1 to 126, the reflective polarizer disposed adjacent to the liquid crystal layer.

The details of one or more examples are set forth in the accompanying drawings and the description below. Other features, objects, and advantages will be apparent from the description and drawings, and from the claims

DETAILED DESCRIPTION

The optical films described herein may be used in display assemblies to enhance the brightness of the display when viewed under ambient light, reduce the overall thickness of the display assembly, or provide other useful advantages. In some examples, the optical films described herein may be used as a reflective polarized that demonstrates a relatively high contrast ratio of incident light within a desired wavelength range transmitted through the optical film within a pass polarization state compared to the light transmitted through the film in an orthogonal reflected polarization state. In some examples, the described optical films may exhibit a contrast ratio of at least 1000:1, while using a relatively small number of total optical layers (e.g., no more than 1000 total layers). In some examples, the properties and construction of the optical films describe herein may provide reflective polarizer exhibiting a high contrast ratio while having an overall thickness that remains significantly low (e.g., less than about 100 μm).

Figure 1:
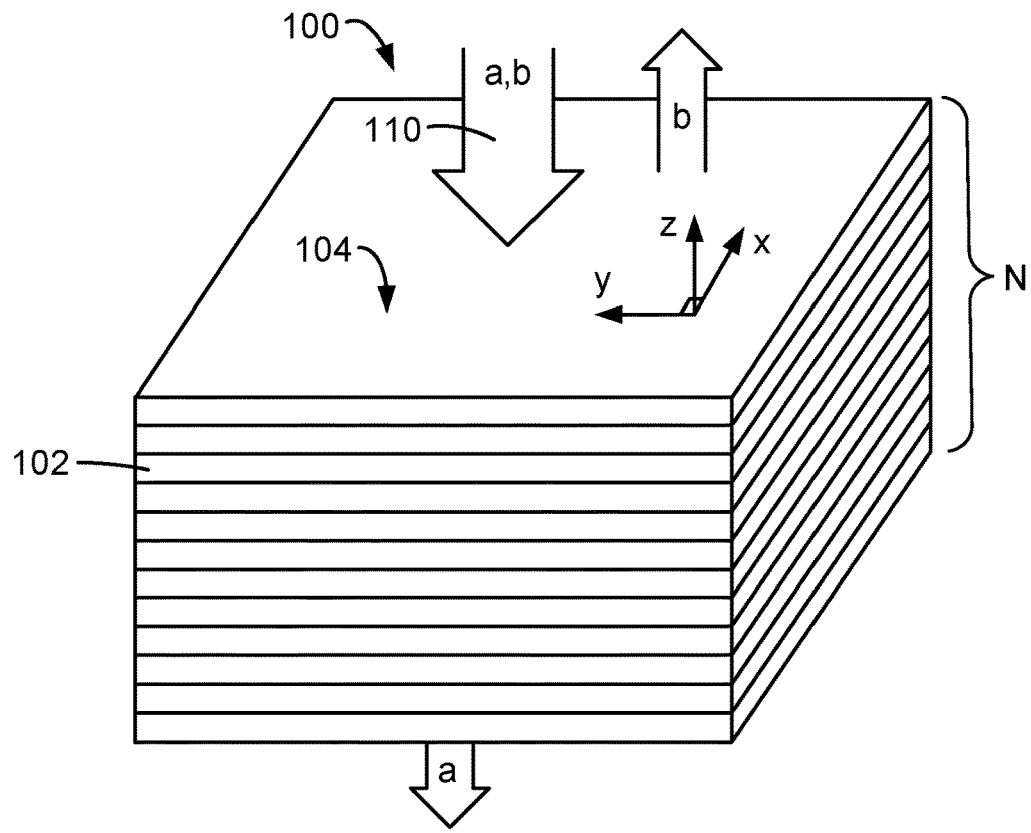
FIG. 1 is an example optical film that includes a plurality of interference layers sequentially numbered 1 to (N).

The optical films described herein may be characterized as a multi-layer optical film having plurality of optical layers (e.g., interference layers) configured to selectively transmit and reflect light within a predetermined wavelength range. In some such examples, the optical films may function as a reflective polarizer or RP that selectively transmits and reflects light of different polarization states. For example, FIG. 1 is a schematic perspective view of an example of a multi-layer optical film 100 that includes a plurality interference layers 102 positioned along a central axis to form optical film 100 having a total of (N) interference layers 102. The figure includes a coordinate system that defines X, Y, and Z directions that are referred to in the perception of optical film 100.

During use, light incident on a major surface of optical film 100 (e.g., film surface 104), depicted by incident light 110 may enter a first layer of optical film 100 and propagate through the plurality of interference layers 102, undergoing select reflection or transmission by optical interference depending on the polarization state of incident light 110. Incident light 110 may include a first polarization state (a) and a second polarization state (b) that are be mutually orthogonal to one another. The first polarization state (a) may be considered as the "pass" state while the second polarization state (b) may be considered as the "reflected" state. As incident light 110 propagates through plurality of interference layers 102, a portion of the light in the second polarization state (b) will be reflected by the layers summating in second polarization state (b) being reflected by optical film 100 while a portion of the light in the first polarization state (a) collectively passes through optical film 100.

In some examples, the optical film 100 may be characterized in terms of its reflectivity and transmissivity of the first and second polarization states (a) and (b) of incident light 110. For example, the amount of incident light 110 for a predetermined wavelength transmitted through optical film 100 may be expressed as the percent of optical transmittance ($T_a$) for the first polarization state (a) and the percent of optical transmittance ($T_b$) for the second polarization state (b), orthogonal to $T_a$. The amount of incident light 110 for a predetermined wavelength range reflected by optical film 100 may be expressed as the percent of optical reflectance ($R_a$) for the first polarization state (a) and the percent of optical reflectance ($R_b$) for the second polarization state (b), orthogonal to $T_a$. For a given optical film, the sum of transmissivity, reflectivity, and losses due to, for example, absorption, will amount to 100% for light within a predetermined wavelength range. In the present disclosure, optical film 100 may have a relatively low absorbance for light within the predetermined wavelength range. In some examples, the relatively low absorbance of incident light 110 by optical film 100 may result less heat generated within optical film 100 and leading to an overall more efficient reflective film.

The predetermined wavelength range may be any suitable wavelength range, including for example, visible light (e.g., about 400-700 nm), near-infrared (e.g., about 800-1300 nm), a range based on the output of a liquid crystal display backlight (425-675 nm), or the like. In some examples, optical film 100 may be configured to transmit and reflect light of different polarizations states within more than one predetermined wavelength range, e.g., visible light and near-infrared. For example, the predetermined wavelength range may include a first range from about 430 nm to about 465 nm, a second range from about 490 nm to about 555 nm, and a third range from about 600 nm to about 665 nm. In some such examples, optical film 100 may include multiple stack/packets as described further below with respect to FIG. 4, that each include a plurality of interference layers, where each stack/packet may be directed to a different predetermined wavelength range.

In some examples, as described further below, the interference layers may be characterized as a series of two-layer unit cells. The thickness of each unit cell may be configured to reflect a target wavelength within the predetermined wavelength range. In some examples, the central wavelength of reflectivity for a unit cell corresponds to the twice the optical thickness of a two-layer unit cell. Therefore, to reflect a predetermined wavelength range (e.g. 400 to 1000 nm), the unit cells within the stacks/packets will have difference thicknesses to cover the left band-edge, the right band-edge, and wavelengths in-between.

In some non-limiting examples, optical film 100 may include less than about 1000 (N) interference layers 102, each interference layer 102 reflecting or transmitting incident light 110 primarily by optical interference. While an optical film 100 with less than 1000 (N) total interference layers 102 is provided as one example, in some example, optical film 100 may include more than 1000 total interference layers 102 and still obtain some of the described optical properties. In other examples, it may be desirable to achieve the desired optical performance using fewer total layers in order to reduce the overall thickness of the film as reducing the overall thickness of a display assembly (e.g., LCD displays) is preferable in may application. Additionally or alternatively, the fewer total number of interference layers 102 may reduce the complexity in of the manufacturing process as well as reduce the potential for introducing variability (e.g., spectral variability in block or pass states) or production errors (e.g., increased block state transmission due to depolarization between the layers, reduced pass state transmission, or the like) in the final optical film. In some examples, optical film 100 may include less than 900 (N) total layers, or less than 800 (N) total layers in other layers.

In some such examples, using less than about 1000 total (N) interference layers 102, the optical film may have an average optical transmittance ($T_a$) greater than about 85% for a first polarization state (a), an average optical reflectance ($R_b$) greater than about 80% for an orthogonal second polarization state (b), and an average optical transmittance ($T_b$) less than about 0.2% for the second polarization state (b) for a substantially normally incident light 110 in a predetermined wavelength range.

In some examples, optical film 100 may be characterized in terms of the optical transmittance or reflectance the film. In some examples, the average optical transmittance ($T_a$) for the first/pass polarization state (a) of optical film 100 for incident light 110 (e.g., from air into optical film 100) within a predetermined wavelength range may be greater than about 85%, in some examples greater than 87%, and in some examples, greater than 89% using no more than 1000 total (N) interference layers 102. In some examples, the average optical transmittance ($T_b$) for the second/reflected polarization state (b) of optical film 100 for incident light 110 within a predetermined wavelength range may be less than about 0.15%, and in some examples, less than 0.10% using no more than 1000 total (N) interference layers 102.

In some examples, optical film 100 may be characterized in terms of the optical transmittance through the plurality of interference layers 102 (e.g., ignoring any loss associated with reflectance at the air-film interface). In some examples, the average optical transmittance ($T_a$) for the first/pass polarization state (a) through plurality of interference layers 102 for incident light 110 within a predetermined wavelength range may be greater than about 90%, in some examples greater than 95%, and in some examples, greater than 98% using less than 1000 total (N) interference layers 102.

The properties and construction of optical film 100 may provide the film with a relatively high contrast ratio. The contrast ratio may be defined as the ratio between the normal axis incident light 110 transmitted through optical film 100 in the first polarization state (a) (e.g., the "pass" state) divided by normal axis incident light 110 transmitted through optical film 100 in the second orthogonal polarization state (b) (e.g., the "reflected" state) for a specified wavelength range.

In some examples, the degree of transmittance and reflectance of optical film 100 may be characterized in terms of the ratio of the transmissivity to reflectivity for a given polarization state. For example, the ratio of the percent of optical transmittance to the percent of optical reflectance for the first polarization state (a) may be expressed as ($R_a/T_a$) for incident light 110 within a predetermined wavelength range and the ratio of the percent of optical transmittance to the percent of optical reflectance for the for the second polarization state (b) for incident light 110 within the predetermined wavelength range may be expressed as ($T_b/R_b$). In some examples, $R_a/T_a$ ratio may be relatively low, e.g., less than about 0.17, and the $T_b/R_b$ ratio may be relatively low, e.g., less than about 0.002.

In some non-limiting examples, optical film 100 a total (N) of less than about 1000 interference layers 102 that reflect or transmit light primarily by optical interference such that for a substantially normally incident light 110 in a predetermined wavelength range, the $T_b/R_b$ ratio for optical film 100 is less than about 0.002 (e.g., less than 0.001) and $R_a/T_a$ is less than about 0.017 (e.g., less than 0.14), where $T_a$ and $R_a$ are the average optical transmittance and reflectance respectively for the first polarization state (a) (e.g., the "pass" state), and $T_b$ and $R_b$ are the average optical transmittance and reflectance respectively for the second polarization state (b) (e.g., the "block" state) for incident light 110 in the predetermined wavelength range.

In some examples, optical film 100 may be characterized in terms of the ratio between the percent of optical transmittance for the first (a) and second (b) polarization states. For example, the ratio $T_a/T_b$ representing the optical transmittance for the first (a) and second (b) polarization states optical film 100 may be greater than about 425.

Additionally or alternatively optical film 100 may be characterized in terms of the ratio between the percent of optical reflectance for the second (b) and first (a) polarization states. For example, the ratio $R_b/R_a$ representing the optical reflectance for the second (b) and first (a) polarization states optical film 100 may greater than about 6.7.

In some examples, the transmittance and reflectance properties of optical film 100 may be characterized for incident light within a predetermined wavelength range having an angle of incidence on surface 104 within a set angle of less than about 30°, for example, less than about 20°, or less than about 10°, with the incidence angle measured from the normal of surface 104 with 0° representing the normal. For example, in some non-limiting examples, light incident on surface 104 of optical film 100 at an incidence angle of less than about 10° within a predetermined wavelength range (e.g., visible light of about 400 nm to about 700 nm) may undergo an average optical transmittance ($T_a$) of greater than about 85% for the first polarization state (a), an average optical reflectance ($R_b$) of greater than about 80% for the second polarization state (b), and an average optical transmittance ($T_b$) of less than about 0.2% for the second polarization state (b).

Figure 2:
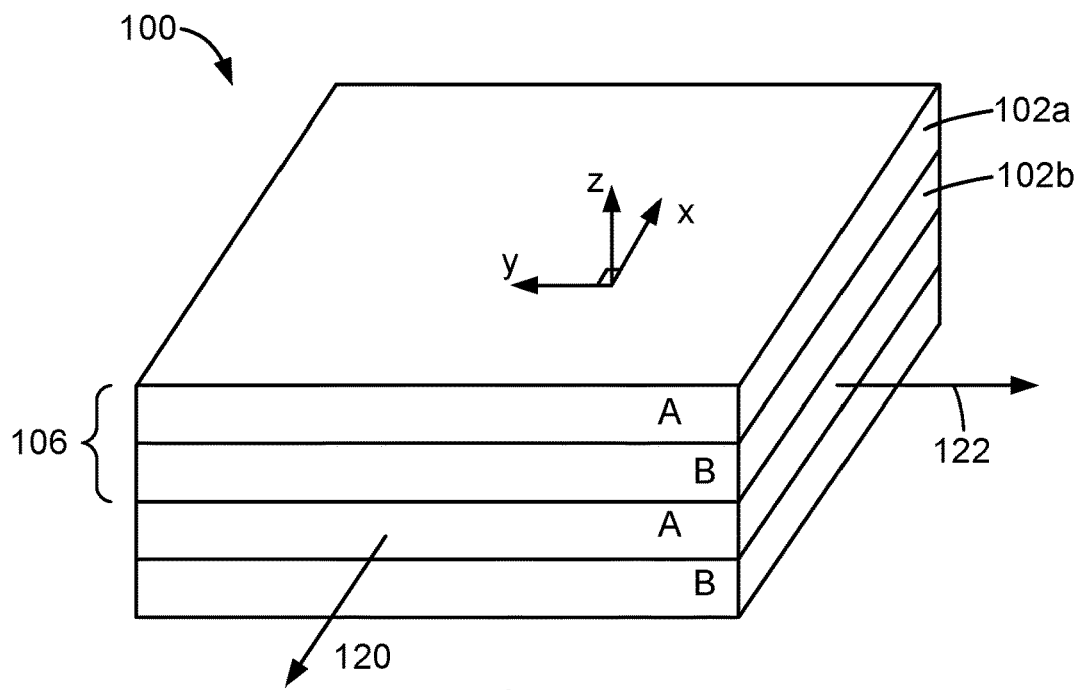
FIG. 2 is a schematic perspective diagram of a segment of the optical film of FIG. 1 illustrating the alternating interference layers.

In some examples, interference layers 102 of optical film 100 may include alternating layers (e.g., A and B) of two different polymeric materials that exhibit differing index of refraction characteristics. For example, FIG. 2 is a schematic perspective diagram of a segment of the optical film 100 illustrating alternating interference layers 102a and 102b. FIG. 2 includes a coordinate system that defines X, Y, and Z axes to assist with describing the optical properties of optical film 100.

As shown in FIG. 2, optical film 100 includes of alternating layers (e.g., ABABA . . . ) of different optical materials referred to as material "(A)" and material "(B)" throughout the drawings and description. As described further below, the various layers of the two different materials may be formed through an extrusion/lamination process in which the layers are extruded together to form the multiple optical layers 102 (ABABA . . . ) that are adhered together.

In some examples, during the extrusion process the optical layers 102 may be stretched to impart the various interference characteristics of the film. For example, layers of the A and B optical material may be stretched (e.g., in a 5:1 ratio or a 6:1 ratio) along one axis (e.g., the X-axis), and not stretched appreciably (1:1) along the orthogonal axis (e.g., the Y-axis). The X-axis is referred to as the "stretched" direction while the Y-axis is referred to as the "transverse" direction.

The selection of optical material used to form the A and B layers may be selected to impart specific optical characteristics to the film as a result of the stretching process. For example, the (B) material forming optical layers 102b may have a nominal index of refraction (e.g., n2=1.64) which is not substantially altered by the stretching process. As such, the index or refraction for "B" layers 102b in both the x and y directions ($n2_x$ and $n2_y$) may be substantially the same for both directions after the stretching process. In contrast, the (A) material forming optical layers 102a may have an index of refraction altered by the stretching process. For example, a uniaxially stretched layer 102a of the (A) material may have a higher index of refraction in the X-axis or stretched direction 120 (e.g., $n1_x$=1.88), and a different index of refraction associated with the Y-axis or non-stretched direction 122 (e.g., $n1_y$=1.64). Due to the increased index of refraction in the stretched direction, layers 102a including material (A) may be considered as the high index of refraction (HIR) layers 102a while interference layers 102b including material (B) may be considered as the low index of refraction (LIR) layers 102b. In some examples, the refractive indices of the alternating AB layers may be may be controlled by judicious materials selection and processing conditions. In some examples, the optical characteristics of the layers 102 may cause optical film 100 to act as a reflecting polarizer that will substantially transmit the first polarization state (a) component of incident light 110 within a predetermined wavelength range oriented with respect to the non-stretched axis 122, while the stretched axis 120, will correspond to the reflect-axis for which the component of incident light 110 in second polarization state (b) within the predetermined wavelength range will be substantially reflected through optical interference.

In some examples, optical film 100 may be characterized by the difference between the indices of refraction between alternating HIR layers 102a and LIR layers 102b along the stretched axis 120 (i.e., $\Delta n_x = n1_x - n2_x$). In some such examples, the indices of refraction between alternating HIR layers 102a and LIR layers 102b along the non-stretched axis direction 122 may be substantially the same such that the difference between the indices in non-stretched axis direction 122 (i.e., $\Delta n_y = n1_y - n2_y$) is about 0.0. In some examples, increasing the $\Delta n_x$ between HIR and LIR layers 102a, 102b may permit sufficient transmission/reflection of polarized light for a given wavelength range using a fewer total number of interference layers as compared to an optical film with a lower $\Delta n_x$ for with the same optical power.

Preferably, the stretched axis direction of each of interference layers 102 will be substantially aligned (e.g., aligned or nearly aligned) such that the X-axis for each respective layer 102 represents the direction for obtaining the maximum index of refraction within the X-Y plane (FIG. 2) for each layer. However due to machine tolerances and number of interference layers 102, the stretched axis 120 for each of the interference layers (e.g., representing the direction of obtaining the maximum index or refraction for the layer) may be aligned to within a variance of about ±2°.

In some non-limiting examples, optical film 100 may include a total of more than 200 and less than 1000 (N) first layers 102a and second layers 102b that reflect or transmit light primarily by optical interference. For example, optical film 100 may include less than 400 and greater than 100 first layers 102a and less than 400 and greater than 100 second layers 102b. In some such examples, for each pair of adjacent first and second layers 102a, 102b, the layers may define a stretched axis that represents the direction in which the maximum index of refraction obtained for the respective layer (e.g., X-axis/direction 120 corresponding to indices of refraction $n1_x$ and $n2_x$ for the two layers). The difference of indices of refraction between the first layer 102a and second layer 102b for the primary axis (e.g., $\Delta n_x = n1_x - n2_x$) may be greater than about 0.24. In some such examples, the respective stretched axis directions for each of first and second optical layers 102a, 102b may be substantially aligned such that interference layers 102 define a maximum angular range of the respective stretched-axis directions of less than about 2 degrees.

Optical film 100 including plurality of interference layers 102 may be formed using any suitable technique. For example, layers 102a and 102b including optical materials A and B respectively may be fabricated using coextruding, casting, and orienting processes to form stacks/packets of tens to hundreds of interference layers 102, followed stretching or otherwise orienting the extruded layers to form a stack/packet of interference layers 102. Each stack/packet may include between about 200 and 1000 total interference layers depending on the desired characteristics of optical film 100. As used herein a "stack/packet" is used to refer to a continuous set of alternating interference layers 102a, 102b that is absent of any spacer or non-interference layers formed within the stack/packet (e.g., sequentially arranged). In some examples, spacer, non-interference layers, or other layers may be added to the outside of a given stack/packet, thereby forming the outer layers of the film without disrupting the alternating pattern of interference layers 102 within the stack/packet.

In some examples, optical film 100 may be fabricated by coextrusion. The fabrication method may comprise: (a) providing at least a first and a second stream of resin corresponding to the first and second polymers to be used in the finished film; (b) dividing the first and the second streams into a plurality of layers using a suitable feedblock, such as one that comprises: (i) a gradient plate comprising first and second flow channels, where the first channel has a cross-sectional area that changes from a first position to a second position along the flow channel, (ii) a feeder tube plate having a first plurality of conduits in fluid communication with the first flow channel and a second plurality of conduits in fluid communication with the second flow channel, each conduit feeding its own respective slot die, each conduit having a first end and a second end, the first end of the conduits being in fluid communication with the flow channels, and the second end of the conduits being in fluid communication with the slot die, and (iii) optionally, an axial rod heater located proximal to said conduits; (c) passing the composite stream through an extrusion die to form a multilayer web in which each layer is generally parallel to the major surface of adjacent layers; and (d) casting the multilayer web onto a chill roll, sometimes referred to as a casting wheel or casting drum, to form a cast multilayer film. This cast film may have the same number of layers as the finished film, but the layers of the cast film are typically much thicker than those of the finished film.

After cooling, the multilayer web can be re-heated and drawn or stretched to produce the near-finished multilayer optical film. The drawing or stretching accomplishes two goals: it thins the layers to their desired final thicknesses profile, and it orients the layers such that at least some of the layers become birefringent. The orientation or stretching can be accomplished along the cross-web direction (e.g. via a tenter), along the down-web direction (e.g. via a length orienter), or any combination thereof, whether simultaneously or sequentially. If stretched along only one direction, the stretch can be "unconstrained" (wherein the film is allowed to dimensionally relax in the in-plane direction perpendicular to the stretch direction) or "constrained" (wherein the film is constrained and thus not allowed to dimensionally relax in the in-plane direction perpendicular to the stretch direction). If stretched along both in-plane directions, the stretch can be symmetric, i.e., equal along the orthogonal in-plane directions, or asymmetric. Alternatively, the film may be stretched in a batch process. In any case, subsequent or concurrent draw reduction, stress or strain equilibration, heat setting, and other processing operations can also be applied to the film.

The polymers of the various layers are preferably chosen to have similar rheological properties, e.g., melt viscosities, so that they can be co-extruded without significant flow disturbances. Extrusion conditions may be chosen to adequately feed, melt, mix, and pump the respective polymers as feed streams or melt streams in a continuous and stable manner Temperatures used to form and maintain each of the melt streams may be chosen to be within a range that avoids freezing, crystallization, or unduly high pressure drops at the low end of the temperature range, and that avoids material degradation at the high end of the range.

Example (A) materials suitable for optical film 102 may include, for example, polyethylene naphthalate (PEN), copolymers containing PEN and polyesters (e.g., polyethylene terephthalate (PET) or dibenzoic acid), glycol modified polyethylene terephthalate, or the like. Example (B) materials suitable for optical film 102 may include, for example, copolyesters based on PEN, copolyesters based on PET, polycarbonate (PC), or blends of these three classes of materials, or the like. To achieve high reflectivities with a reasonable number of layers, adjacent microlayers can exhibit a difference in refractive index ($\Delta n_x$) for light polarized along the x-axis of at least 0.2 in addition to the thickness profile described below.

In some examples, stretched axis 122 (e.g., Y-axis of FIG. 2) for each respective HIR and LIR layer 102a, 102b of plurality of interference layers 102 may be substantially aligned with one another (e.g., aligned in parallel or nearly parallel). In some examples, due to the manufacturing tolerances, the alignment of the stretched axes 122 may include for up to a 2° variance.

While optical film 100 may be described in some examples as having no more than 1000 total (N) interference layers 102, it will be appreciated that the lower bound of the total number of layers (N) may be any suitable amount configured to obtain the described optical properties. In some examples, there may be a trade-off between the obtained optical properties and the total number of layers (N)/thickness of the resultant film. For example, while in some examples the contrast ratio of a film may generally increase by increasing the total number of interference layers 102 included in optical film 100 absent any manufacturing complications as discussed prior, the thickness of the film will also increase with the increasing number of layers. In some examples, such as in modern thin optical display devices, the overall thickness of a film may be a limiting factor as the availability for space in such optical display units is limited. In some examples, optical film 100 may provide a significant increase in one or more optical properties (e.g., contrast ratio), while having a significantly reduced film thickness (e.g., half) compared to other film constructions (e.g., the combined absorptions polarizer and reflective polarized used in some conventional display units). In addition, excessive thickness of the film carries the risk of decreasing the overall contrast ratio due to depolarization of the pass-state light propagating through the film.

In some examples, optical film 100 may have between about 200 to about 1000 total interference layers 102 with an overall thickness for optical film 100 of less than about 100 μm including any optional non-interference or protective layers. In some examples, optical film 100 may have a total thickness of less than about 100 μm (e.g., less than 60 μm) across all of the layers of optical film 100.

Figure 3:
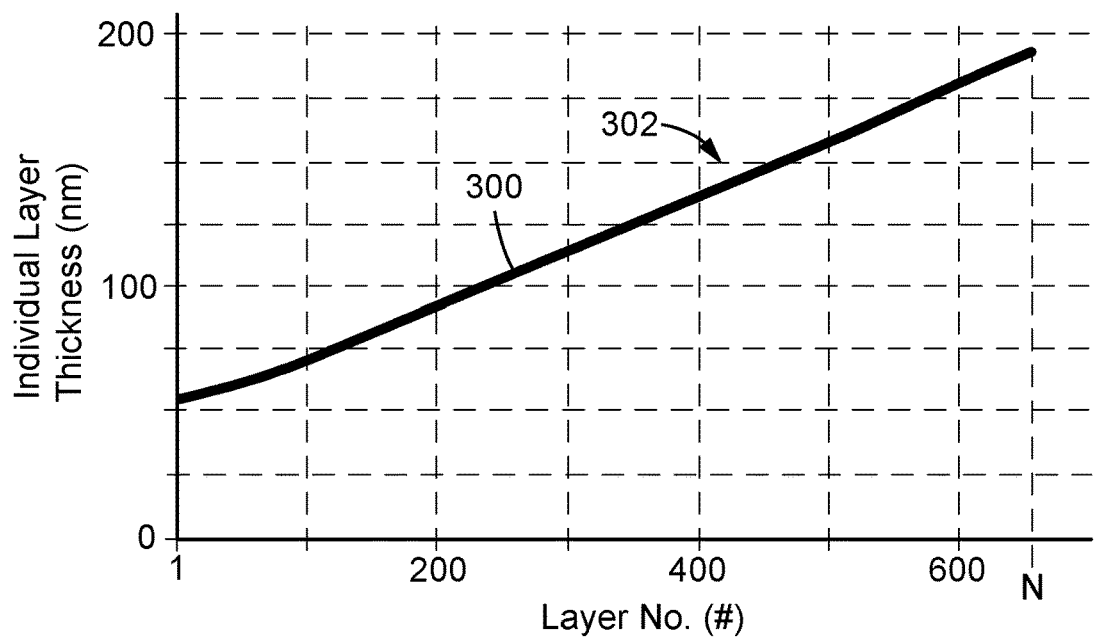
FIG. 3 is a plot of an example thickness profile of the optical film of FIG. 1.

In some examples, the thickness of the individual interference layers 102 may be relatively thin such that fewer than 30% of interference layers 102 have a thickness greater than about 200 nm (e.g., less than 5% of interference layers 102 have a thickness greater than 200 nm or all interference layers 102 have a thickness less than about 200 nm), but may vary as function of position within optical film 100. For example, the thickness of the individual interference layers 102 may vary such that the thickness of the individual interference layers 102 generally increases (e.g., increasing thickens apart from local fluctuations) moving from the first layer number to the Nth layer number. In some examples, optical film 100 may be characterized in terms of the film's thickness profile. For example, FIG. 3 is a plot of an example thickness profile of optical film 100 that shows the relative thickness of the individual interference layers 102 as a function of the layer number (e.g., layer number 1 to N plotted such that the thickness of the layers generally increases from layer 1 to layer N). A fitted curve 300 may be set to the region extending from the first layer to the Nth layer (e.g., excluding any non-interference layers, spacer layers, or other optional optical layers that do not form part a stack/packet), with fitted curve 300 representing the best-fit regression applied to a layer thickness profile of optical film 100. In some examples, fitted curve 300 may represent a $2^{nd}$, $3^{rd}$, $4^{th}$, or $5^{th}$ degree polynomial regression analysis, an exponential regression analysis, or the like.

As shown in FIG. 3, fitted curve 300 is represented as having an average slope which represents the layer thickness profile of the individual interference layers 102 of optical film 100 as a function of layer number. In particular, the x-axis represents the layer number of sequentially numbered interferences layers 102, numbered 1 to N and the y-axis represents the average thickness (e.g., average thickness for the entire X-Y plane of FIG. 1) for a given layer number. As used herein, "sequentially numbered" interference layers 102 is used to refer to the interference layers 102 numbered sequentially in a particular direction (e.g., moving along the Z-axis in FIG. 1). In some examples, the interference layers 102 may be sequentially arranged to form a single stack/packet as shown in FIG. 1. In other examples, the sequentially numbered interferences layers 102 may include one or more spacer layers (e.g., possibly thicker non-interference layers such as non-interference layer 408 described in FIG. 4 below) that do not function by optical interference and are not numbered as part of the sequentially numbered interference layers 102. For example, in some examples, the sequentially numbered interference layers 102 numbered 1 to N may represent two stacks/packets of interference layers with each stack/packet including sequentially arranged interference layers 102 separated by a spacer layer (e.g., the first stack including layers 1 to m and the second stack including layers (m+1) to N). As such the spacer layer is not counted as a layer that makes up the thickness profile shown in FIG. 3.

In some non-limiting examples, slope of the fitted curve 300 may be a positive slope (e.g., greater than zero) and less than about 0.2 nm per layer averaged across interference layers 102 sequentially numbered 1 to N of optical film 100, with N being greater than 200, with fewer than 30% of interference layers 102 having a thickness greater than about 200 nm. For example, fewer than 10% of interference layers 102 may have a thickness greater than about 200 nm; in some examples, with fewer than 5% of interference layers 102 may have a thickness greater than about 200 nm; and in some examples, all of interference layers 102 sequentially numbered 1 to N may have a thickness less than about 200 nm.

In some non-limiting examples, optical film 100 may include N sequentially numbered interference layers 102 where N is an integer greater than 200 and less than 1000 with each layer 102 having an average thickness of less than about 200 nm. In some such examples, fitted curve 300 representing a best-fit regression applied to the thickness profile plotting the respective thicknesses of the individual optical layers 102 as a function of layer number, may define an average slope as measured from the first layer to the Nth layer of less than about 0.2 nm/layer. In some such examples, due to the thickness profile of optical film 100, the film may define an average optical transmittance ($T_a$) of greater than about 85% for the first polarization state (a) and an average optical reflectance ($T_b$) of greater than about 80% for the orthogonal second polarization state (b) for normally incident light 110 within a predetermined wavelength range.

In some examples, slope may be substantially the same across all interference layers 102 representing a continuous and constant change in thickness from layer to layer. In some such examples, the average slope may be characterized as having a near constant step-change in layer thickness between adjacent interference layers 202. For example, if slope is substantially constant at about 0.2 nm, layer number x may have a thickness of t nm while layer number (x+1) may have a thickness of (t+0.2 nm).

In some examples, the relative change in layer thicknesses between adjacent interference layers 102 may vary as a function of position within optical film 100 such that the slope of fitted curve 300 may not be substantially the same across all interference layers 102. In some such examples, the slope of fitted curve 300 may be characterized in terms of a maximum and minimum slope. For example, optical film 100 may include N sequentially numbered interference layers 102 where N is an integer greater than 50 and less than 1000. Fitted curve 300, representing the best-fit regression may be applied to the thickness profile plotting the respective thicknesses of the individual interference layers 102 as a function of layer number, may define both maximum slope and a minimum slope as a function of layer number. In some such examples, the difference between the maximum slope and the minimum slope may be less than about 0.70 nm/layer (e.g., less than about 0.57 nm/layer) where the maximum and minimum slopes are each evaluated over any group of 25 to 50 adjacent interference layers 102. In some such examples, due to the thickness profile of optical film 100, the film may define an average optical transmittance ($T_a$) of greater than about 80% for the first polarization state (a) and an average optical reflectance ($T_b$) of greater than about 80% for the orthogonal second polarization state (b) for normally incident light 110 within a predetermined wavelength range.

In some examples, optical film 100 may be characterized by the ratio between the maximum difference between indices of refraction of the plurality of interference layers 102 (e.g., the maximum $4n_x$ between interference layers 102a and 102b) versus the average slope of fitted curve 300, e.g., $\Delta n_x/K$ where K represents the average slope of fitted curve 300. A lower average slope may improve the optical interference between of optical film 100. In some examples, designing optical film 100 to increase the $\Delta n_x/K$ ratio such that it is relatively large (e.g., greater than 1) may result in a higher contrast ratio.

In some non-limiting examples, optical film 100 may define a $\Delta n_x/K$ greater than about 1.2. In some such examples, optical film may define an optical density greater than about 1.4, greater than 1.6, greater than 1.8, greater than 2.0, or greater than about 3.0 for the predetermined wavelength range. The "optical density" as used herein is calculated as $-\log(T_b)$ averaged over a wavelength range of interest (e.g. 400 to 700 nm). In some examples, the higher the optical density, the high the contrast ratio will be for the optical film.

In some such examples, slope 302 of fitted curve 300 may represent the average slope across a subgroup of interference layers 102. For example, plurality of interference layers 102 may be divided into a plurality of non-overlapping groups of sequentially arranged interference layers 102 within optical film 100. As used herein, "sequentially arranged" interference layers 102 means the interference layers are directly adjacent to one another and do not include any spacer layers (e.g., non-interference layer 408 described below in FIG. 4) disposed between any two adjacent interference layers 102 within a sequential arrangement of layers. For each group of sequentially arranged interference layers 102, the layers may be sequentially numbered from one to m, with m being greater than 25, but less than N, with N representing the total number of interference layers 102 (e.g., between 50 and 1000 layers) within optical film 100. Fitted curve 300 may be applied to the entire thickness profile of interference layers 102 as a function of the layer number. The resultant average slope 302 (e.g. thickness change per m layer numbers) may be determined for each subgroup of m layers. In some such examples, the maximum difference between the average slopes for all subgroups (e.g., the difference between the maximum slope measured from one group and the minimum slope measured from a different group) may be less than 0.70 nm/layer.

In view of the thickness profile of optical film 100, one will appreciate that the relative thicknesses of at least some of the different interference layers 102 will differ throughout the stack/packet of interference layers 102 in optical film 100. In some examples, the difference in thicknesses of plurality of interference layers 102 may be characterized by differences in the average thicknesses of some of the interference layers 102. For example, optical film 100 may include at least one interference layer 102 that defines an average thickness of less than about 50 nm (e.g., layer number 1), and the average thickness of at least one other of the interference layers 102 may be greater than about 100 nm (e.g., layer number N). In some examples, optical film 100 may include at least two interference layers 102 with a difference in average thicknesses of at least about 30% less (e.g., layer number 1 defines an average thickness that is at least 30% less than the average thickness of layer number N).

In some examples, the relative thickness of the interference layers 102 may be described in terms of the optical thickness of a unit cell 106a, 106b. As used herein, a "unit cell" is used to refer to a sequentially arranged pair of one HIR layer 102a and one LIR layer 102b and is referred to in general as unit cell 106. Within FIG. 2, only two respective unit cells 106 are shown (e.g., unit cell 106a and unit cell 106b), however optical film 100 may include tens to hundreds of unit cells 106. In some examples, the unit cells 106 may be sequentially arranged or separated into different stacks/packets by one or more spacer layers.

The "optical thickness" ($\tau$) of a unit cell 106 may be defined as the thickness of the unit cell's respective HIR layer 102a ($d_{HIR}$) times the refractive index of the HIR layer in the stretched direction (e.g., $n1_x$) at the wavelength of interest plus the thickness of the cell's respective LIR layer 102b ($d_{LIR}$) times the refractive index of the LIR layer in the stretched direction (e.g., $n2_x$) at the same wavelength of interest. Each unit cell 106 may be sized such that the unit cell defines a respective optical thickness that is equal to about one half of a different respective central wavelength within the predetermined wavelength range. For example, unit cell 106a may correspond to central wavelength ($\lambda_a$), thereby defining an optical thickness ($\tau_a$) of ($\tau_a = \lambda_a/2 = d_{HIR}*n1_x + d_{LIR}*n2_x$). Each respective unit cell 106 within optical film 100 may correspond to a different central wavelength within the predetermined wavelength range to provide the desired transmission and reflection properties to the film over the predetermined wavelength range.

In some examples, the optical thickness ($\tau$) of unit cells 106 may be controlled so that the intrinsic bandwidth of a given unit cell overlaps with the intrinsic bandwidth of the adjacent unit cells. By overlapping the intrinsic bandwidths of adjacent unit cells 106, the constructive interference obtained by the interference layers 102 remains high. One way to improve the constructive interference obtained in optical film 100 is to keep the difference in optical thicknesses ($\tau$) of adjacent unit cells 106 relatively small to produce a sufficient amount of intrinsic bandwidth overlap. In some examples, the optical thickness ($\tau$) of unit cells 106 may be controlled such that less 10% of adjacent unit cells have a difference in optical thickness ($\tau$) that is more than 1%. For example, the optical film of Example 1 described further below, less than 6% of the adjacent unit cells had more than 1% difference in optical thicknesses (τ) and less than a 1.2% of the adjacent unit cells had more than a 1.5% difference in optical thicknesses (τ).

In some examples, the changes in optical thicknesses between adjacent unit cells (e.g. unit cell 106a and unit cell 106b) may be relatively small to obtain the desired optical properties. For example, in some non-limiting examples, optical film 100 may include between about 100 and about 400 sequentially arranged unit cells 106, each having one HIR layer 102a and one LIR layer 102b that have a difference in indices of refraction (e.g., $\Delta n_x$) of at least about 0.24. Each unit cell 106 defines a respective optical thickness (τ) that is equal to about one half of a respective, and different, central wavelength (e.g., λ/2) within a predetermined wavelength range. In some such examples, for at least 80% of pairs of adjacent unit cells (e.g., unit cell 106a and unit cell 106b form one pair 108 of adjacent unit cells), the ratio of the difference of the central wavelengths of the adjacent unit cells 106a, 106b to an average of the central wavelengths of the adjacent unit cells 106a, 106b is less than about 2% (e.g., $abs([\lambda_{a(n)}-\lambda_{a(n+1)}]/[(\lambda_{a(n)}-\lambda_{a(n+1)})/2])<2\%$).

In some examples, optical film 100 may be characterized in terms of an optical power of interference layers 102. The "optical power" may be defined as the integral of optical density in 1/(wavelength) space across the region of interest for the blocked polarization state (b). In some examples, a higher optical power may correspond to a higher contrast ratio in the region of interest. Depending on the intended application for optical film 100, a certain amount of optical power for the optical film may be desired. However, the optical power of per interference layer generally will be inversely related to the total number of interference layers such that the optical power per layer will decrease with increasing total number of layers. As such, increasing the total number of interference layers while useful for obtaining other optical properties (e.g., sufficient coverage of a predetermined wavelength range) may lead to a general decrease in the optical power per layer. The optical films described herein may provide a higher optical power per layer for, a given number of interference layers, than capable of being obtained with conventional reflective polarizer films.

In some non-limiting examples, optical film 100 may include between about 100 to about 1000 alternating HIR 102a layers and LIR 102b layers with each respective interference layer 102 reflecting or transmitting light primarily by optical interference. In some such examples, optical film may define an optical power of optical film 100 per interference layer 102 of greater than about (−0.0012*N+1.46), where N represents the total number of interference layers 102 (e.g., N being between about 100 to about 1000).

Additionally or alternatively, in some non-limiting examples, optical film 100 may include at least 300 total alternating HIR 102a layers and LIR 102b layers with each respective interference layer 102 reflecting or transmitting light primarily by optical interference, such that optical film 100 defines an optical power per interference layer 102 of greater than about 0.7.

Figure 15:
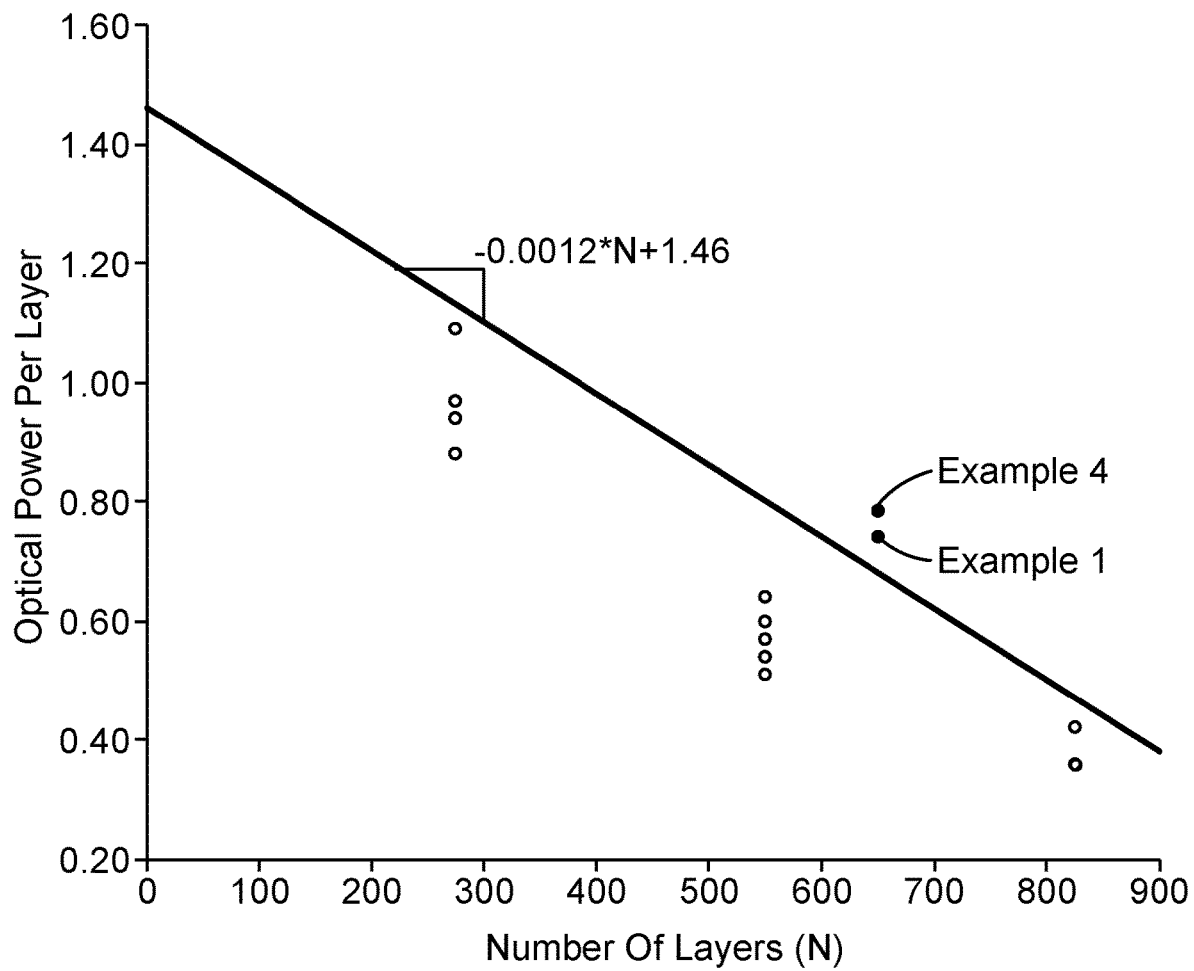
FIG. 15 shows the optical power per layer versus the number of layers for the non-limiting optical films of Examples 1 and 4 prepared in accordance with the disclosure compared to the comparative examples of Table 6.

FIG. 15, described further below, shows the optical power per layer versus the number of layers for the non-limiting optical film of Example 1 prepared in accordance with the disclosure. Also included in the plot of FIG. 15 are several comparative examples of conventional reflective polarizer films that are either commercially available or described in literature (see Table 6). As shown in FIG. 15 and Table 6, the optical film of Example 1 includes a total of 650 interference layers and defines an optical power of approximately 0.74 per layer.

Figure 4A:
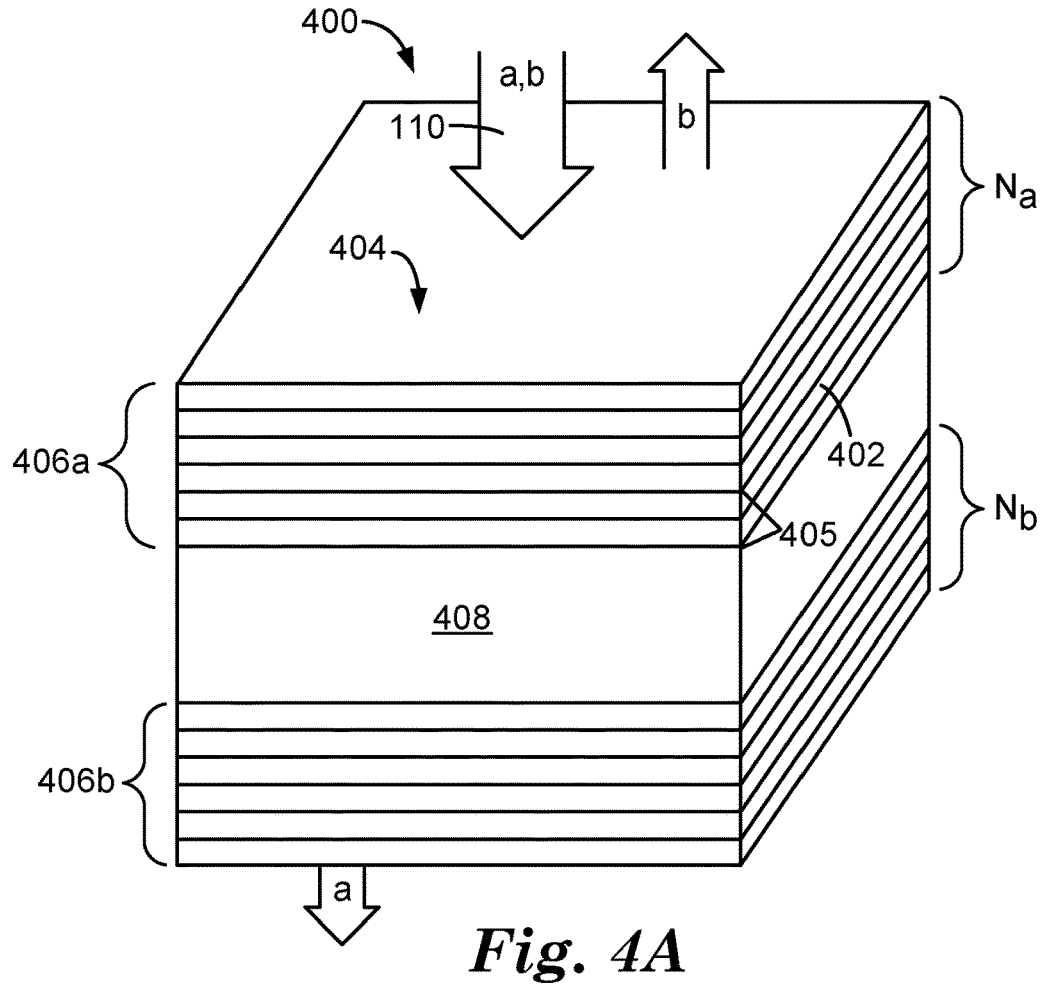
FIG. 4A shows another example of optical film that can be formed to exhibit one or more of the optical properties described herein.

In some examples, plurality of interference layers 102 of optical film 100 may be sequentially arranged such that each interference layer 102 is directly adjacent to a neighboring interference layer to form an optical stack/packet of at most 1000 individual layers. In other examples, optical film 100 may be separated into more than one stack/packet of interference layers 102 separated by a comparatively thick non-interference layer acting as a spacer layer (e.g., an optical layer that does not reflect or transmit light primarily by optical interference). For example, FIG. 4A shows another example of optical film 400 that can be formed to exhibit one or more of the optical properties described above with respect with optical film 100. As shown in FIG. 4A, optical film 400 includes a plurality interference layers 402 separated into two optical stacks/packets 406a, 406b each including a plurality of interference layers 402. Optical stacks/packets 406a, 406b, are separated by a comparatively thick (e.g., thick in comparison to an individual interference layer 402) spacer layer 408.

As with optical film 100, optical film 400 may include tens to hundreds of interference layers 402 divided between optical stacks/packets 406a, 406b. First optical stack/packet 406a includes a total of ($N_a$) interference layers 402 and second stack/packet 406b includes a total of ($N_b$) interference layers 402, such that optical film 400 includes a total of ($N=N_a+N_b$) sequentially numbered interference layers 402.

Each interference layer 402 may be substantially the same as the interference layers 102 described with respect to FIGS. 1 and 2. For example, interference layers 402 alternating HIR layers (e.g., similar to HIR layers 102a) and LIR layers (e.g., similar to LIR layers 102a). Additionally, as with optical film 100, in some examples, the total number of interference layers 402 among optical stacks/packets 406a, 406b of optical film 400 (e.g., N) may be less than 1000, or less than 800 as described above.

In some examples, optical stacks/packets 406a, 406b may include substantially the same (e.g., the same or nearly the same) total number of interference layers 402. For example, optical stacks/packets 406a, 406b may independently include between about 50 and about 400 interference layers 402 each, with the total number of interference layers 402 within each optical stack/packet 406a, 406b being the same (e.g., $N_a=N_b$). In some examples, the total number of interference layers 402 within a single optical stack/packet 406a, 406b may be about 325 layers. In other examples, optical stacks/packets 406a, 406b may include a different total number of interference layers 402 (e.g., $N_a \neq N_b$).

Spacer layer 408 may include any suitable optical material that does not reflect or transmit light primarily by optical interference (e.g., a non-interference layer). In some examples, spacer layer 408 may include polyethylene naphthalate (PEN), copolymers containing PEN and polyesters (e.g., polyethylene terephthalate (PET) or dibenzoic acid), glycol modified polyethylene terephthalate, polycarbonate (PC), or blends of these four classes of materials, or the like. In some examples, spacer layer 408 may be formed by coextrusion or lamination thereby laminating optical stacks/packets 406a, 406b together with spacer layer 408 in between the two stacks/packets. Additionally or alternatively, spacer layer 408 may be optically coupled to optical stacks/packets 406a, 406b (e.g., adhered to the respective stack/packets 406a, 406b such that light transmits into and through spacer layer 408 without undergoing a significant reflection or refraction).

Spacer layer 408 may be relatively thick compared to an individual interference layer 402. For example, spacer layer 408 may have an average thickness greater than about 500 nm. Additionally or alternatively, spacer layer 408 may have an average thickness that is at least 10 times the largest wavelength in the predetermined wavelength range. For example, if the predetermined wavelength range includes visible light (e.g., about 400-700 nm), the thickness of spacer layer 408 may be greater than 7,000 nm. In some examples, spacer layer 408 may have an average thickness that is at least 50 times the largest wavelength in the predetermined wavelength range. In some examples, spacer layer 408 may help reduce flow disturbances that might otherwise occur during the co-extrusion process of forming the multilayer optical stacks/packets 406a, 406b.

In some examples, optical stacks/packets 406a, 406b may be independently optimized to transmit or reflect light of different predetermined wavelength ranges. As such, optical film 400 may be configured to transmit and reflect light depending on its polarization state over multiple discreet wavelength ranges. For example, first optical stack/packet 406a may be configured to transmit and reflect light within the visible spectrum (e.g., about 400-700 nm) while second optical stack/packet 406b may be configured to transmit and reflect light within the near-infrared spectrum (e.g., about 800-1300 nm).

In some examples, the two optical stacks/packets 406a, 406b may be configured such that optical film 400 transmits and reflects light depending on its polarization state over a continuous predetermined wavelength range (e.g., about 400-1300 nm). For example, optical stacks/packets 406a, 406b may be configured such that the predetermined wavelength ranges of the respective stacks/packets 406a, 406b abut one another or overlap for a substantially continuous (e.g., continuous or nearly continuous) predetermined wavelength range.

In some examples, first optical stack/packet 406a may include sequentially arranged interference layers 402 numbered 1 to ($N_a$) of alternating HIR and LIR layers configured to transmit or reflect light of different polarization states within a first predetermined wavelength range. A pair so directly adjacent HIR and LIR interference layers 402 may be characterized a unit cell 405, such that first optical stack/packet 406a has a total of about ($M_a = N_a/2$) unit cells 405. Likewise, second optical stack/packet 406b may include sequentially arranged interference layers 402 numbered 1 to ($N_b$) of alternating HIR and LIR layers, or about ($M_b = N_b/2$) unit cells 405, configured to transmit or reflect light of different polarization states within a second predetermined wavelength range. The respective HIR and LIR interference layers 402 forming a respective unit cell 405 may be characterized by the ratio between the average index of refraction for the HIR layer to the average index of refraction for the LIR layer, e.g., ($n1_x/n2_x$).

In some examples, the index of refraction for the HIR (e.g., $n1_x$) and LIR (e.g., $n2_x$) interference layers 402 as well as the total number of unit cells 405 (e.g., M) within a respective optical stack/packet 406 may be selected such that the optical stack/packet exhibits a relatively high contrast ratio (e.g., greater than 1000:1) for reflecting and transmitting light within the predetermined wavelength range. In some examples, the respective optical stack/packet 406 may be configured to fit the equation: $[(n1_x/n2_x)*M>300]$.

In some non-limiting examples, optical film 400 may include $M_a$ sequentially arranged first unit cells 405 of alternating first HIR and second LIR interference layers 402. The first unit cells 405 may be optimized to transmit or reflect light in a first predetermined wavelength range (e.g., about 400-700 nm), but not a second predetermined wavelength range (e.g., about 800-1300 nm). In some such examples, the alternating first HIR and second LIR interference layers 402 may define an average index of refraction of ($n1_x$) and ($n2_x$) respectively such that the ratio of an average of indices of refraction of the first HIR layers ($n1_x$) to an average of indices of refraction of the second LIR layers ($n2_x$) times the total number of first unit cells 405 ($M_a$) is greater than about 300. Additionally, optical film may include $M_b$ sequentially arranged second unit cells 405 of alternating third HIR and forth LIR interference layers 402. The second unit cells 405 may be optimized to transmit or reflect light in the second predetermined wavelength range (e.g., about 400-700 nm), but not the first predetermined wavelength range (e.g., about 800-1300 nm). The alternating third HIR and fourth LIR interference layers 402 may define an average index of refraction of ($n3_x$) and ($n4_x$) respectively such that the ratio of an average of indices of refraction of the third HIR layers ($n3_x$) to an average of indices of refraction of the fourth LIR layers ($n4_x$) times the total number of second unit cells 405 ($M_b$) is greater than about 300. In some such examples, light incident on optical film 400 at any incidence angle less than about 30 degrees having any wavelength in the first and second predetermined wavelength ranges may undergo an average optical transmittance (e.g., $T_a$) for a first polarization state (a) and an average optical transmittance (e.g., $T_b$) for a second polarization state (b) such that a ratio of ($T_a$) to ($T_b$) is greater than about 1000:1.

In some such examples, the multiple stack/packet 406 design of optical film 400 may provide better a more efficient process for manufacturing the film compared to, for example, an optical film that includes only a single packet of interference layers configured to reflect and transmit light within the same continuous predetermined wavelength range, due impart to the reduction in the total number of layers and complexity of forming a large single stack.

As with optical film 100, in some examples, the degree of transmittance and reflectance of optical film 400 for substantially normally incident light 110 (e.g., normal or nearly normal to surface 404) within a predetermined wavelength range (e.g., visible light or about 400-700 nm), may be characterized as having an average optical transmittance of ($T_a$) and optical reflectance of ($R_a$) for the first/pass polarization state (a) and an average optical transmittance of ($T_b$) and optical reflectance of ($R_b$) for the second/reflect polarization state (a). The optical transmittance and reflectance values of optical film 400 may be substantially similar to the values discussed above with respect to optical film 100. For example, the average optical transmittance of ($T_a$) for optical film 400 may be greater than about 80% for a first/pass polarization state (a), the average optical reflectance ($R_b$) greater than about 80% for the orthogonal second/reflected polarization state (b), and the average optical transmittance ($T_b$) less than about 0.2% for the orthogonal second/reflected polarization state (b). In some examples, each optical stack/packet 406a, 406b may be characterized as transmitting at least 50% of normally incident light 110 having the first polarization state (a) in the predetermined wavelength range and reflecting at least 50% of normally incident light 110 in the second polarization state (b) within the predetermined wavelength range.

Figure 4B:
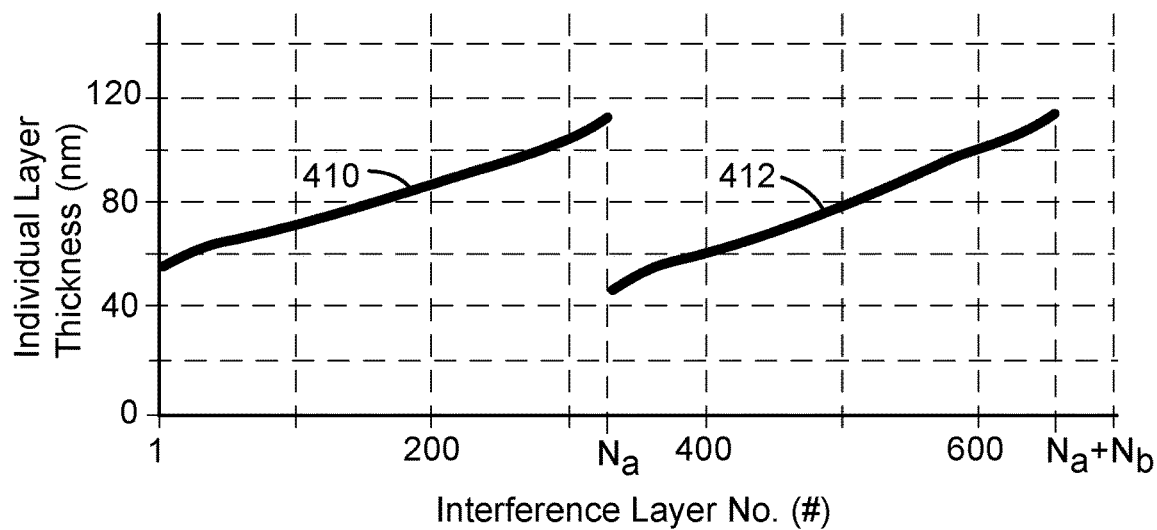
FIG. 4B is a plot of an example thickness profile of the optical film of FIG. 4A.

FIG. 4B is a plot of an example thickness profile for optical film 400 that shows the thickness of each individual interference layer 402 as a function of the layer number, wherein plurality of interference layers 402 are sequentially numbered 1 to N, with N representing the total number of interference layers 402 (e.g., $N=N_a+N_b$) in optical film 400. As shown in FIG. 4B, spacer layer 408 is excluded from the thickness profile plot of optical film 400.

The thickness profile of optical film 400 may be characterized by two fitted curves 410, 412 each corresponding to the thickness profile of a respective optical stacks/packets 406a, 406b respectively. Fitted curves 410, 412 represents the best-fit regression applied to a layer thickness profile of optical film 400 based on interference layers 402 within the respective stack/packet. For example, fitted curve 410 represents the thickness profile of first stack/packet 406a, representing interference layers 402 sequentially numbered 1 to $N_a$ and fitted curve 412 represents the thickness profile of second stack/packet 406a, representing interference layers 402 sequentially numbered ($N_a$+1) to ($N_a$+$N_b$) (e.g., corresponding to interference layers 402 sequentially numbered 1 to $N_b$ of the second stack/packet 406b).

As shown in FIG. 4B each optical stack/packet 406a and 406b may include a layer thickness profile (e.g., plotting individual layer thicknesses vs the layer number) that defines a respective slope. In some examples, the average slopes for fitted curves 410, 412 may be less than 0.2 nm/layer number for interference layers 402 within a respective optical stack/packet 406a, 406b. Each optical stack/packet 406a, 406b of optical film 400 may include less than about 400 total interference layers 402 with each individual layer thicknesses of a respective interference layers 402 being relatively thin (e.g., have an average thickness less than about 200 nm).

In some examples, the average slope of fitted curves 410, 412 may represent the average slope across a subgroup of interference layers 402 within respective optical stack/packet 406a, 406b. For example, interference layers 402 within first optical stack/packet 406a may be divided into a plurality of non-overlapping groups of sequentially arranged interference layers 402. For each group of sequentially arranged interference layers 402, the layers may be sequentially numbered from one to m, with m being greater than $N_a$/10 but less than $N_a$, and with $N_a$ representing the total number of interference layers 402 within first optical stack/packet 406a. Fitted curve 410 may be applied to the thickness profile for each group of layers as a function of the layer number, with the resultant average slope for each group (e.g. thickness change per m layer numbers) determined for each group of layers. The maximum difference between the average slopes for all groups (e.g., the difference between the maximum slope measured from one group and the minimum slope measured from a different group) may be less than 0.70 (e.g., less than 0.57 nm/layer) where the maximum slope and the minimum slope are each evaluated over any group of 25 to 50 adjacent layers.

Figure 4C:
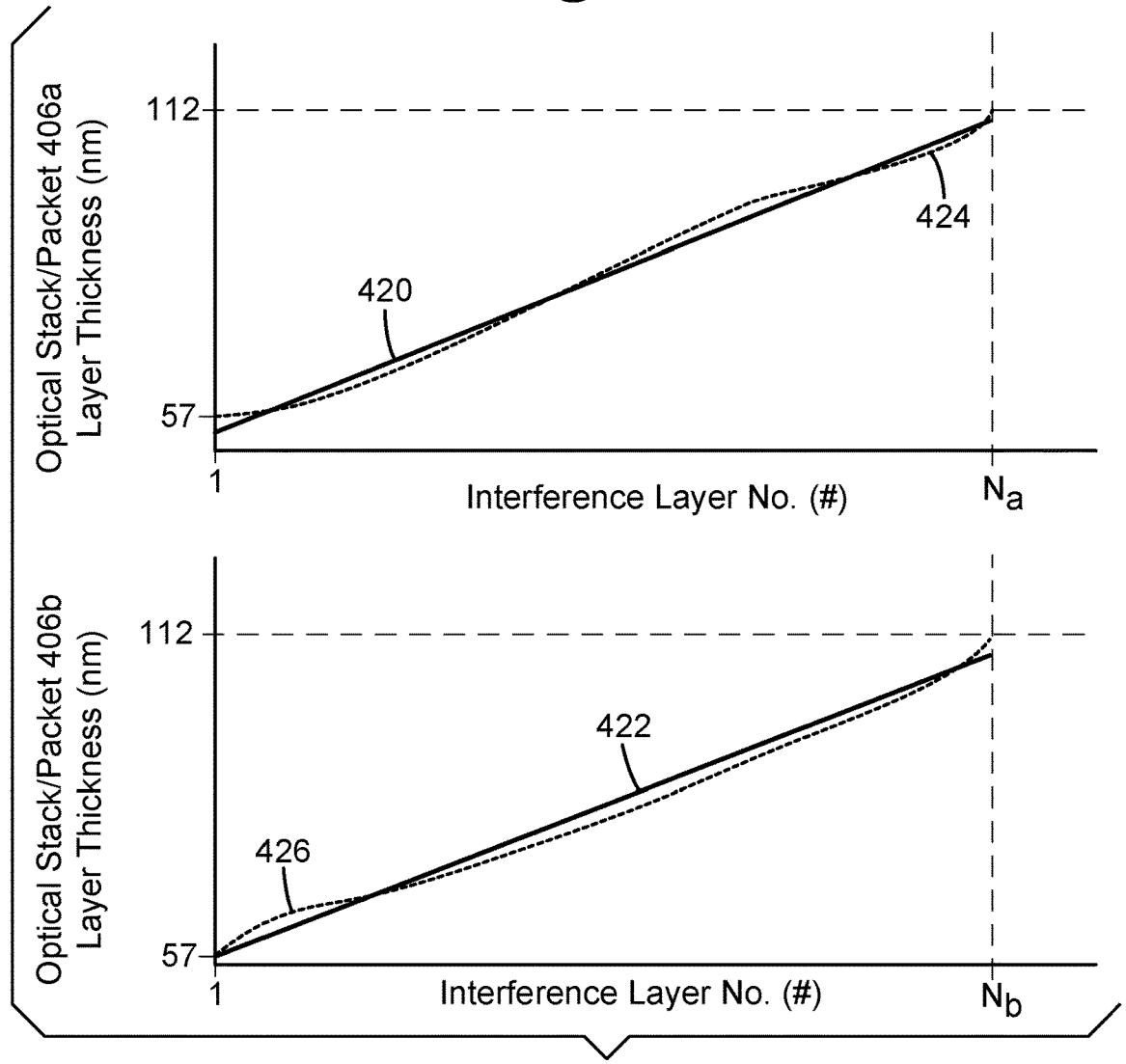
FIG. 4C is a pair of plots of an example thickness profile of the optical film of FIG. 4A.

In some examples, the layer thickness profile of optical film 400 may be characterized by the best-fit linear equation applied to the thickness profiles of each optical stack/packet 406a, 406b as a function of layer number. For example, FIG. 4C is a pair of plots of an example thickness profile for optical film 400 that show the thickness of first and second optical stacks/packets 406a, 406b as a function of interference layer number. As shown, first optical stack/packet 406a includes sequentially numbered interference layers 402 numbered 1 to $N_a$ and second optical stack/packet 406b includes sequentially numbered interference layers 402 numbered 1 to $N_b$. A best-fit linear regression 420, 422 may be applied to each plot (e.g., linear least squares regression), to provide a respective average slope for each associated best-fit regression. In some examples, the maximum difference between the average slopes of best-fit linear regression 420, 422 for all optical stacks/packets 406a, 406b within optical film 400 may be less than about 20%. For example, as described below with respect to the optical film of non-limiting Example 1 and FIG. 9, the slope of Packet 1 and Packet 2 forming the optical film of Example 1 each exhibited an average slope of 0.17 nm/layer and 0.18 nm/layer respectively resulting in a difference in slopes of approximately 6%.

Figure 13:
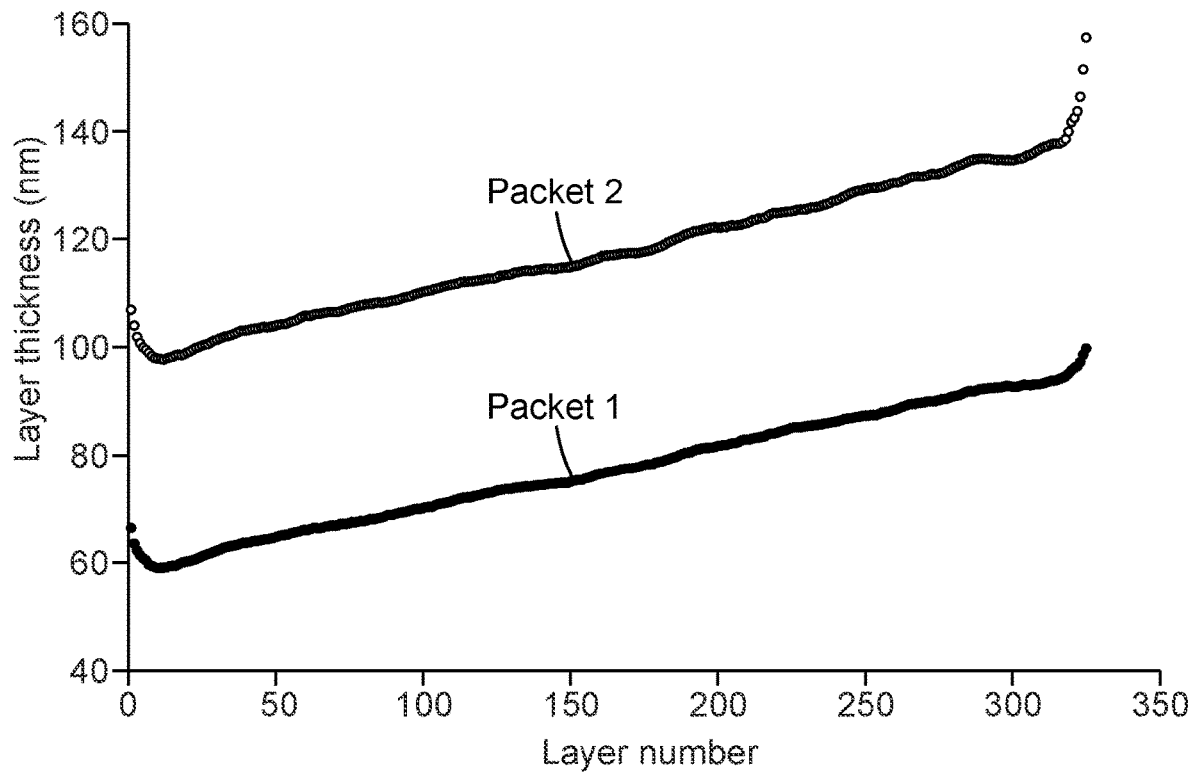
FIG. 13 is a show a plot of the layer thickness profile for the optical film of Example 7.

In some examples, first and second optical stacks/packets 406a, 406b may include stitching within regions 424 and 426. Stitching describes the optical design where at least two packets are present where there is only a small amount of overlap between the reflected bands associated with each packet. This allows lower slopes to be used in the individual packets which increases the optical power associated with each layer. FIG. 13 shows an example of a stitched layer design. In such examples, the change in layer thickness for layer of a respective optical stacks/packets 406a, 406b adjacent to layer 408 (e.g., the first 30 interference layers 402 adjacent to spacer layer 408 with in a given stack/packet) may increase relative to the change in thickness/layer for the other interference layers 402 within optical stack/packet 406a, 406b. This change is shown in regions 424 and 426 of FIG. 4C as the layer thickness profile having a slight curl at the ends of the thickness profiles where the optical stack/packet 406a, 406b have neighboring sides against spacer layer 408.

In some non-limiting examples, optical film 400 may include plurality of interference layers 402 reflecting and transmitting light primarily by optical interference, such that for a substantially normally incident light in a predetermined wavelength range, plurality of interference layers 402 transmit at least 80% of light having the first polarization state (e.g., $T_a$), reflect at least 80% of light having the orthogonal second polarization state (e.g., $T_b$). Plurality of interference layers 402 may be divided into a plurality of optical stacks/packets 406a, 406b, with each pair of adjacent optical stacks/packets 406a, 406b separated by one or more spacer layers 408 that does not reflect or transmit light primarily by optical interference and each optical stack/packet 406a, 406b transmitting at least 50% of light having the first polarization state (a) in the predetermined wavelength range and reflecting at least 50% of light having the second polarization state (b) in the predetermined wavelength range. Within each optical stack/packet 406a, 406b interference layers 402 may be sequentially numbered (e.g., $N_a$ or $N_b$), with each optical stack/packet 406a, 406b having a best-fit linear equation (e.g., fitted lines 420, 422) correlating a thickness of the optical stack/packet 406a, 406b to interference layer number, the linear equation having an average slope (e.g., stack thickness/layer number) in a region extending from the first interference layer 402 in the stack/packet to the last interference layer in the stack/packet (e.g., line 420 applied to layer numbers 1 to $N_a$ of first optical stack/packet 406a), a maximum difference between the average slopes of the best-fit linear equations of the plurality of optical stacks/packets 406a, 406b within optical film 400 being less than about 20%. In some such examples, optical film 400 may have an average optical density greater than about 2.5.

Figure 5A:
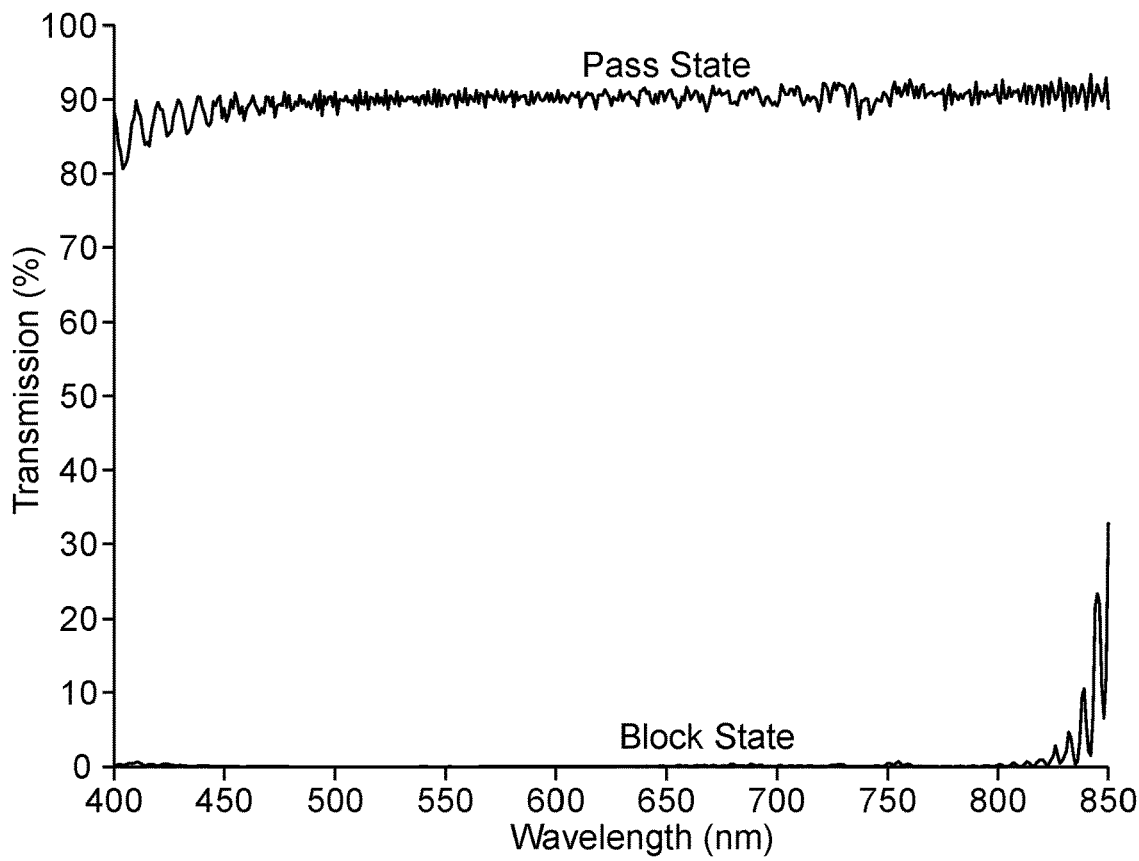
FIGS. 5A and 5B are a representative transmission plots for an example optical films in accordance with the disclosure.
Figure 5B:
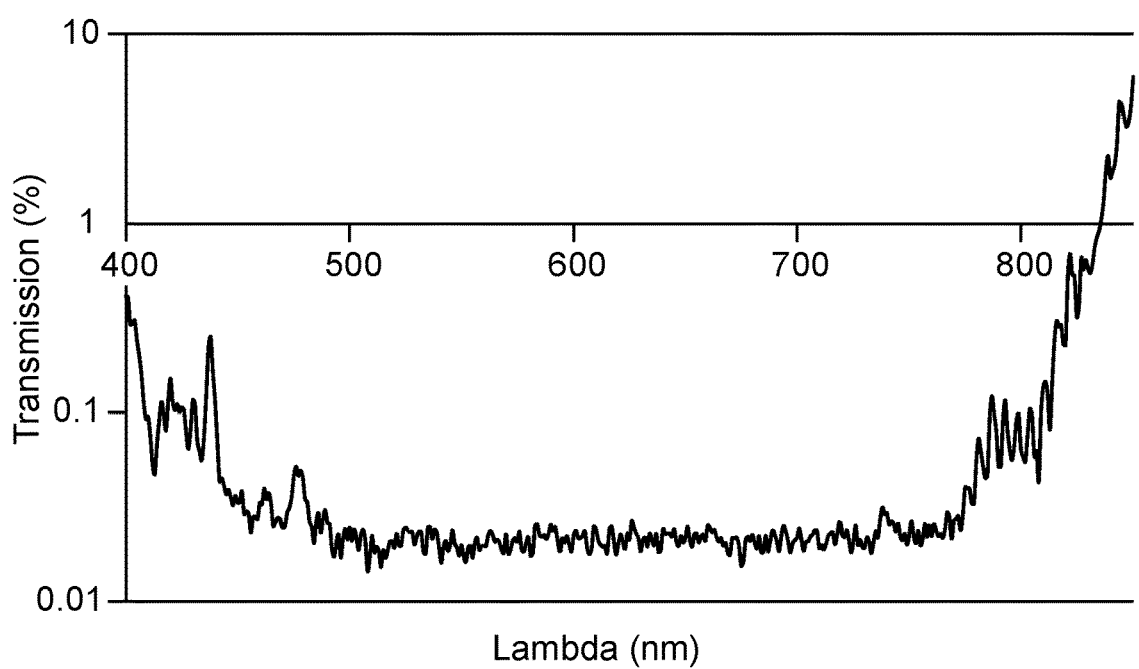

FIGS. 5A and 5B are a representative transmission plots for an example optical film (e.g., optical film 400) in accordance with the disclosure, showing the transmission percentages for the first and second polarization states (e.g., the pass and reflected polarization states respectively) for normally incident light 110 within specified wavelength range 400-700 nm corresponding to the visible spectrum. FIG. 5B shows the logarithmic plot for the transmission percentage for the second polarization state (b) (e.g., reflected polarization state). The representative optical film 400 tested included two optical stacks (e.g., 406a, 406b) each having 325 interference layers 402 each with the transmission spectrum measured for the first and second polarization states with a Lambda900 spectrometer (Perkin Elmer). As shown, the overall second polarization state (b) transmission (e.g., reflected-axis, $T_b$) across the visible spectrum range was significantly lower than 0.1%.

Figure 6:
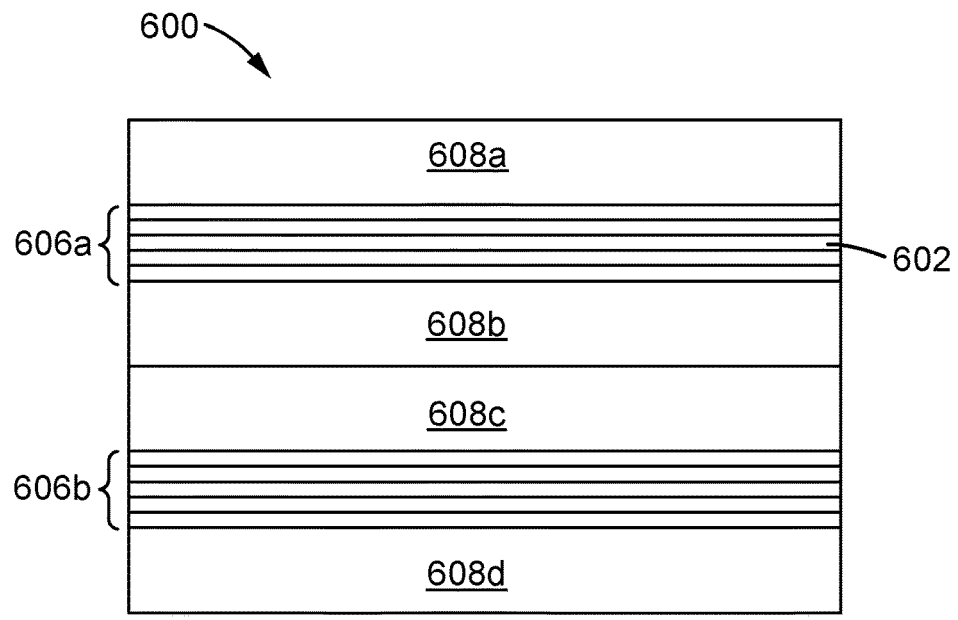
FIG. 6 shows another example of optical film that can be formed to exhibit one or more of the optical properties described herein.

In some examples, optical films 100, 400 may include or be combined with one or more non-interference layers that may be used to separate and/or protect one or more of the stack(s)/packet(s) of interference layers 102, 402. For example, FIG. 6 shows another example of optical film 600 that can be formed to exhibit one or more of the properties described above with respect with optical films 100, 400. As shown in FIG. 6 optical film 600 includes a plurality interference layers 602 divided into two optical stacks/ packets 606a, 606b laminated between comparatively thick non-interference layers 608. As shown in FIG. 6, first optical stack/packet 606a is set between non-interference layers 608a and 608b while second optical stack/packet 606b is set between non-interference layers 608c and 608d such that non-interference layers 608b and 608c are directly adjacent to one another and act as a spacer layer between first and second optical stacks/packets 606a. 606b. In some examples, due to their relative thickness, non-interference layers 608a and 608d external to optical stacks/packets 606a, 606b may help protect the respective stack/packet from unintentional damage (e.g., scratching). In some examples, non-interference layers 608a and 608b may define a reactive index of about 1.57.

Additionally or alternatively, one or more of non-interference layers 608 may include coatings, such as hard coats (anti-scratching coating), diffusion coatings, anti-reflection coatings, or anti-glare coatings.

Figure 7:
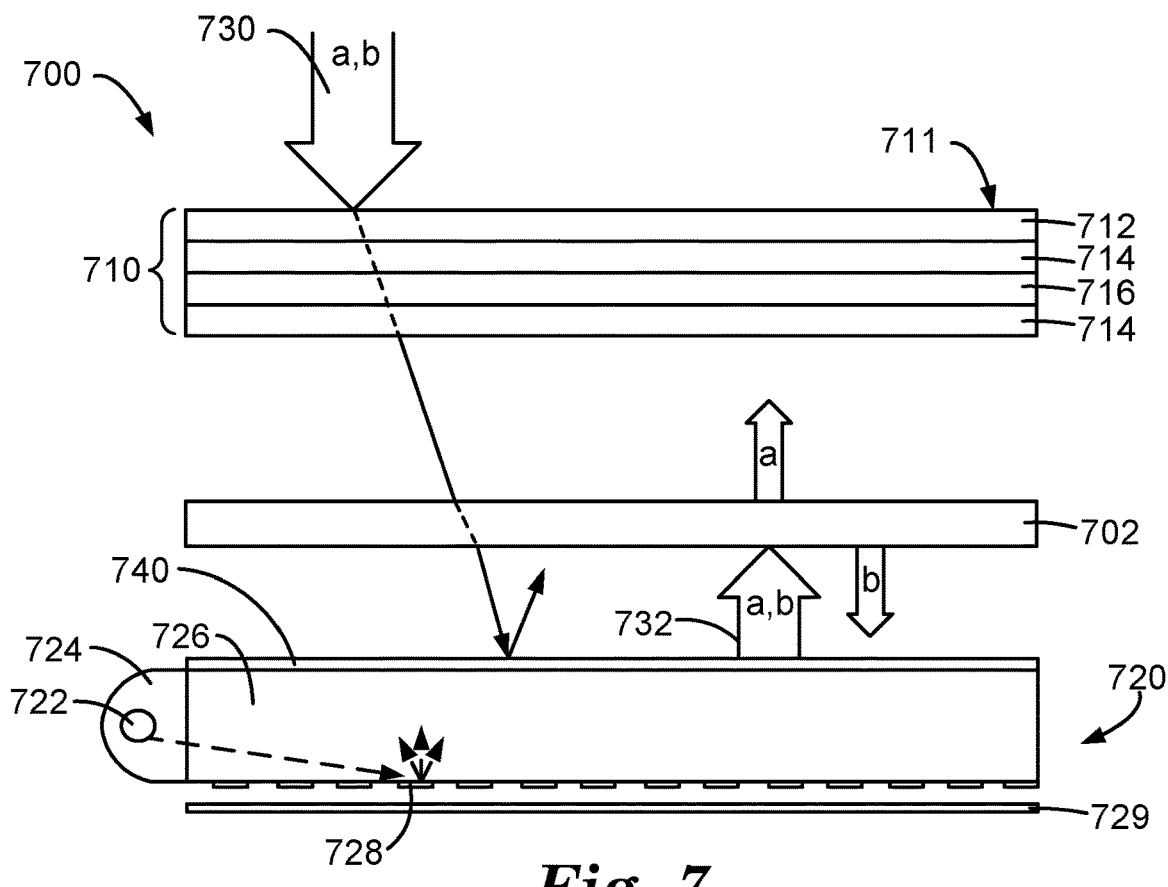
FIG. 7 is a diagram of an example display assembly that includes a reflective polarizer optical film, a liquid crystal display assembly, and a light source.

FIG. 7 is a diagram of an example display assembly 700 that includes reflective polarizer optical film 702, a liquid crystal display (LCD) assembly 710, and light source 720. As shown, LCD assembly 710 is illuminated by polarized light provided by the optical film 702 and light source 720. LCD assembly 710 may include a multi-layer arrangement having an outer absorption polarizer film 712, one or more glass layers 714, and a liquid crystal layer 716.

FIG. 7 depicts two types of light being transported through the display assembly 700. Ambient light 730 represents light incident on display surface 711 that traverses through LCD assembly 710, the optical film 702, and striking the diffuse reflective surface of light source 720 where it is reflected back towards optical film 702. Light can also originate from a backlight assembly of light source 720. For example, light source 720 may include an edge lit backlight that includes a lamp 722 in a reflective lamp housing 724. Light from the lamp 722 is coupled to the light guide 726 where it propagates until it encounters a diffuse reflective structure such as spot 728 (e.g., a discontinuous layer of titanium oxide pigmented material). This discontinuous array of spots is arranged to extract lamp light and direct it toward the LCD assembly 710. Ambient light 730 entering the light source 720 may strike a spot or it may escape from the light guide through the interstitial areas between spots. A diffusely reflective layer 729 (e.g., a layer of titanium oxide pigmented material) may be positioned below the light guide 726 to intercept and reflect such rays. In general, all the rays that emerging from the light source 720 towards LCD assembly 710 may be illustrated as ray bundle 732. This ray bundle is incident on the optical film 702 which transmits light having a first polarization state referred to as "(a)" and effectively reflects light having the orthogonal polarization state (b). Optical film 702 may correspond to any of optical films 100, 400, 600 described above.

In some examples, LCD display assemblies may include an absorption polarizer film and reflective polarizer film (AP/RP films) between light source 720 and LCD assembly 710. In such examples, the AP film may typically be used to create sufficient contrast for the display assembly while the inclusion of the RP film improves the brightness of the AP/RP film combination, particularly high ambient light environments or high glare conditions, compared to a system of only the AP film. Surprisingly, it has been found that the AP/RP films may be substituted with the high-contrast reflective polarizer (RP) optical film 702 as described herein without any appreciable reduction in brightness or contrast to display assembly 700 even in high ambient light environments (e.g., outside conditions). For example, while it was theorized that including only the optical film 702 in display assembly 700 in absence of a rear AP film would cause ambient light to undesirably reflect off optical film 702 creating high levels of glare, in practice negligible or relatively minor increases in glare were observed.

In some examples, display assembly 700 including optical film 702 may exhibit an enhanced brightness of about 10%-15% compared to a comparable display assembly that includes AP/RP films.

In some examples, display assembly 700 may include one or more brightness enhancement films 740 disposed between light source 720 and optical film 702 for increasing an axial brightness of the display assembly 700. Example brightness enhancement films 740 may include, for example, turning films, prism films, or the like.

In some non-limiting examples, display assembly 700 may include light source 720, LCD assembly 710 configured to be illuminated by light source 720, one or more brightness enhancement films 740 disposed between the light source 720 and LCD assembly 710 for increasing an axial brightness of display assembly 700, and optical film 702 (e.g., an RP) disposed between one or more brightness enhancement films 740 and LCD assembly 710 and configured to substantially transmit light having a first polarization state (a) and substantially reflect light having an orthogonal second polarization state (b). Optical film 702 may define an average optical transmittance less than about 0.2% for the second polarization state (e.g., $T_b$) with no absorbing polarizer (AP) disposed between light source 720 and LCD assembly 710. In some such examples, display assembly 700 may define a contrast ratio of at least twice that of a comparative display assembly having the same construction except that the average transmittance of the RP of the comparative display assembly for the second polarization state (b) is greater than about 1.0%.

Additionally or alternatively, in some non-limiting examples, display assembly 700 may include light source 720, LCD assembly 710 configured to be illuminated by light source 720, one or more brightness enhancement films 740 disposed between the light source 720 and LCD assembly 710 for increasing an axial brightness of display assembly 700, and optical film 702 (e.g., an RP) disposed between one or more brightness enhancement films 740 and LCD assembly 710. Optical film 702 may include a plurality of interference layers transmitting or reflecting light primarily by optical interference, such that for a substantially normally incident light in a predetermined wavelength range, the plurality of the interference layers transmits at least 80% of light having a first polarization state (e.g., $T_a$) and transmits less than about 0.2% of light having an orthogonal second polarization state (e.g., $T_b$), without an absorbing polarizer (AP) disposed between light source 720 and LCD assembly 710.

Figure 8:
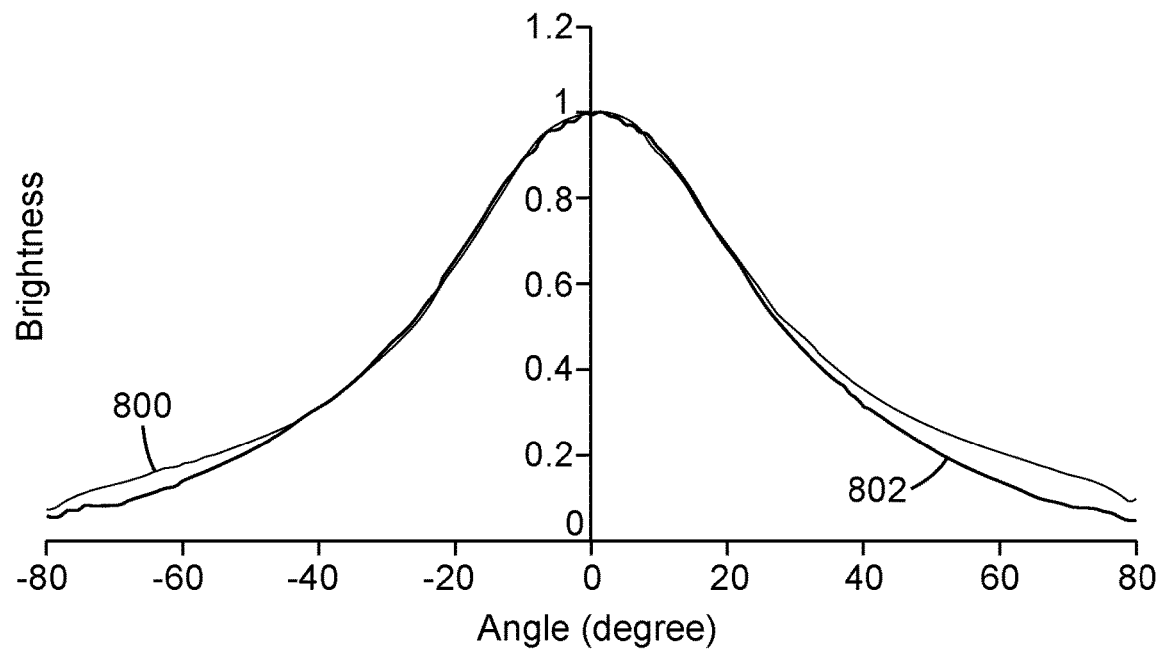
FIG. 8 is an example brightness profile for display assembly of FIG. 7.

FIG. 8 is an example brightness profile for display assembly 700 that includes optical film 702 as a function of viewing angle compared to a display assembly with an AP/RP film. Curve 800 represents the brightness profile for display assembly 700 optical film 702 while curve 802 represents the brightness profile for comparable display assembly including an AP/RP film (e.g., APCF available from Nitto Denko Corp (Tokyo)). As shown optical film 702 provides a comparative viewing brightness profile for normal viewing angle (e.g. ±20°) while providing a slight improvement in the brightness profile for off-axis viewing positions. (e.g., >50°).

In some such examples, the use of optical film 702 as opposed to traditional AP/RP films may result in an overall thickness of the LCD display assembly may be significantly reduced as high-contrast RP optical films described herein may be formed at approximately half the thickness of a traditional AP/RP film. While using only optical film 702 in display assembly 700 as opposed to an AP/RP film may result in benefits associated with a reduction of the display assembly thickness, in some examples, an absorption polarizer film may be optionally included between LCD assembly 710 and optical film 702 (not shown). In some such examples, the absorption polarizer/optical film 702 combination may provide improved brightness and/or contrast ratio compared traditional AP/RP films.

In some examples, optical film 702 of display assembly 700 may perform as a high-contrast RP to substantially transmit light having the first polarization state (a) and substantially reflect light having an orthogonal second polarization stated (b). In some examples, optical film 702 may define an average optical transmittance less than about 0.2% for the second polarization state (b), wherein no absorbing polarizer is disposed between light source 720 and the liquid crystal layer 716, and wherein a contrast ratio of display assembly 700 is at least twice that of a comparative display assembly having the same construction except that the average transmittance of the reflective polarizer of the comparative display assembly for the second polarization state is greater than about 1.0%.

In some examples, one or more of the optical films 100, 200, 400, 600 described herein may be incorporated into an optical system designed for displaying an object to a viewer centered on an optical axis (e.g., virtual reality display systems). Such optical systems may include one or more optical lenses having a non-zero optical power with a reflective polarizer (e.g., optical film 100, 200, 400, 600) disposed on and conforming to a first major surface of the one or more optical lenses and a partial reflector disposed on and conforming to a second major surface of the one or more optical lenses. In some examples, the lens and reflective polarizer may be convex about one or two orthogonal axes and disposed between a stop surface (e.g., an exit pupil or an entrance pupil) and an image surface (e.g., a surface of a display panel or a surface of an image recorder) to produce a system having a high field of view, a high contrast, a low chromatic aberration, a low distortion, and/or a high efficiency in a compact configuration that is useful in various devices including head-mounted displays, such as virtual reality displays, and cameras, such as cameras included in a cell phone, for example.

Figure 10:
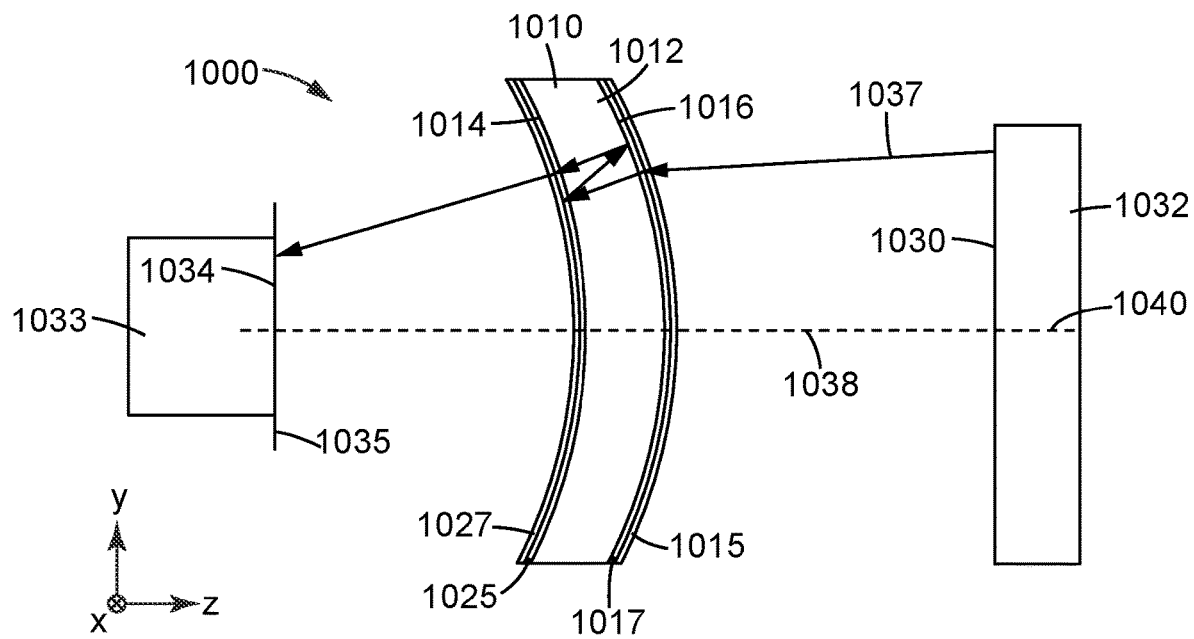
FIG. 10 is a schematic cross-sectional view of an example optical system including an optical film in the form of a reflective polarizer.

FIG. 10 is a schematic cross-sectional view of an example optical system 1000 (e.g., a virtual reality display system) that includes an image surface 1030, a stop surface 1035, and an optical stack 1010 disposed between the image surface 1030 and the stop surface 1035. An x-y-z coordinate system is provided in FIG. 10. Image surface 1030 may be an output surface of an image forming device such as a display panel that emits polarized or unpolarized light, while stop surface 1035 may be an exit pupil of optical system 1000 and may be adapted to overlap an entrance pupil of a second optical system, which may be a viewer's eye or a camera, for example.

In some examples, optical stack 1010 may include optical lens 1012 having first and second major surfaces 1014 and 1016, a reflective polarizer 1027 (e.g. optical film 100, 200, 400, 600) disposed on first major surface 1014, and a partial reflector 1017 disposed on second major surface 1016 of optical lens 1012. In some examples, optical stack 1010 may also include one or more quarter wave retarders 1015, 1025 disposed on respective first and second major surface 1014 and 1016.

As shown in FIG. 10, optical stack 1010 may be convex toward the image surface 1030 along orthogonal a first and/or a second axes (e.g., the x- and y-axes, respectively). Optical stack 1010 can be made by first forming reflective polarizer 1027 with an optional first quarter wave retarder 1025 coated or laminated to reflective polarizer 1027 and then thermoforming the resulting film into a desired shape to correspond to optical lens 1012. Partial reflector 1017 and optional second quarter wave retarder 1015 may be prepared by coating a quarter wave retarder onto a partial reflector film, by coating a partial reflector coating onto a quarter wave retarder film, by laminating a partial reflector film and a quarter wave retarder film together, or by first forming lens 1012 (which may be formed on a film that includes reflective polarizer 1027) in a film insert molding process and then coating the partial reflector 1017 on the second major surface 1016. In some examples, lens 1012 may be formed by injection molding lens 1012 between first and second films of the reflective polarizer 1027 and partial reflector 1017. The first and second films may be thermoformed prior to the injection molding step.

Image source 1031 includes the image surface 1030 and stop surface 1035 is an exit pupil for optical system 1000. In some examples, image source 1031 may be a display panel. In other examples, a display panel may not be present and, instead, image surface 1030 is an aperture adapted to receive light reflected from objects external to optical system 1000.

In some examples, a second optical system 1033 having an entrance pupil 1034 may be disposed proximate optical system 1000 with stop surface 1035 overlapping entrance pupil 1034. The second optical system 1033 may be a camera, for example, adapted to record images transmitted through image surface 637. In some examples, second optical system 1033 is a viewer's eye and entrance pupil 1034 is the pupil of the viewer's eye. In such examples, optical system 1000 may be adapted for use in a head-mounted display.

Reflective polarizer 1027 may be any one of optical films 100, 200, 400, 600 described herein. For example, reflective polarizer may include at least 50 sequentially numbered interference layers, each layer may be relatively thin (e.g., have an average thickness less than about 200 nm) where a fitted curve being a best-fit regression applied to a layer thickness profile reflective polarizer 1027 as a function of layer number, (e.g., curve 300 of FIG. 3), an average slope of the fitted curve in a region extending from the first layer to the Nth layer being less than about 0.2 nm/layer. Reflective polarizer 1027 substantially transmits light having a first polarization state (a) (e.g., linearly polarized in a first direction) and substantially reflects light having an orthogonal second polarization state (b) (e.g., linear polarized in a second direction orthogonal to the first direction).

Partial reflector 1017 has an average optical reflectance of at least 30% and optical transmission of at least 30% in the predetermined wavelength range, which may be any of the wavelength ranges described elsewhere herein. Any suitable partial reflector may be used. In some examples, partial reflector 1017 may be a half mirror, for example. In some examples, partial reflector 1017 may be constructed by coating a thin layer of a metal (e.g., silver or aluminum) on a transparent substrate. Additionally or alternatively, partial reflector 1017 may also be formed by depositing thin-film dielectric coatings onto a surface of a lens, or by depositing a combination of metallic and dielectric coatings on the surface of the lens, for example. In some examples, partial reflector 1017 may itself be a reflective polarizer.

The optional first and second quarter wave retarders 1015, 1025 may be a coating or film formed from any suitable material including, for example, linear photopolymerizable polymer (LPP) materials and the liquid crystal polymer (LCP) materials described in US Pat. App. Pub. Nos. US 2002/0180916 (Schadt et al.), US 2003/028048 (Cherkaoui et al.) and US 2005/0072959 (Moia et al.). Suitable LPP materials include ROP-131 EXP 306 LPP and suitable LCP materials include ROF-5185 EXP 410 LCP, both available from Rolic Technologies, Allschwil, Switzerland. In some examples, quarter wave retarders 1015, 1025 may be quarter wave retarders at at least one wavelength in the predetermined wavelength range.

During operation of optical system 1000, light rays 1037 and 1038 are each transmitted through the image surface 1030 and the stop surface 1035. Light rays 1037 and 1038 may each be transmitted from the image surface 1030 to the stop surface 1035 (in head-mounted display applications, for example), or light rays 1037 and 1038 may be transmitted from the stop surface 1035, to the image surface 1030 (in camera applications, for example). Light ray 1038 may be a central light ray whose optical path defines a folded optical axis 1040 for optical system 1000, which may be centered on the folded optical axis 1040. Light ray 1038 may pass through optical stack 1010 without significant deviation from optical axis 1040.

The path of light ray 1037 may be deflected due to optical stack 1010. Light ray 1037 is transmitted through partial reflector 1017 (including optional second quarter wave retarder 1015) into and through lens 1012. After making a first pass through lens 1012, the light ray passes through optional first quarter wave retarder 1025 and reflects from reflective polarizer 1027. In examples where two quarter wave retarders 1015, 1025 are incorporated into optical stack 1010, the quarter wave restarters 1015, 1025 may disposed both sides of lens 1012 such that the quarter wave retarders 1015, 1025 lie between reflective polarizer 1027 and image source 1031. In some such examples, image source 1031 may be adapted to emit light having a polarization along the pass axis (a) for reflective polarizer 1027 so that after passing through the quarter wave retarder 1015, 1025 the light becomes polarized along the block axis for the reflective polarizer 1027 and therefore reflects from the reflective polarizer 1027 when it is first incident on the film. After light ray 1037 initially reflects from reflective polarizer 1027, it passes back through the first quarter wave retarder 1025 and is then reflected from partial reflector 1017 (other light rays not illustrated are transmitted through partial reflector 1017) back through lens 1012 and first quarter wave retarder 1025 and is then again incident on the reflective polarizer 1027. After passing through first quarter wave retarder 1025, reflecting from partial reflector 1017 and passing back through first quarter wave retarder 1025, light ray 1037 has a polarization along the pass axis (a) for reflective polarizer 1027. Light ray 1037 is therefore transmitted through reflective polarizer 1027 and is then transmitted through stop surface 1035 into second optical system 1033.

The design of the single integrated optical stack 1010 may provide a high field of view in a compact system. Light ray 1037, which is transmitted through an outer edge of image surface 1030, is a chief ray that intersects stop surface 1035 at the folded optical axis 1040 with a view angle of θ, which may be at least 40 degrees, at least 45 degrees, or at least 50 degrees, for example. The field of view at the stop surface 1035 is 2θ, which may be at least 80 degrees, at least 90 degrees, or at least 100 degrees, for example.

In some non-limiting examples, optical system 1000 may include one or more optical lenses 1012 having a non-zero optical power, reflective polarizer 1027 disposed on and conforming to a first major surface 1014 of one or more optical lenses 1012, and partial reflector 1017 disposed on and conforming to a different second major surface 1016 of the one or more optical lenses 1012. Reflective polarizer 1027 may substantially transmit light 1037 having a first polarization state (a) and substantially reflecting light having an orthogonal second polarization state (b) with partial reflector 1017 having an average optical reflectance of at least 30% for a predetermined wavelength range, such that an average optical transmittance of optical system 1000 for an incident light 1037 along the optical axis 1040 having the second polarization state (b) is less than about 0.1%.

Additional examples of optical systems for displaying an object to a viewer centered on an optical axis that include one or more reflective polarizers are disclosed and described in U.S. patent application Ser. No. 14/865,017, which is incorporated herein by reference in its entirety. One or more of the optical films 100, 200, 400, 600 described herein can be used in such systems as the reflective polarizers described therein.

In some examples, one or more of the optical films 100, 200, 400, 600 described herein may be incorporated as the reflective polarizer in a polarizing beam splitter (PBS). A PBS may be used to effectively split unpolarized light into two polarized states. PBS systems may be used in semiconductor, photonics instrumentation, or other optical systems to substantially transmit light in a first polarization state (a) while substantially reflecting polarized light in a second orthogonal polarization state (b). In some examples, the PBS systems may be designed receive light at a 0° or 45° angle of incidence while splitting output polarized beams at about a 90° of separation.

Figure 11:
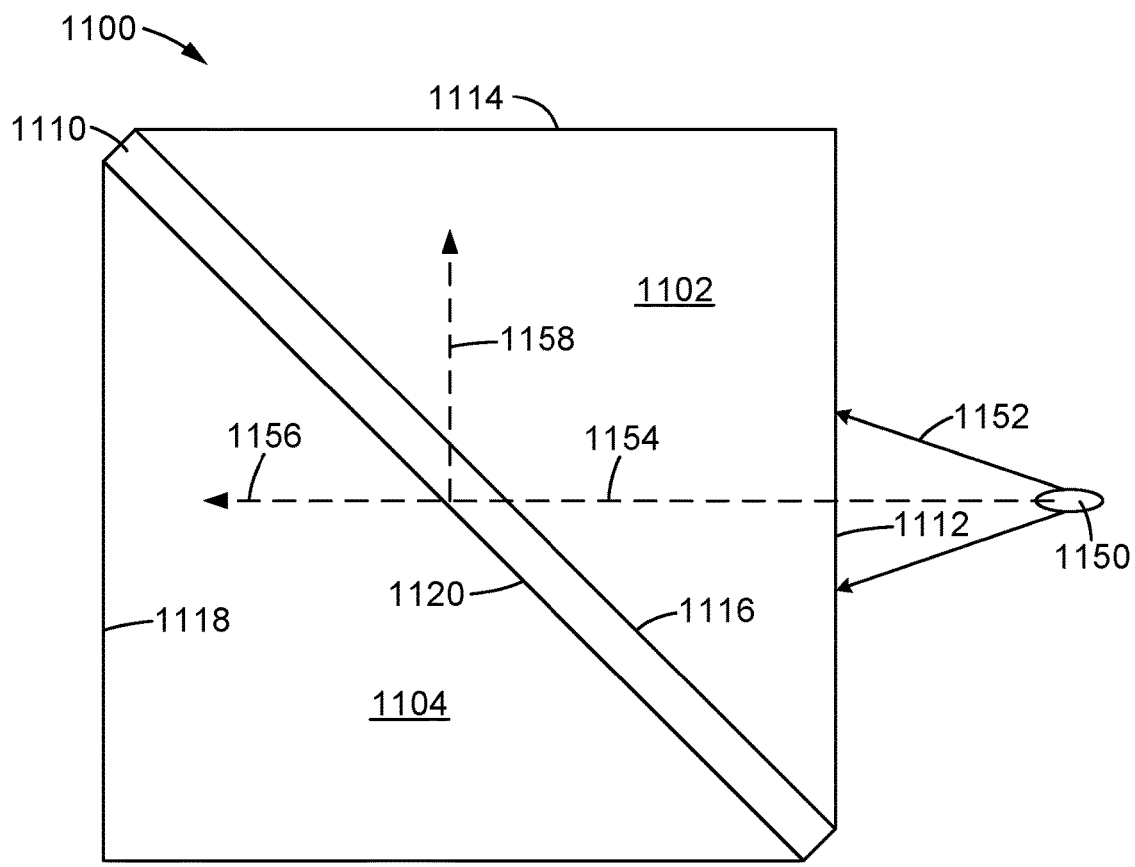
FIG. 11 is a schematic cross-sectional view of an example polarized beam splitter including an optical film in the form of a reflective polarizer.

FIG. 11 is a schematic cross-sectional view of an example PBS 1100 that includes a first prism 1102, a second prism 1104, a reflective polarizer 1110, and light source 1150. First prism 1102 includes input face 1112 for receiving incident light from light source 1150, output face 1114 and first hypotenuse 1116. In some examples, input face 1112 and output faces 114 may be further shaped to have an active area for receiving and transmitting light passing through first prism 1102. Second prism 1104 includes an output surface 1118 and second hypotenuse 1120.

Reflective polarizer 1110 is disposed between first and second hypotenuses 1116 and 1120 of the respective first and second prisms 1102 and 1104. Reflective polarizer 1110 may include any of the optical films 100, 200, 400, 600 describe herein. For example, reflective polarizer 1110 may include at least 50 sequentially numbered interference layers, each layer may be relatively thin (e.g., have an average thickness less than about 200 nm) where a fitted curve being a best-fit regression applied to a layer thickness profile reflective polarizer 1110 as a function of layer number, (e.g., curve 300 of FIG. 3), an average slope of the fitted curve in a region extending from the first layer to the Nth layer being less than about 0.2 nm/layer.

First and second prisms 1102, 1104 may include glass or polymeric materials. Suitable polymeric materials for first and second prisms 1102, 1104 include, for example, transparent optical polymers such as acrylic polymers (e.g., polymethylmethacrylates), cyclic-olefin copolymers, polycarbonates, and combinations thereof. In some examples, first and second prisms 1102, 1104 may be formed by injection molding using thermoplastic acrylic polymers such as acrylic polymers commercially available under the trade designation "OPTOREZ OZ-1330" Series polymers from Hitachi Chemical Company, Ltd, Tokyo, Japan. In some examples, it may desirable to form first and second prisms 1102, 1104 using the same polymeric materials to reduce optical variations between the two prisms, however in other examples first and second prisms 1102, 1104 may be formed with different materials. In some examples, first and second prisms 1102, 1104 may be similarly sized while in other examples, first prism 1102 may have a volume that is less than the volume of second prism 1104. In some examples, the volume of first prism 1102 may be no greater than about half (or no greater than about 60 percent, or no greater than about 40 percent) of the volume of the second prism 1104. The selection of which portions of first prism 1102 that may be removed may depend in part on the optical paths of the incidence, transmitted, and reflected light originating within envelop 1152.

During operation, light source 1150 produces a light beam having an envelope 1152 that includes central light ray 1154. Light from light source 1150 may be non-polarized having a predetermined wavelength range. Central light ray 1154 enters first prism 1102 through input surface 1112 where it then transmits through the prism and becomes incident on reflective polarizer 1110 at an incidence angle of about 45°. At such point, central light ray 1154 then transmits through and reflects off reflective polarizer 1110 in accordance to the polarization state of the light. For example, light corresponding to the first polarization state (a) (e.g., the pass-state) passes through reflective polarizer 1110 and continues through second prism 1104 as transmitted light ray 1156 having first polarization state (a) where it reaches output surface 1118. Light corresponding to the second orthogonal polarization state (b) (e.g., the block/reflect) will reflect off the reflective polarizer 1110 as reflected light ray 1158 having second orthogonal polarization state (b). Due to the angle of incidence between light ray 1154 and reflective polarizer 1110, reflected light ray 1158 with will reflect off reflective polarizer 1110 in the direction of output face 1114. In some examples, transmitted light ray 1156 and reflected light ray 1158 will progress at 90° to one another.

PBS 1100 may include additional components (not shown) attached to one or more of the output or other faces of first and second prisms 1102, 1104. Additionally or alternatively, PBS 1100 may be incorporated in different optical systems. The various components or PBS 1100 or those components attached to PBS 1100 could be in direct contact or attached through an optically clear adhesive. In some examples, reflective polarizer 1110 is attached to one or both of first and second prisms 1102, 1104 using optically clear adhesive layers. Additional examples of PBS designs and optical systems incorporating PBS systems are disclosed and described in U.S. patent application Ser. No. 14/865, 017, which is incorporated herein by reference in its entirety.

In some non-limiting examples, PBS 1100 may include first and second prisms 1102, 1104 and reflective polarizer 1110 disposed between and adhered to first and second prisms 1102, 1104 (e.g., along first and second hypotenuses 1116, 1120). In such examples, reflective polarizer 1110 may substantially reflect polarized light having a first polarization state (a) and substantially transmit polarized light having an orthogonal second polarization state (b), such that when incident light (e.g., light ray 1154) having a predetermined wavelength enters PBS 1100 from input face 1112 of PBS 1100 and exits through an output face of PBS 1110 (e.g., output face 1118 or 1114) after encountering reflective polarizer 1110 at least once, a ratio of an average intensity of the exiting light (e.g., transmitted light ray 1156 or reflected light ray 1158) to an average intensity of the incident light (e.g., light ray 1154) is greater than about 90% when the incident light has the first polarization state (a), and less than about 0.2% when the incident light has the second polarization state (b).

EXAMPLES

Example 1—A birefringent reflective polarizer optical film was prepared as follows. Two multilayer optical packets were co-extruded with each packet comprised of 325 alternating layers of polyethylene naphthalate (PEN) and a low index isotropic layer, which was made with a blend of polycarbonate and copolyesters (PC:coPET) such that the index is about 1.57 and remains substantially isotropic upon uniaxial orientation, wherein the PC:coPET molar ratio is approximately 42.5 mol % PC and 57.5 mol % coPET and has a Tg of 105 degrees centigrade. This isotropic material was chosen such that after stretching its refractive indices in the two non-stretch directions remains substantially matched with those of the birefringent material in the non-stretching direction while in the stretching direction there is a substantial mis-match in refractive indices between birefringent and non-birefringent layers. The PEN and PC/coPET polymers were fed from separate extruders to a multilayer coextrusion feedblock, in which they were assembled into packets of 325 alternating optical layers ("Packet 1" and "Packet 2" respectively), plus a thicker protective boundary layer of the PC/coPET, on the outside of the stacked optical packets, for a total of 652 layers.

Figure 9:
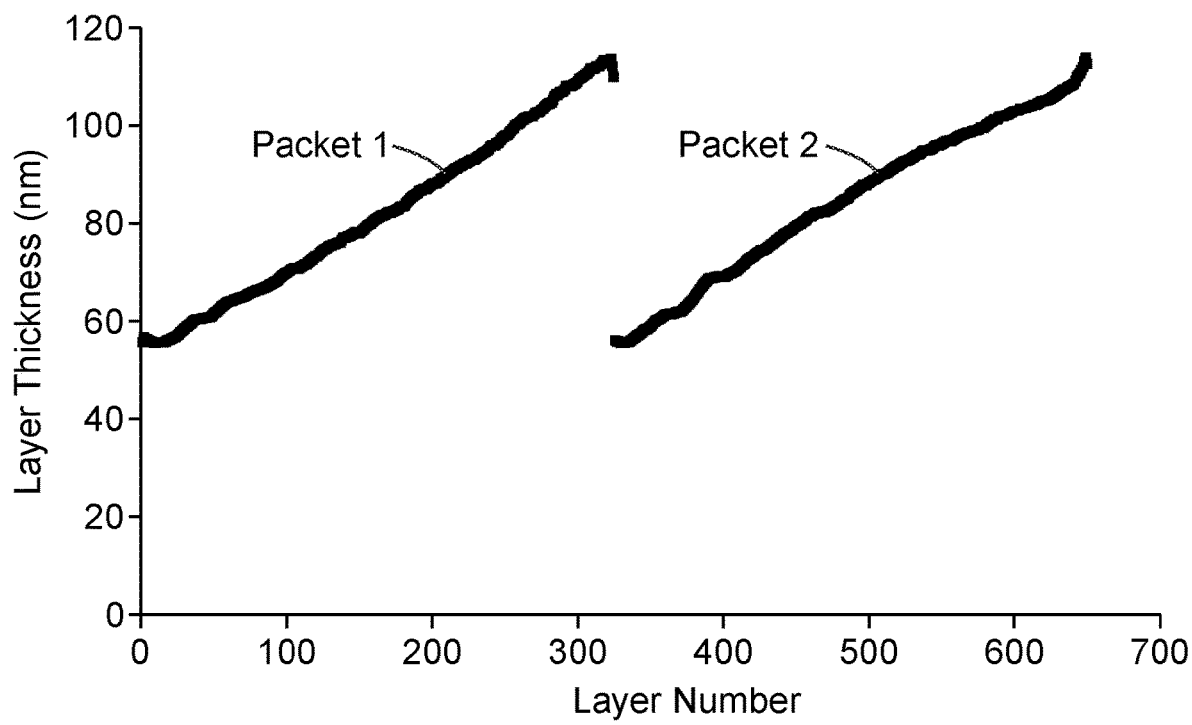
FIG. 9 is a plot showing the layer profile for Example 1.

This layer profile for the high contrast reflective polarizer (HCRP) optical film of Example 1 is shown in FIG. 9 with Packets 1 and 2 indicated. The average slope of Packet 1 was about approximately 0.17 nm/layer and the average slope of Packet 2 was approximately 0.18 nm/layer using a least squares linear regression, exhibiting a difference in the respective slopes for the two packets of approximately 6%. The film of Example 1 had a resulting total thickness as measured by a capacitance gauge of approximately 63.2 µm.

To assess the alignment of the plurality of interference layers of Example 1, the optical axis of the film was determined for linearly polarized light incident on each respective major surface of the film. The optical axis of a film corresponds to the orientation of incoming polarized light within the plane of the film that allows the minimum amount of linearly polarized light to pass through the film (e.g., aligned with stretch axis 120 of FIG. 2). In an ideal scenario, the optical axis of the film would be the same regardless of the surface that the polarized light enters the film. However, due to variations in the manufacturing process or misalignment of the individual optical axes of the plurality of interference layers, the optical axis of the film may be dependent on which surface the polarized light enters. In some examples, the greater the degree of misalignment between the plurality of layers, the greater the difference of the optical axes may be for the film. The difference between the optical axes of the film for the two surfaces may, in some examples, be used as a metric for assessing the alignment between the plurality of interference layers. The two optical axes for the film of Example 1 was measured for the two surfaces using linearly polarized light. The polarized light was projected directly at the first major surface of the film and the film was rotated until the minimum amount of the polarized light passed through the film. The optical axis for the first major surface was then marked as being parallel to the polarization axis of the polarized light. The process was repeated for the second major surface of the film. The difference between the optical axes for the first major surface and the second major surface for the film of Example 1 was determined as less than 0.1 degrees indicating strong alignment among the plurality of interference layers.

Example 2—A birefringent reflective polarizer optical film was made with the same process conditions as the Film of Example 1 except the optical film was made to an overall thickness of approximately 66.7 μm as measured by a capacitance gauge.

Example 3—A birefringent reflective polarizer optical film was prepared as follows. Two multilayer optical packets were co-extruded with each optical packet comprised of 325 alternating layers of 90/10 coPEN (e.g., 90 mol % polyethylene naphthalate (PEN) and 10 mol % polyethylene terephthalate (PET)) and a low index isotropic layer of PC/coPET as described above in Example 1. The 90/10 coPEN and PC/coPET polymers were fed from separate extruders to a multilayer coextrusion feedblock, in which they were assembled into packets of 325 alternating optical layers, plus a thicker protective boundary layer of the PC:coPET, on the outside of the stacked optical packets, for a total of 652 layers. This film had a resulting physical total thickness as measured by a capacitance gauge of approximately 63.2 μm.

Table 1 below provides comparative average transmission profiles for the first and second polarization states (a) and (b) (e.g., pass-axis and block-axis) across the visible spectrum range of 450-650 nm for the optical films of Examples 1-3, compared to commercially available absorption polarizer (AP) and reflective polarizers (RP), and those referenced in literature.

TABLE 1

| Film Sample | $T_a$ (%) | $T_b$ (%) | Contrast Ratio | Optical Density |
|---|---|---|---|---|
| Example AP | 85.1 | 0.007 | 13,092:1 | 4.16 |
| Example commercial RP 1 (3M, St. Paul, MN) | 89.9 | 4.633 | 26:1 | 1.40 |
| Example commercial RP 2 (3M, St. Paul, MN) | 87.6 | 4.988 | 21:1 | 1.34 |
| Example commercial RP 3 (3M, St. Paul, MN) | 87.7 | 2.020 | 50:1 | 1.73 |
| Example literature RP | 90.4 | 2.035 | 48:1 | 1.71 |
| Example 1 (HCRP) | 90.0 | 0.015 | 11,207:1 | 3.97 |
| Example 2 (HCRP) | 90.0 | 0.069 | 4,060:1 | 3.49 |
| Example 3 (HCRP) | 89.5 | 0.059 | 2,659:1 | 3.37 |

Table 2 below represents the transmission and reflectance values in the first polarization state (a) and orthogonal second polarization state (b) calculated for Example films 1-3 based on the values in Table 1. The values are calculated assuming negligible loss of light energy associated with absorption by the film layers.

TABLE 2

| Film Sample | $T_a$ (%) | $T_b$ (%) | $R_a$ (%) | $R_b$ (%) | $T_b/R_b$ | $R_a/T_a$ | $\Delta n_x$ $(n1_x - n2_x)$* | $(n1_x:n2_x)$* |
|---|---|---|---|---|---|---|---|---|
| Example 1 (HCRP) | 90 | 0.015 | 10 | 99.985 | 0.00015 | 0.11111 | 0.25 | 1.16 |
| Example 2 (HCRP) | 90 | 0.069 | 10 | 99.931 | 0.00069 | 0.11111 | 0.25 | 1.16 |
| Example 3 (HCRP) | 89.5 | 0.059 | 10.5 | 99.941 | 0.00059 | 0.11732 | 0.25 | 1.16 |

*Determined for 633 nm

Figure 12:
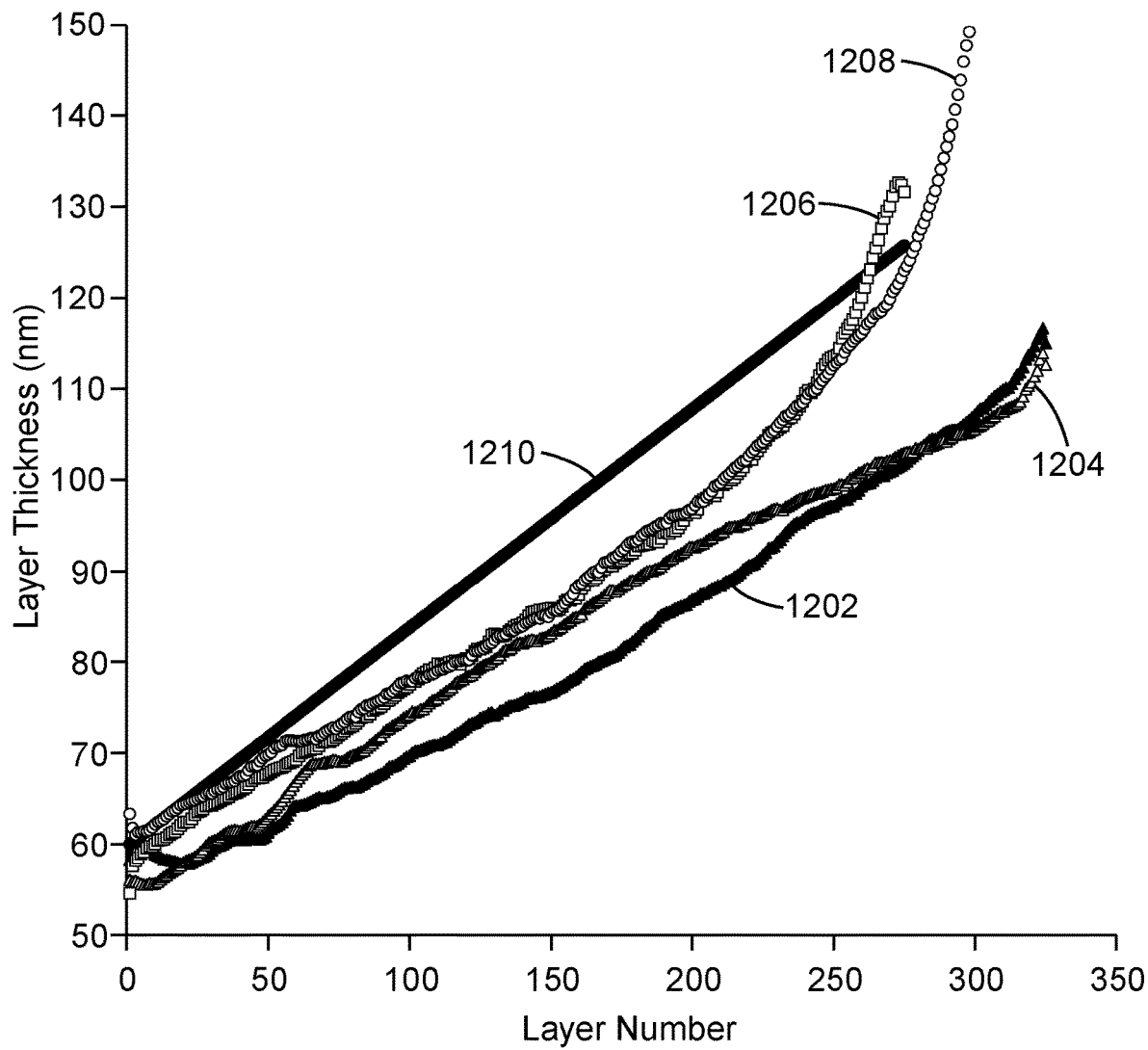
FIG. 12 is a plot of example thickness profiles (layer thickness vs layer number) for example reflective polarizer films as described herein compared to conventional reflective polarizer films.

FIG. 12 is a plot of example thickness profiles (layer thickness vs layer number) for example reflective polarizer films as described here compared to conventional reflective polarizers. The films are described below in Table 3. Films 1206 and 1208 represent commercially available multilayer reflective polarizer films available from 3M, Saint Paul, MN. Film 1210 is a representative conventional polarizer film having 275 layers with a maximum to minimum thickness ratio of 2.2 where the thickness continuously varies as described in that patent. Lines 1202 and 1204 correspond to the first and second optical stacks/packets respectively of HCPR Example 1. The layer thickness profiles were measured using an Atomic Force Microscope (AFM).

TABLE 3

| Film Sample | Average Slope (nm/layer) | Optical Density Avg (450-650 nm) |
|---|---|---|
| Example 1 (HCRP) (Packet 1 - 1202) | 0.18 | 3.37 |
| Example 1 (HCRP) (Packet 2 - 1204) | 0.17 | 3.37 |
| Example commercial RP 2 (3M, St. Paul, MN) - Film 1208 | 0.226 | 1.40 |

TABLE 3-continued

| Film Sample | Average Slope (nm/layer) | Optical Density Avg (450-650 nm) |
|---|---|---|
| Example commercial RP 3 (3M, St. Paul, MN) - Film 1206 | 0.211 | 1.73 |
| Example conventional RP - Film 1210 | 0.24 | 1.83 |

Table 4 below represents the calculated difference between the highest slope region and the lowest slope region for each of films/packets 1202-1208 shown in FIG. 12. The respective slope for a give region was determined using a least squares linear regression over a range of 25 layers.

TABLE 4

| Film Sample | Difference between max and min slopes (nm/layer) |
|---|---|
| Example 1 (HCRP) (Packet 1 - 1202) | 0.48 |
| Example 1 (HCRP) (Packet 2 - 1204) | 0.24 |
| Example commercial RP 2 (3M, St. Paul, MN) - Film 1208 | 1.47 |
| Example commercial RP 3 (3M, St. Paul, MN) - Film 1206 | 0.75 |

Example 4—An optical film was produced using a similar manufacturing processes as described with respect to Examples 1, 2, and 3. An alternate layer thickness profile was implemented that utilized a lower slope/layer profile than that of Examples 1, 2, and 3. In particular, two multilayer optical stacks/packets were co-extruded with each containing 325 alternating layers of HIR layer of polyethylene naphthalate (PEN) and a LIR isotropic layer which was made with a blend of 20 wt % PETg (Eastman Chemicals, Knoxville, TN) and 80 wt % Xylex (Sabic, Houston, TX), an alloy of polycarbonate and copolyester. The refractive index of the LIR layer was approximately 1.57 and remained substantially isotropic upon uniaxial orientation. This isotropic material was chosen such that after stretching its refractive index in the stretched direction remained substantially unchanged and similar to that of the refractive index of the HIR layer in the non-stretched direction, while the refractive index of the HIR layer in the stretched direction had a substantial mismatch to the refractive index LIR layer in the same direction. The materials for the HIR and LIR layers were fed from separate extruders supplying a multilayer coextrusion feedblock in which they were assembled into two packets of 325 alternating optical layers, plus a thicker protective boundary layer of the isotropic LIR material on each side of each packet, for a total of 653 layers, where the spacer layers between the stacked optical packet optically and mechanically is considered a single layer. The first packet (e.g., "Packet 1") was composed of relatively thin alternating HIR/LIR layers while the second packet (e.g., "Packet 2") composed of relatively thick alternating HIR/LIR layers to correspond to predetermined wavelength ranges of approximately 390 nm to 620 nm and 600 nm to 900 nm respectively. The film was stretched in a parabolic tenter as described in U.S. Pat. No. 6,916,440 which is incorporated by reference in its entirety. The film was stretched at a temperature of approximately 316° F. (e.g., 158° C.). The film was stretched at approximately a 6:1 ratio in the transverse direction and approximately a 0.46:1 ratio in the machine direction, that is the film is relaxed in the machine direction.

FIG. 13 shows a plot of the layer thickness profile for the optical film of Example 4 obtained by AFM. The average slope of Packet 1 was calculated at approximately 0.104 nm/layer and the average slope of Packet 2 was calculated at approximately 0.141 nm/layer using a least squares linear regression. The film of Example 4 had a resulting total thickness as measured by a capacitance gauge of approximately 65.7 µm. The average pass state transmission ($T_a$) was approximately 89.1% and the average block/reflected state transmission ($T_b$) was approximately 0.057% evaluated over the wavelength range of 450-650 nm.

Figure 14:
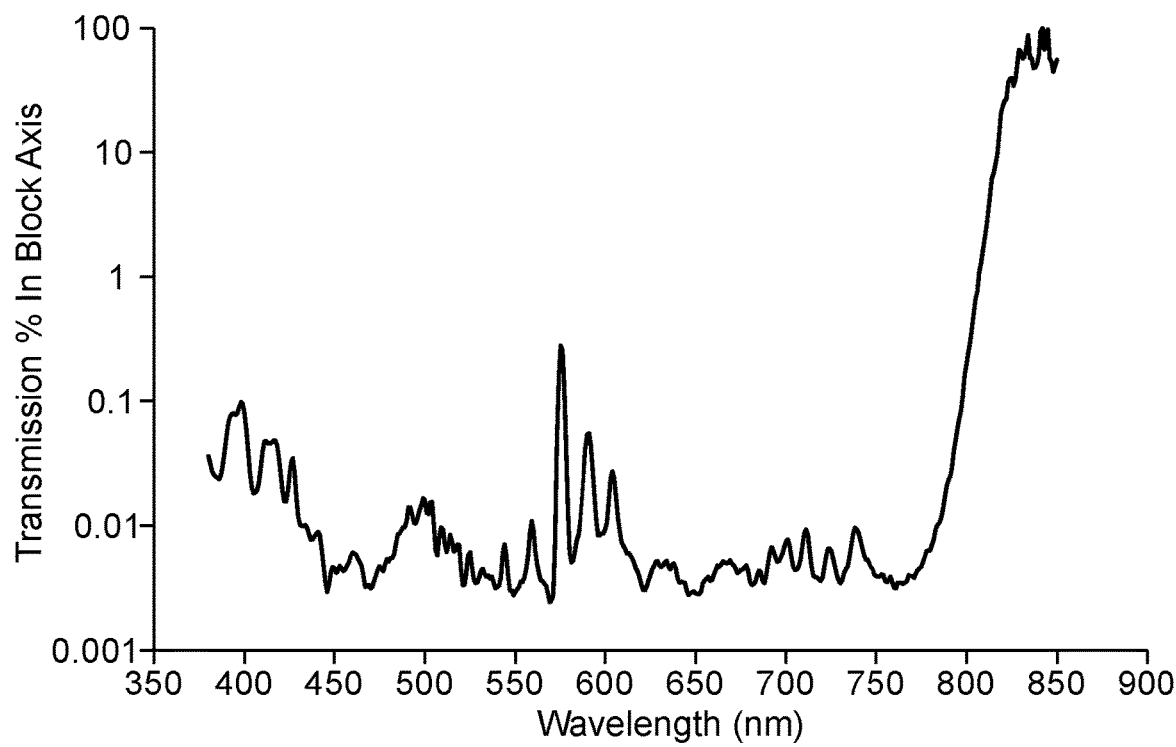
FIG. 14 shows a plot of the block state transmission ($T_b$) for the film of Example 6 over the wavelength range of 375-850 nm.

FIG. 14 shows a plot of the block state transmission ($T_b$) for the film of Example 4 over the wavelength range of 375-850 nm.

Example 5—Table 5 below shows the $\Delta n_x/K$ ratio for the optical films of Examples 1 and 4 described above compared to Example commercial RP 2 and RP 3. As shown, each respective packet of the optical films of Examples 1 and 4 show a $\Delta n_x/K$ ratio of greater than 1.2 while the Example commercial RP 2 and RP 3 have a $\Delta n_x/K$ ratio of less than 1.

TABLE 5

| Film Sample | $\Delta n_x$ | K | $\Delta n_x/K$ |
|---|---|---|---|
| Example 1 (HCRP) (Packet 1) | 0.25 | 0.172 | 1.45 |
| Example 1 (HCRP) (Packet 2) | 0.25 | 0.177 | 1.41 |
| Example 4 (HCRP) ($1^{st}$ Packet) | 0.25 | 0.141 | 1.77 |
| Example 4 (HCRP) ($2^{nd}$ Packet) | 0.25 | 0.103 | 2.43 |
| Example commercial RP 2 (3M, St. Paul, MN) | 0.22 | 0.227 | 0.97 |
| Example commercial RP 3 (3M, St. Paul, MN) | 0.2 | 0.247 | 0.81 |

Example 6—Table 5 below shows the optical density, optical power, and other optical properties for the optical film of Example 1. Also included in Table 5, are the results obtained for twenty four comparative samples of conventional reflective polarizer films. The comparative samples correspond to various polarizer films obtained either commercially or prepared using techniques disclosed in literature. The optical power per layer versus the total number of layers for the films listed in Table 6 are plotted in FIG. 15. As shown in FIG. 15, the optical film of Examples 1 and 4 each exhibit an optical power per layer greater than (−0.0012*N+1.46) (designated by line).

TABLE 6

| Film Sample | Total Layers | $T_a$ (%) | $T_b$ (%) | Optical Density | Left Band Edge (nm) | Right Band Edge (nm) | Optical Power | Optical Power/layer |
|---|---|---|---|---|---|---|---|---|
| Example 1 (HCRP) | 650 | 90.5 | 0.02 | 3.70 | 420 | 924 | 480 | 0.74 |
| Example 4 (HCRP) | 650 | 90.1 | 0.01 | 3.90 | 420 | 924 | 509 | 0.78 |
| Comparative Sample 1 | 274 | 32 | 0.5 | 2.30 | 420 | 924 | 299 | 1.09 |

TABLE 6-continued

| Film Sample | Total Layers | $T_a$_(%) | $T_b$_(%) | Optical Density | Left Band Edge (nm) | Right Band Edge (nm) | Optical Power | Optical Power/layer |
|---|---|---|---|---|---|---|---|---|
| Comparative Sample 2 | 275 | 36 | 1.4 | 1.85 | 420 | 924 | 241 | 0.88 |
| Comparative Sample 3 | 275 | 90 | 1 | 2.00 | 420 | 924 | 260 | 0.94 |
| Comparative Sample 4 | 825 | 89 | 0.5 | 2.30 | 420 | 924 | 299 | 0.36 |
| Comparative Sample 5 | 550 | 89.9 | 0.4 | 2.40 | 420 | 924 | 311 | 0.57 |
| Comparative Sample 6 | 550 | 89.7 | 0.4 | 2.40 | 420 | 924 | 311 | 0.57 |
| Comparative Sample 7 | 550 | 89.9 | 0.5 | 2.30 | 420 | 924 | 299 | 0.54 |
| Comparative Sample 8 | 550 | 89.9 | 0.4 | 2.40 | 420 | 924 | 311 | 0.57 |
| Comparative Sample 9 | 825 | 89.9 | 0.2 | 2.70 | 420 | 924 | 351 | 0.42 |
| Comparative Sample 10 | 550 | 89.9 | 0.4 | 2.40 | 420 | 924 | 311 | 0.57 |
| Comparative Sample 11 | 275 | 89.2 | 1 | 2.00 | 420 | 924 | 260 | 0.94 |
| Comparative Sample 12 | 275 | 89.2 | 0.5 | 2.30 | 420 | 924 | 299 | 1.09 |
| Comparative Sample 13 | 275 | 89.2 | 1 | 2.00 | 420 | 924 | 260 | 0.94 |
| Comparative Sample 14 | 550 | 89.2 | 0.7 | 2.15 | 420 | 924 | 280 | 0.51 |
| Comparative Sample 15 | 550 | 89.8 | 0.5 | 2.30 | 420 | 924 | 299 | 0.54 |
| Comparative Sample 16 | 550 | 89.8 | 0.4 | 2.40 | 420 | 924 | 311 | 0.57 |
| Comparative Sample 17 | 550 | 90.3 | 0.2 | 2.70 | 420 | 924 | 351 | 0.64 |
| Comparative Sample 18 | 550 | 89.2 | 0.3 | 2.52 | 420 | 924 | 328 | 0.60 |
| Comparative Sample 19 | 550 | 89.2 | 0.4 | 2.40 | 420 | 924 | 311 | 0.57 |
| Comparative Sample 20 | 550 | 89.2 | 0.7 | 2.15 | 420 | 924 | 280 | 0.51 |
| Comparative Sample 21 | 550 | 89.2 | 0.7 | 2.15 | 420 | 924 | 280 | 0.51 |
| Comparative Sample 22 | 825 | 89.2 | 0.5 | 2.30 | 420 | 924 | 299 | 0.36 |
| Comparative Sample 23 | 275 | 89.2 | 0.9 | 2.05 | 420 | 924 | 266 | 0.97 |
| Comparative Sample 24 | 275 | 89.2 | 1 | 2.00 | 420 | 924 | 260 | 0.94 |

Example 7—A comparative display assembly study was performed using the LCD display of an iPad4 (Apple Computer, Cuppertino, CA). Three reflective polarizers were tested in the display assembly as the rear reflective polarizer (e.g., position of optical film 702 in display assembly 700). The reflective polarizer tested included the stock RP film of the iPad4 laminated to a polyvinyl alcohol type of adsorbing polarizer ("Comparative AP/RP film"); the stock RP film of the iPad4 without the presence of the RP ("Comparative RP film"); and the high contrast reflective polarizer optical film of Example 1. The bonding adhesive used to adhere the polarizer optical films to the LCD display was clear OCA 8171 available from 3M Company, St. Paul, MN. The light source used for the testing was the stock backlight with brightness enhancement films (e.g., prism film/prism film/diffuser sheet) provided with the iPad4 device.

The optical performance of the three different display assemblies was examined using a commercial conoscope ELDIM L80 (ELDIM SA, Hérouville-Saint-Clair, France). The brightness and contrast results for the display assemblies are shown in Table 7 with the values normalized to with respect to the Comparative AP/RP film. As shown from the results. The optical film of Example 1 showed superior brightness compared to both the Comparative AP/RP and RP films. Additionally, the optical film of Example 1 exhibited a contrast ratio that was far greater than that of the stock Comparative RP film alone and remained comparable to that of the Comparative AP/RP despite the absence of a rear AP layer in the display assembly.

TABLE 7

| Film Sample in Display Test | Brightness* | Contrast Ratio |
|---|---|---|
| Comparative AP/RP film | 100% | 1000:1 |
| Comparative RP film | 102% | 25:1 |
| Example 1 (HCRP) | 112% | 580:1 |

*Values are normalized with respect to the Comparative AP/RP film

Clause 1: In one example, an optical film including a plurality of interference layers, each interference layer reflecting or transmitting light primarily by optical interference, a total number of the interference layers less than about 1000, such that for a substantially normally incident light in a predetermined wavelength range, the plurality of interference layers has an average optical transmittance greater than about 85% for a first polarization state, an average optical reflectance greater than about 80% for an orthogonal second polarization state, and an average optical transmittance less than about 0.2% for the second polarization state.

Clause 2: In some examples of the optical film of clause 1, the plurality of interference layers has an average optical transmittance greater than about 90% for the first polarization state in the predetermined wavelength range.

Clause 3: In some examples of the optical film of clause 1, the plurality of interference layers has an average optical transmittance greater than about 95% for the first polarization state in the predetermined wavelength range.

Clause 4: In some examples of the optical film of clause 1, the plurality of interference layers has an average optical transmittance greater than about 98% for the first polarization state in the predetermined wavelength range.

Clause 5: In some examples of the optical film of any of the proceeding clauses, the plurality of interference layers has an average optical transmittance less than about 0.15% for the second polarization state in the predetermined wavelength range.

Clause 6: In some examples of the optical film of any of the proceeding clauses, the plurality of interference layers has an average optical transmittance less than about 0.10% for the second polarization state in the predetermined wavelength range.

Clause 7: In some examples of the optical film of any of the proceeding clauses, such that for light incident on the optical film at an incidence angle of about 10 degrees in the predetermined wavelength range, the plurality of interference layers has an average optical transmittance greater than about 85% for the first polarization state, an average optical reflectance greater than about 80% for the second polarization state, and an average optical transmittance less than about 0.2% for the second polarization state.

Clause 8: In some examples of the optical film of any of the proceeding clauses, such that for light incident on the optical film at an incidence angle of about 20 degrees in the predetermined wavelength range, the plurality of interference layers has an average optical transmittance greater than about 85% for the first polarization state, an average optical reflectance greater than about 80% for the second polarization state, and an average optical transmittance less than about 0.2% for the second polarization state.

Clause 9: In some examples of the optical film of clause 1, such that for light incident on the optical film at an incidence angle of about 30 degrees in the predetermined wavelength range, the plurality of interference layers has an average optical transmittance greater than about 85% for the first polarization state, an average optical reflectance greater than about 80% for the second polarization state, and an average optical transmittance less than about 0.2% for the second polarization state.

Clause 10: In one example, an optical film including a plurality of interference layers, each interference layer reflecting or transmitting light primarily by optical interference, a total number of the interference layers less than about 1000, such that for a substantially normally incident light in a predetermined wavelength range, the optical film has an average optical transmittance $T_a$ and an average optical reflectance $R_a$ for a first polarization state, and an average optical transmittance $T_b$ and an average optical reflectance $R_b$ for an orthogonal second polarization state, $T_b/T_b$ less than about 0.002 and $R_a/T_a$ less than about 0.17.

Clause 11: In some examples of the optical film of clause 10, $T_a/T_b$ is greater than about 425.

Clause 12: In some examples of the optical film of clause 10 or 11, $R_b/R_a$ is greater than about 6.7.

Clause 13: In some examples of the optical film of any of clauses 10 to 12, the $T_a$ for the plurality of interference layers is greater than about 90% in the predetermined wavelength range.

Clause 14: In some examples of the optical film of any of clauses 10 to 13, the $T_a$ for the plurality of interference layers is greater than about 95% in the predetermined wavelength range.

Clause 15: In some examples of the optical film of any of clauses 10 to 14, the $T_a$ for the plurality of interference layers is greater than about 98% in the predetermined wavelength range.

Clause 16: In some examples of the optical film of any of clauses 10 to 15, the $T_b$ is less than about 0.15% in the predetermined wavelength range.

Clause 17: In some examples of the optical film of any of clauses 10 to 16, the $T_b$ is less than about 0.10% in the predetermined wavelength range.

Clause 18: In some examples of the optical film of any of clauses 10 to 17, such that for light incident on the optical film at an incidence angle of about 10 degrees in the predetermined wavelength range, the $T_a$ is greater than about 85%, the $R_b$ is greater than about 80%, and $T_b$ is less than about 0.2%.

Clause 19: In some examples of the optical film of any of clauses 10 to 18, such that for light incident on the optical film at an incidence angle of about 20 degrees in the predetermined wavelength range, the $T_a$ is greater than about 85%, the $R_b$ is greater than about 80%, and $T_b$ is less than about 0.2%.

Clause 20: In some examples of the optical film of any of clauses 10 to 19, such that for light incident on the optical film at an incidence angle of about 30 degrees in the predetermined wavelength range, the $T_a$ is greater than about 85%, the $R_b$ is greater than about 80%, and $T_b$ is less than about 0.2%

Clause 21: In some examples of the optical film of any of the preceding clauses, the optical film including at least one non-interference layer disposed between two interference layers, each of the at least one non-interference layer not reflecting or transmitting light primarily by optical interference.

Clause 22: In some examples of the optical film of clause 21, an average thickness of each of the at least one non-interference layer is at least 10 times a largest wavelength in the predetermined wavelength range.

Clause 23: In some examples of the optical film of clause 21, an average thickness of each of the at least one non-interference layer is at least 50 times a largest wavelength in the predetermined wavelength range.

Clause 24: In some examples of the optical film of any of the preceding clauses, the predetermined wavelength range is from about 400 nm to about 700 nm.

Clause 25: In some examples of the optical film of any of the preceding clauses, the predetermined wavelength range is from about 400 nm to about 700 nm and from about 800 nm to about 1300 nm.

Clause 26: In some examples of the optical film of any of the preceding clauses, the total number of the interference layers is less than about 900.

Clause 27: In some examples of the optical film of any of the preceding clauses, the total number of the interference layers is less than about 800.

Clause 28: In some examples of the optical film of any of the preceding clauses, the optical film has a thickness of less than about 60 µm.

Clause 29: In some examples of the optical film of any of the preceding clauses, the plurality of interference layers includes pluralities of alternating higher index first and lower index second layers.

Clause 30: In one example, an optical film including N sequentially numbered layers, N is an integer greater than 200 and less than 1000, each layer having an average thickness less than about 200 nm, a fitted curve being a best-fit regression applied to a layer thickness profile plotting a thickness of each layer as a function of layer number, where an average slope of the fitted curve in a region extending from the first layer to the Nth layer being less than about 0.2 nm/layer, such that for a substantially normally incident light in a predetermined wavelength range, the optical film has an average optical transmittance greater than about 85% for a first polarization state and an average optical reflectance greater than about 80% for an orthogonal second polarization state.

Clause 31: In one example, an optical film including N sequentially numbered layers, N is an integer greater than 200, with less than 10% of the layers having an average thickness more than about 200 nanometers (nm), a fitted curve being a best-fit regression applied to a layer thickness of the optical film as a function of layer number, an average slope of the fitted curve in a region extending from the first layer to the Nth layer being less than about 0.2 nm.

Clause 32: In some examples of the optical film of clause 31, where the average thickness of at least one numbered layer in the N sequentially numbered layers is at least 30% less than the average thickness of at least one other numbered layer in the N sequentially numbered layers.

Clause 33: In some examples of the optical film of clause 30 or 32, the best-fit regression is one or more of a best-fit linear regression, a best-fit non-linear regression, a best-fit polynomial regression, and a best-fit exponential regression.

Clause 34: In some examples of the optical film of any one of clauses 30 to 33, the optical film including at least one spacer layer disposed between two sequentially numbered layers in the N sequentially numbered layers, each spacer layer in the at least one spacer layer having an average thickness greater than about 500 nm.

Clause 35: In some examples of the optical film of any one of clauses 30 to 34, the optical film including at least one spacer layer disposed between two sequentially numbered layers in the N sequentially numbered layers, each spacer layer in the at least one spacer layer having an average thickness that is at least 10 times a largest wavelength in the predetermined wavelength range.

Clause 36: In some examples of the optical film of any one of clauses 30 to 35, the optical film including at least one spacer layer disposed between two sequentially numbered layers in the N sequentially numbered layers, each spacer layer in the at least one spacer layer having an average thickness that is at least 50 times a largest wavelength in the predetermined wavelength range.

Clause 37: In some examples of the optical film of any one of clauses 30 to 36, the average thickness of at least one layer in the N sequentially numbered layers is less than about 50 nm, and the average thickness of at least one other layer in the N sequentially numbered layers is greater than about 100 nm.

Clause 38: In some examples of the optical film of any one of clauses 30 to 37, the N sequentially numbered layers are sequentially arranged.

Clause 39: In some examples of the optical film of any one of clauses 30 to 38, the best-fit regression is one or more of a best-fit linear regression, a best-fit non-linear regression, a best-fit polynomial regression, and a best-fit exponential regression.

Clause 40: In some examples of the optical film of any one of clauses 30 to 39, the N sequentially numbered layers comprises pluralities of alternating higher index first and lower index second layers.

Clause 41: In one example, an optical film including a plurality of layers sequentially numbered from one to N, where N is an integer greater than 50 and less than 1000, the optical film transmitting at least 80% of light having a first polarization state in a predetermined wavelength range and reflecting at least 80% of light having an orthogonal second polarization state in the predetermined wavelength range, a fitted curve being a best-fit regression applied to a layer thickness of the optical film as a function of layer number, such that in a region extending from the first layer to the Nth layer, a difference between a maximum slope and a minimum slope of the fitted curve is less than about 0.70 nm/layer, where the maximum slope and the minimum slope are each evaluated over any group of 25 to 50 adjacent layers.

Clause 42: In some examples of the optical film of clause 41, each layer in the plurality of layers has an average thickness less than about 200 nm.

Clause 43: In some examples of the optical film of clause 41 or 42, the numbered layers in the plurality of layers are sequentially arranged.

Clause 44: In some examples of the optical film of any of clauses 41 to 43, an average slope of the fitted curve in a region extending from the first layer to the Nth layer being less than about 0.2 nm, such that for a substantially normally incident light in a predetermined wavelength range.

Clause 45: In some examples of the optical film of any of clauses 41 to 44, the best-fit regression is one or more of a best-fit linear regression, a best-fit non-linear regression, a best-fit polynomial regression, and a best-fit exponential regression.

Clause 46: In some examples of the optical film of any of clauses 41 to 45, the optical film including a spacer layer disposed between two sequentially numbered layers in the plurality of layers sequentially numbered from one to N, the spacer layer having an average thickness that is at least 10 times a largest wavelength in the predetermined wavelength range.

Clause 47: In some examples of the optical film of clause 46, the spacer layer having an average thickness that is at least 50 times a largest wavelength in the predetermined wavelength range.

Clause 48: In some examples of the optical film of any of clauses 41 to 47, the average thickness of at least one layer in the plurality of layers sequentially numbered from one to N is less than about 50 nm, and the average thickness of at least one other layer in the plurality of layers sequentially numbered from one to N is greater than about 100 nm.

Clause 49: In some examples of the optical film of any of clauses 41 to 48, the N sequentially numbered layers includes pluralities of alternating higher index first and lower index second layers.

Clause 50: In one example, an optical film transmitting at least 80% of light having a first polarization state in a predetermined wavelength range and reflecting at least 80% of light having an orthogonal second polarization state in the predetermined wavelength range, the optical film including a stack of N layers, where N is an integer greater than 50 and less than 1000, such that, for a plurality of non-overlapping groups of sequentially arranged layers in the stack of N layers, the layers in each group numbered from one to m, m greater than 25, for each non-overlapping group a fitted curve is a best-fit regression applied to a layer thickness of the group as a function of layer number, where in a region extending from the first layer in the group to the mth layer in the group, the fitted curve has an average slope such that, a maximum difference between the average slopes of the fitted curves in the plurality of non-overlapping groups is less than 0.70 nm/layer.

Clause 51: In some examples of the optical film of clause 51, the average thickness of at least one layer in the stack of N layers is at least 30% less than the average thickness of at least one other layer in the stack of N layers.

Clause 52: In some examples of the optical film of clause 51 or 52, the best-fit regression is one or more of a best-fit linear regression, a best-fit non-linear regression, a best-fit polynomial regression, and a best-fit exponential regression.

Clause 53: In some examples of the optical film of any of clauses 50 to 52, the average thickness of at least one layer in the stack of N layers is less than about 50 nm, and the average thickness of at least one other layer in the stack of N layers is greater than about 100 nm.

Clause 54: In one example, an optical film including a plurality of alternating first and second layers, each first layer and each second layer reflecting or transmitting light primarily by optical interference, a total number of each of the first and second layers being less than 400 and greater than 100, for each pair of adjacent first and second layers: in a plane of the first layer, the first layer has a maximum index of refraction $n1_x$ along an x-direction; the second layer has an index of refraction $n2_x$ along the x-direction; a difference between $n1_x$ and $n2_x$ is greater than about 0.24; and a maximum angular range of the x-directions of the first layers is less than about 2 degrees.

Clause 55: In some examples of the optical film of clause 54, the plurality of alternating first and second layers are sequentially arranged.

Clause 56: In some examples of the optical film of clause 54 or 55, the plurality of alternating first and second layers includes a total of N sequentially arranged layers, the optical film transmitting at least 80% of light having a first polarization state in a predetermined wavelength range and reflecting at least 80% of light having an orthogonal second polarization state in the predetermined wavelength range, a fitted curve being a best-fit regression applied to a layer thickness of the optical film as a function of layer number, such that in a region extending from a first layer to a Nth layer includes a slope less than about 0.2 nm/layer number.

Clause 57: In some examples of the optical film any of clauses 54 to 56, the best-fit regression is one or more of a best-fit linear regression, a best-fit non-linear regression, a best-fit polynomial regression, and a best-fit exponential regression.

Clause 58: In some examples of the optical film of any of clauses 54 to 57, each layer in the plurality of alternating first and second layers an average thickness per layer of less than about 200 nm.

Clause 59: In some examples of the optical film of any of clauses 54 to 58, the plurality of alternating first and second layers includes at least two stacks each including at least some of the plurality of alternating first and second layers, the optical film further including a spacer layer disposed between the two stacks, the spacer layer having an average thickness that is at least 10 times a largest wavelength in the predetermined wavelength range.

Clause 60: In some examples of the optical film of clause 59, the spacer layer having an average thickness that is at least 50 times a largest wavelength in the predetermined wavelength range.

Clause 61: In some examples of the optical film of any of clauses 54 to 60, the average thickness of at least one layer in the plurality of alternating first and second layers is less than about 50 nm, and the average thickness of at least one other layer in the plurality of alternating first and second layers is greater than about 100 nm.

Clause 62: In one example, an optical film including a plurality of alternating higher index of refraction and lower index of refraction interference layers, each interference layer reflecting or transmitting light primarily by optical interference, a total number of the interference layers greater than 300, an optical power of the optical film per interference layer greater than about 0.7.

Clause 63: In some examples of the optical film of clause 62, the total number of the higher index and lower index interferences layers is less than 1000.

Clause 64: In some examples of the optical film of clause 62 or 63, the higher index and lower index interference layers includes at least two stacks each including at least some of the higher index and lower index interference layers, the optical film further including a spacer layer disposed between the two stacks, the spacer layer having an average thickness that is at least 10 times a largest wavelength in a predetermined wavelength range.

Clause 65: In some examples of the optical film of any of clauses 62 to 64, the spacer layer having an average thickness that is at least 50 times a largest wavelength in the predetermined wavelength range.

Clause 66: In some examples of the optical film of any of clauses 62 to 65, the average thickness of at least one layer in the plurality of alternating higher index and lower index interference layers is less than about 50 nm, and the average thickness of at least one other layer in the plurality of alternating higher index and lower index interference layers is greater than about 100 nm.

Clause 67: In one example, an optical film including a plurality of alternating higher index of refraction and lower index of refraction interference layers, each interference layer reflecting or transmitting light primarily by optical interference, an optical power of the plurality of the interference layers per interference layer being greater than −0.0012*N+1.46, where N is a total number of the alternating higher index and lower index interference layers, N being greater than 100 and less than 1000.

Clause 68: In some examples of the optical film of clause 67, the total number of the higher index and lower index interferences layers is less than 1000.

Clause 69: In some examples of the optical film of clause 67 or 68, the higher index and lower index interference layers includes at least two stacks each including at least some of the higher index and lower index interference layers, the optical film further including a spacer layer disposed between the two stacks, the spacer layer having an average thickness that is at least 10 times a largest wavelength in a predetermined wavelength range.

Clause 70: In some examples of the optical film of clause 69, the spacer layer having an average thickness that is at least 50 times a largest wavelength in the predetermined wavelength range.

Clause 71: In some examples of the optical film of any of clauses 67 to 70, the average thickness of at least one layer in the plurality of alternating higher index and lower index interference layers is less than about 50 nm, and the average thickness of at least one other layer in the plurality of alternating higher index and lower index interference layers is greater than about 100 nm.

Clause 72: In one example, an optical film including a plurality of interference layers reflecting and transmitting light primarily by optical interference, such that for a substantially normally incident light in a predetermined wavelength range, the plurality of the interference layers transmit at least 80% of light having a first polarization state, reflect at least 80% of light having an orthogonal second polarization state, and have an average optical density greater than about 2.5, the plurality of the interference layers divided into a plurality of optical stacks, each pair of adjacent optical stacks separated by one or more spacer layers not reflecting or transmitting light primarily by optical interference, each optical stack transmitting at least 50% of light having the first polarization state in the predetermined wavelength range and reflecting at least 50% of light having the second polarization state in the predetermined wavelength range, the interference layers in each optical stack sequentially numbered, each optical stack having a best-fit linear equation correlating a thickness of the optical stack to interference layer number, the linear equation having an average slope in a region extending from the first interference layer in the stack to the last interference layer in the stack, a maximum difference between the average slopes of the linear equations of the plurality of optical stacks being less than about 20%.

Clause 73: In some examples of the optical film of clause 72, each optical stack includes at least 50 interference layers of the plurality of the interference layers.

Clause 74: In some examples of the optical film of clause 72 or 73, the optical film includes less than 1000 layers of the plurality of interference layers.

Clause 75: In some examples of the optical film of any of clauses 72 to 74, the one or more spacer layers having an average thickness that is at least 10 times a largest wavelength in a predetermined wavelength range.

Clause 76: In some examples of the optical film of any of clauses 72 to 75, the one or more spacer layers having an average thickness that is at least 50 times a largest wavelength in the predetermined wavelength range.

Clause 77: In some examples of the optical film of any of clauses 72 to 76, the average thickness of at least one layer in the plurality of interference layers is less than about 50 nm, and the average thickness of at least one other layer in the plurality of interference layers is greater than about 100 nm.

Clause 78: In one example, an optical film transmitting at least 80% of light having a first polarization state in a predetermined wavelength range and reflecting at least 80% of light having an orthogonal second polarization state in the predetermined wavelength range, the optical film including: no less than 100 and no greater than 400 sequentially arranged unit cells, each unit cell including a lower index or refraction first layer and an adjacent higher index of refraction second layer, a difference between the higher and lower indices of refraction for each unit cell greater than about 0.24, each unit cell having a total optical thickness equal to one half of a different central wavelength in a predetermined wavelength range, such that for each of at least 80% of pairs of adjacent unit cells in the sequentially arranged unit cells, a ratio of a difference of the central wavelengths of adjacent unit cells to an average of the central wavelengths of the adjacent unit cells is less than about 2%.

Clause 79: In some examples of the optical film of clause 78, the average thickness of at least one layer in the sequentially arranged unit cells is at least 30% less than the average thickness of at least one other layer in the sequentially arranged unit cells.

Clause 80: In some examples of the optical film of clause 78 or 79, the sequentially arranged unit cells includes a total of N sequentially arranged layers, each layer of the N sequentially arranged layers having an average thickness less than about 200 nm, a fitted curve being a best-fit regression applied to a layer thickness of the optical film as a function of layer number, an average slope of the fitted curve in a region extending from the first layer to the Nth layer being less than about 0.2 nm, such that for a substantially normally incident light in a predetermined wavelength range, the optical film has an average optical transmittance greater than about 80% for a first polarization state and an average optical reflectance greater than about 80% for an orthogonal second polarization state.

Clause 81: In some examples of the optical film of any of clauses 78 to 80, the best-fit regression is one or more of a best-fit linear regression, a best-fit non-linear regression, a best-fit polynomial regression, and a best-fit exponential regression.

Clause 82: In some examples of the optical film of any of clauses 78 to 81, the average thickness of at least one layer in the stack of N sequentially arranged layers is less than about 50 nm, and the average thickness of at least one other layer in the stack of N sequentially arranged layers is greater than about 100 nm.

Clause 83: In one example, an optical film including a plurality of interference layers reflecting or transmitting light primarily by optical interference in a predetermined wavelength range, a maximum difference between indices of refraction of the interference layers being $\Delta n$, a fitted curve being a best-fit regression applied to a layer thickness of the optical film as a function of layer number, the fitted curve having an average slope K in a region extending across the plurality of interference layers, $\Delta n/K$ greater than about 1.2.

Clause 84: In some examples of the optical film of clause 83, $\Delta n/K$ greater than about 1.5.

Clause 85: In some examples of the optical film of clause 83 or 84, having an optical density of greater than about 2.0 in the predetermined wavelength range.

Clause 86: In some examples of the optical film of any of clauses 83 to 85, having an optical density of greater than about 3.0 in the predetermined wavelength range.

Clause 87: In some examples of the optical film of any of clauses 83 to 86, having an optical density of greater than about 3.0 in the predetermined wavelength range.

Clause 88: In some examples of the optical film of any of clauses 83 to 87, $\Delta n$ is greater than about 0.24.

Clause 89: In some examples of the optical film of any of clauses 83 to 88, the plurality of interference layers includes a total of N sequentially arranged layers, N being less than 1000, each layer of the N sequentially arranged layers having an average thickness less than about 200 nm, a fitted curve being a best-fit regression applied to a layer thickness of the optical film as a function of layer number, an average slope of the fitted curve in a region extending from the first layer to the Nth layer being less than about 0.2 nm, such that for a substantially normally incident light in a predetermined wavelength range, the optical film has an average optical transmittance greater than about 80% for a first polarization state and an average optical reflectance greater than about 80% for an orthogonal second polarization state.

Clause 90: In some examples of the optical film of clause 89, the best-fit regression is one or more of a best-fit linear regression, a best-fit non-linear regression, a best-fit polynomial regression, and a best-fit exponential regression.

Clause 91: In some examples of the optical film of clause 89 or 90, where the average thickness of at least one layer in the N sequentially arranged layers is less than about 50 nm, and the average thickness of at least one other layer in the N sequentially arranged layers is greater than about 100 nm.

Clause 92: In some examples of the optical film of any of clauses 83 to 91, the optical film including a spacer layer disposed between two layers of the plurality of interference layers, the spacer layer having an average thickness that is at least 10 times a largest wavelength in the predetermined wavelength range.

Clause 93: In some examples of the optical film of clause 92, the spacer layer having an average thickness that is at least 50 times a largest wavelength in the predetermined wavelength range.

Clause 94: In one example, an optical film including $M_a$ sequentially arranged first unit cells optimized to transmit or reflect light in a first, but not second, predetermined wavelength range, each of the first unit cells including a first high index of refraction layer and a second low index of refraction layer; and $M_b$ sequentially arranged second unit cells optimized to transmit or reflect light in the second, but not the first, predetermined wavelength range, each of the second unit cells including a third high index of refraction layer and a fourth low index of refraction layer, such that: for the $M_a$ sequentially arranged first unit cells, a ratio of an average of indices of refraction of the first high index of refraction layers to an average of indices of refraction of the second low index of refraction layers times $M_a$ is greater than about 300; and for the $M_b$ sequentially arranged second unit cells show, a ratio of an average of indices of refraction of the third high index of refraction layers to an average of indices of refraction of the fourth low index of refraction layer times $M_b$ is greater than about 300, where for light incident on the optical film at any incidence angle from about zero degree to about 30 degrees having any wavelength in the first and second predetermined wavelength ranges, a ratio of an average optical transmittance $T_a$ of the optical film for a first polarization state to an average optical transmittance $T_b$ of the optical film for an orthogonal second polarization state is no less than about 1000:1.

Clause 95: In some examples of the optical film of clause 94, the first and second predetermined wavelength ranges are in respective visible and infrared ranges of an electromagnetic spectrum.

Clause 96: In some examples of the optical film of clause 94 or 95, the first predetermined wavelength range is from about 400 nm to about 700 nm.

Clause 97: In some examples of the optical film of any of clauses 94 to 96, the second predetermined wavelength range is from about 800 nm to about 1300 nm.

Clause 98: In some examples of the optical film of any of clauses 94 to 97, the $M_a$ sequentially arranged first unit cells and $M_b$ sequentially arranged second unit cells each includes less than about 400 total interference layers, each interference layer having an average thickness less than about 200 nm, a fitted curve being a best-fit regression applied to a layer thickness of the $M_a$ sequentially arranged first unit cells as a function of layer number, an average slope of the fitted curve in a region extending from the first interference layer to the ($2*M_a$) layer being less than about 0.2 nm/layer number, such that for a substantially normally incident light in the first predetermined wavelength range, the optical film has an average optical transmittance greater than about 80% for the first polarization state and an average optical reflectance greater than about 80% for the orthogonal second polarization state.

Clause 99: In some examples of the optical film of any of clauses 94 to 98, the best-fit regression is one or more of a best-fit linear regression, a best-fit non-linear regression, a best-fit polynomial regression, and a best-fit exponential regression.

Clause 100: In some examples of the optical film of any of clauses 94 to 99, where the average thickness of at least one interference layer in the $M_a$ sequentially arranged first unit cells is less than about 50 nm, and the average thickness of at least one other interference layer in the $M_a$ sequentially arranged first unit cells is greater than about 100 nm.

Clause 101: In some examples of the optical film of any of clauses 94 to 100, the optical film including a spacer layer disposed between the $M_a$ sequentially arranged first unit cells and the $M_b$ sequentially arranged second unit cells, the spacer layer having an average thickness that is at least 10 times a largest wavelength in the first and second predetermined wavelength ranges.

Clause 102: In some examples of the optical film of clause 101, the spacer layer having an average thickness that is at least 50 times a largest wavelength in the first and second predetermined wavelength ranges.

Clause 103: In some examples of the optical film of any of clauses 30 to 100, where, for a substantially normally incident light in a predetermined wavelength range, the optical film has an average optical transmittance $T_a$ and an average optical reflectance $R_a$ for a first polarization state, and an average optical transmittance $T_b$ and an average optical reflectance $R_b$ for an orthogonal second polarization state, $T_b/R_b$ less than about 0.002 and $R_a/T_a$ less than about 0.17.

Clause 104: In some examples of the optical film of clause 103, $T_a/T_b$ is greater than about 425.

Clause 105: In some examples of the optical film of clause 103 or 104, $R_b/R_a$ is greater than about 6.7.

Clause 106: In some examples of the optical film of any of clauses 103 to 105, the predetermined wavelength range is from about 400 nm to about 700 nm.

Clause 107: In some examples of the optical film of any of clauses 103 to 106, the predetermined wavelength range is from about 400 nm to about 700 nm and from about 800 nm to about 1300 nm.

Clause 108: In some examples of the optical film of any of clauses 103 to 107, the $T_a$ for the layers is greater than about 90% in the predetermined wavelength range.

Clause 109: In some examples of the optical film of any of clauses 103 to 108, the $T_a$ for the layers is greater than about 95% in the predetermined wavelength range.

Clause 110: In some examples of the optical film of any of clauses 103 to 109, the $T_a$ for the layers is greater than about 98% in the predetermined wavelength range.

Clause 111: In some examples of the optical film of any of clauses 103 to 110, the $T_b$ is less than about 0.15% in the predetermined wavelength range.

Clause 112: In some examples of the optical film of any of clauses 103 to 111, the $T_b$ is less than about 0.10% in the predetermined wavelength range.

Clause 113: In some examples of the optical film of any of clauses 103 to 112, such that for light incident on the optical film at an incidence angle of about 10 degrees in the predetermined wavelength range, the $T_a$ is greater than about 85%, the $R_b$ is greater than about 80%, and $T_b$ is less than about 0.2%.

Clause 114: In some examples of the optical film of any of clauses 103 to 113, such that for light incident on the optical film at an incidence angle of about 20 degrees in the predetermined wavelength range, the $T_a$ is greater than about 85%, the $R_b$ is greater than about 80%, and $T_b$ is less than about 0.2%.

Clause 115: In some examples of the optical film of any of clauses 103 to 114, such that for light incident on the optical film at an incidence angle of about 30 degrees in the predetermined wavelength range, the $T_a$ is greater than about 85%, the $R_b$ is greater than about 80%, and $T_b$ is less than about 0.2%.

Clause 116: In some examples of the optical film of any of clauses 30 to 115, the optical film has a thickness of less than about 60 μm.

Clause 117: In some examples of the optical film of any of clauses 30 to 116, the layers include pluralities of alternating higher index first and lower index second layers.

Clause 118: In some examples of the optical film of any of clauses 30 to 117, the total number of the layers is less than about 900.

Clause 119: In some examples of the optical film of any of clauses 30 to 118, the total number of the layers is less than about 800.

Clause 120: In some examples of the optical film of any of the proceeding clauses, the optical film has a contrast ratio of greater than 1000:1.

Clause 121: In some examples of the optical film of any of the proceeding clauses, the optical film has an optical density of greater than about 2.0 in the predetermined wavelength range.

Clause 122: In some examples of the optical film of any of the proceeding clauses, the optical film has an optical power per interference layer greater than about 0.7.

Clause 123: In some examples of the optical film of any of the proceeding clauses, the predetermined wavelength range includes three predetermined wavelength ranges from about 430 nm to about 465 nm, 490 nm to about 555 nm, and about 600 nm to about 665 nm.

Clause 124: In some examples of the optical film of any of the proceeding clauses, where the alternating higher index first and lower index second layers define a difference between indices of refraction greater than about 0.24 for an axis corresponding to the first polarization state.

Clause 125: In some examples of the optical film of clause 124, where a maximum difference between indices of refraction of the alternating higher index first and lower index second layers being $\Delta n$, a fitted curve being a best-fit regression applied to a layer thickness of the optical film as a function of layer number, the fitted curve having an average slope K in a region extending across the plurality of interference layers, $\Delta n/K$ greater than about 1.2.

Clause 126: In some examples of the optical film of clause 125, where $\Delta n/K$ greater than about 1.5.

Clause 127: In one example, a display assembly including a light source;
a liquid crystal display assembly; and the optical film of any of the proceeding clauses disposed between the liquid crystal display assembly and the light source.

Clause 128: In some examples of the display assembly of clause 127, the light source includes a light guide configured to direct light towards the optical film, where the liquid crystal display assembly includes: a liquid crystal layer; and an absorption polarizer, where the liquid crystal layer is disposed between the optical film and the absorption polarizer.

Clause 129: In some examples of the display assembly of clause 127 or 128, the display assembly does not include an absorption polarizer film between the liquid crystal layer and the optical film.

Clause 130: In some examples of the display assembly of clause 127 or 128, the display assembly further includes an absorption polarizer disposed between the liquid crystal layer and the optical film.

Clause 131: In one example, a display assembly including: a light source; a liquid crystal layer configured to be illuminated by the light source; one or more brightness enhancement films disposed between the light source and the liquid crystal layer for increasing an axial brightness of the display assembly; and a reflective polarizer disposed between the one or more brightness enhancement films and the liquid crystal layer and configured to substantially transmit light having a first polarization state and substantially reflect light having an orthogonal second polarization state, the reflective polarizer having an average optical transmittance less than about 0.2% for the second polarization state, where no absorbing polarizer is disposed between the light source and the liquid crystal layer, and where a contrast ratio of the display assembly is at least twice that of a comparative display assembly having the same construction except that the average transmittance of the reflective polarizer of the comparative display assembly for the second polarization state is greater than about 1.0%.

Clause 132: In some examples of the display assembly of clause 131, the reflective polarizer includes the optical film of any one of clauses 1 to 126.

Clause 133: In one example, a display assembly including a light source;
a liquid crystal layer configured to be illuminated by the light source; one or more brightness enhancement films disposed between the light source and the liquid crystal layer for increasing an axial brightness of the display assembly; and a reflective polarizer disposed between the one or more brightness enhancement films and the liquid crystal layer and including a plurality of interference layers transmitting or reflecting light primarily by optical interference, such that for a substantially normally incident light in a predetermined wavelength range, the plurality of the interference layers transmits at least 80% of light having a first polarization state and transmits less than about 0.2% of light having an orthogonal second polarization state, where no absorbing polarizer is disposed between the light source and the liquid crystal layer.

Clause 134: In some examples of the display assembly of clause 133, the reflective polarizer includes the optical film of any one of clauses 1 to 126.

Clause 135: In one example, an optical stack including a reflective polarizer including a plurality of interference layers, each interference layer reflecting or transmitting light primarily by optical interference, for a substantially normally incident light having a predetermined wavelength, the plurality of interference layers having an optical transmittance greater than about 85% for a first polarization state, an optical reflectance greater than about 80% for an orthogonal second polarization state, and an optical transmittance less than about 0.1% for the second polarization state; and an absorbing polarizer bonded to and substantially co-extensive with the reflective polarizer, for a substantially normally incident light having the predetermined wavelength, the absorbing polarizer having a first optical transmittance for the first polarization state, an optical absorption greater than about 50% for the second polarization state, and a second optical transmittance for the second polarization state, a ratio of the second optical transmittance to the first optical transmittance being greater than about 0.001.

Clause 136: In some examples of the optical stack of clause 135, the ratio of the second optical transmittance to the first optical transmittance is greater than about 0.01.

Clause 137: In some examples of the optical stack of clause 135 or 136, the ratio of the second optical transmittance to the first optical transmittance is greater than about 0.1.

Clause 138: In some examples of the optical stack of any one of clauses 135 to 137, the predetermined wavelength is about 550 nm.

Clause 139: In some examples of the optical stack of any one of clauses 135 to 138, the reflective polarizer includes the optical film of any one of clauses 1 to 126.

Clause 140: In one example, an optical system for displaying an object to a viewer centered on an optical axis and including: at least one optical lens having a non-zero optical power; a reflective polarizer disposed on and conforming to a first major surface of the optical lens, the reflective polarizer substantially transmitting light having a first polarization state and substantially reflecting light having an orthogonal second polarization state; and a partial reflector disposed on and conforming to a different second major surface of the optical lens, the partial reflector having an average optical reflectance of at least 30% for a predetermined wavelength range, such that an average optical transmittance of the optical system for an incident light along the optical axis having the second polarization state is less than about 0.1%.

Clause 141: In some examples of the optical system of clause 140, the reflective polarizer includes N sequentially numbered interference layers, where N is an integer greater than 50, each layer having an average thickness less than about 200 nm, a fitted curve being a best-fit regression applied to a layer thickness profile plotting a thickness of each layer as a function of layer number, where an average slope of the fitted curve in a region extending from the first layer to the Nth layer being less than about 0.2 nm/layer.

Clause 142: In some examples of the optical system of clause 140 or 141, the reflective polarizer includes the optical film of any one of clauses 1 to 126.

Clause 143: In some examples of the optical system of any of clauses 140 to 142, the first major surface of the at least one optical lens is curved along at least a first direction.

Clause 144: In some examples of the optical system of any of clauses 140 to 143, the second major surface of the at least one optical lens is curved along at least a first direction.

Clause 145: In some examples of the optical system of any of clauses 140 to 144, each of the first and second major surfaces is curved along two mutually orthogonal directions.

Clause 146: In one example, a polarizing beam splitter (PBS) including: a first and second prism; and a reflective polarizer disposed between and adhered to the first and second prisms, the reflective polarizer substantially reflecting polarized light having a first polarization state and substantially transmitting polarized light having an orthogonal second polarization state, such that when an incident light having a predetermined wavelength enters the PBS from an input side of the PBS and exits the PBS from an output side of the PBS after encountering the reflective polarizer at least once, a ratio of an average intensity of the exiting light to an average intensity of the incident light is: greater than about 90% when the incident light has the first polarization state, and less than about 0.2% when the incident light has the second polarization state.

Clause 147: In some examples of the PBS of clause 146, the reflective polarizer includes N sequentially numbered interference layers, where N is an integer greater than 50, each layer having an average thickness less than about 200 nm, a fitted curve being a best-fit regression applied to a layer thickness profile plotting a thickness of each layer as a function of layer number, where an average slope of the fitted curve in a region extending from the first layer to the Nth layer being less than about 0.2 nm/layer.

Clause 148: In some examples of the PBS of clause 146 or 147, the reflective polarizer includes the optical film of any one of clauses 1 to 126.

Clause 149: In some examples of the PBS of any one of clauses 146 to 148, at least one of the first and second prisms is polymeric.

Clause 150: In some examples of the PBS of any one of clauses 146 to 149, the pre-determined wavelength is in a range from about 400 nm to about 700 nm.

Clause 151: In one example, a liquid crystal display projection system including the optical film of any one of clauses 1 to 126.

Clause 152: In some examples of the liquid crystal display projection system of clause 151, the system including one or more light wave retarder layers positioned next to the optical film, the one or more light wave retarder layers configured to modify a polarization state of incident light.

Clause 153: In some examples of the liquid crystal display projection system of clause 152, at least one of the light wave retarder layers is optically coupled directly to the optical film.

Clause 154: In some examples of the liquid crystal display projection system of clause 152 or 153, at least one of the light wave retarder layers is spaced apart from the optical film.

Clause 155: In one example, a display assembly including: a light source; a liquid crystal layer configured to be illuminated by the light source; and a reflective polarizer including the optical film of any one of clauses 1 to 126, the reflective polarizer disposed adjacent to the liquid crystal layer.

Clause 156: In one example, an optical film comprising a plurality of interference layers, each interference layer reflecting or transmitting light primarily by optical interference, a total number of the interference layers less than about 800, such that for a substantially normally incident light in a predetermined wavelength range, the plurality of interference layers has an average optical transmittance greater than about 85% for a first polarization state, an average optical reflectance greater than about 80% for an orthogonal second polarization state, and an average optical transmittance less than about 0.2% for the second polarization state.

Clause 157: In some examples of the optical film of clause 156, the optical film further comprising at least one noninterference layer disposed between two interference layers, each of the at least one noninterference layer not reflecting or transmitting light primarily by optical interference.

Clause 158: In some examples of the optical film of clause 157, an average thickness of each of the at least one noninterference layer is at least 10 times a largest wavelength in the predetermined wavelength range.

Clause 159: In some examples of the optical film of clause 157, an average thickness of each of the at least one noninterference layer is at least 50 times a largest wavelength in the predetermined wavelength range.

Clause 160: In some examples of the optical film of clause 156, the predetermined wavelength range is from about 400 nm to about 700 nm.

Clause 161: In some examples of the optical film of clause 156, the predetermined wavelength range is from about 400 nm to about 700 nm and from about 800 nm to about 1300 nm.

Clause 162: In some examples of the optical film of clause 156, the plurality of interference layers comprises pluralities of alternating higher index first and lower index second layers.

Clause 163: In some examples of the optical film of clause 156, the plurality of interference layers has an average optical transmittance greater than about 90% for the first polarization state in the predetermined wavelength range.

Clause 164: In some examples of the optical film of clause 156, the plurality of interference layers has an average optical transmittance greater than about 95% for the first polarization state in the predetermined wavelength range.

Clause 165: In some examples of the optical film of clause 156, the plurality of interference layers has an average optical transmittance greater than about 98% for the first polarization state in the predetermined wavelength range.

Clause 166: In some examples of the optical film of clause 156, the plurality of interference layers has an average optical transmittance less than about 0.15% for the second polarization state in the predetermined wavelength range.

Clause 167: In some examples of the optical film of clause 156, the plurality of interference layers has an average optical transmittance less than about 0.10% for the second polarization state in the predetermined wavelength range.

Clause 168: In some examples of the optical film of clause 156, the optical film such that for light incident on the optical film at an incidence angle of about 10 degrees in the predetermined wavelength range, the plurality of interference layers has an average optical transmittance greater than about 85% for the first polarization state, an average optical reflectance greater than about 80% for the second polarization state, and an average optical transmittance less than about 0.2% for the second polarization state.

Clause 169: In some examples of the optical film of clause 156, the optical film such that for light incident on the optical film at an incidence angle of about 20 degrees in the predetermined wavelength range, the plurality of interference layers has an average optical transmittance greater than about 85% for the first polarization state, an average optical reflectance greater than about 80% for the second polarization state, and an average optical transmittance less than about 0.2% for the second polarization state.

Clause 170: In some examples of the optical film of clause 156, the optical film such that for light incident on the optical film at an incidence angle of about 30 degrees in the predetermined wavelength range, the plurality of interference layers has an average optical transmittance greater than about 85% for the first polarization state, an average optical reflectance greater than about 80% for the second polarization state, and an average optical transmittance less than about 0.2% for the second polarization state.

Clause 171: In one example, an optical film comprising a plurality of interference layers, each interference layer reflecting or transmitting light primarily by optical interference, a total number of the interference layers less than about 800, such that for a substantially normally incident light in a predetermined wavelength range, the optical film has an average optical transmittance $T_a$ and an average optical reflectance $R_a$ for a first polarization state, and an average optical transmittance $T_b$ and an average optical reflectance $R_b$ for an orthogonal second polarization state, $T_b/R_b$ less than about 0.002 and $R_a/T_a$ less than about 0.17.

Clause 172: In some examples of the optical film of clause 171, the plurality of interference layers are sequentially arranged.

Clause 173: In some examples of the optical film of clause 171, the optical film further comprising at least one noninterference layer disposed between two interference layers in the plurality of interference layers, each of the at least one noninterference layer not reflecting or transmitting light primarily by optical interference.

Clause 174: In some examples of the optical film of clause 171, $T_a/T_b$ is greater than about 425.

Clause 175: In some examples of the optical film of clause 171, $R_b/R_a$ is greater than about 6.7.

Clause 176: In one example, an optical film comprising N sequentially numbered layers, N an integer greater than 200 and less than 800, each layer having an average thickness less than about 200 nm, a fitted curve being a best-fit regression applied to a thickness of the optical film as a function of layer number, an average slope of the fitted curve in a region extending from the first layer to the Nth layer being less than about 0.2 nm, such that for a substantially normally incident light in a predetermined wavelength range, the optical film has an average optical transmittance greater than about 85% for a first polarization state and an average optical reflectance greater than about 80% for an orthogonal second polarization state.

Clause 177: In some examples of the optical film of clause 176, the N sequentially numbered layers are sequentially arranged.

Clause 178: In some examples of the optical film of clause 176, the best-fit regression is one or more of a best-fit linear regression, a best-fit non-linear regression, a best-fit polynomial regression, and a best-fit exponential regression.

Clause 179: In some examples of the optical film of clause 176, the optical film further comprising a spacer layer disposed between two sequentially numbered layers in the N sequentially numbered layers, the spacer layer having an average thickness that is at least 10 times a largest wavelength in the predetermined wavelength range.

Clause 180: In some examples of the optical film of clause 176, the average thickness of at least one layer in the N sequentially numbered layers is less than about 50 nm, and the average thickness of at least one other layer in the N sequentially numbered layers is greater than about 100 nm.

Clause 181: In one example, an optical film comprising N sequentially numbered layers, N an integer greater than 200, each layer having an average thickness less than about 200 nm, a fitted curve being a best-fit regression applied to a thickness of the optical film as a function of layer number, an average slope of the fitted curve in a region extending from the first layer to the Nth layer being less than about 0.2 nm.

Clause 182: In some examples of the optical film of clause 181, the optical film further comprising at least one spacer layer disposed between two sequentially numbered layers in the N sequentially numbered layers, each spacer layer in the at least one spacer layer having an average thickness greater than about 500 nm.

Clause 183: In some examples of the optical film of clause 181, the N sequentially numbered layers are sequentially arranged.

Clause 184: In some examples of the optical film of clause 181, the average thickness of at least one numbered layer in the N sequentially numbered layers is at least 30% less than the average thickness of at least one other numbered layer in the N sequentially numbered layers.

Clause 185: In one example, an optical film comprising a plurality of layers sequentially numbered from one to N, N an integer greater than 50 and less than 800, the optical film transmitting at least 80% of light having a first polarization state in a predetermined wavelength range and reflecting at least 80% of light having an orthogonal second polarization state in the predetermined wavelength range, a fitted curve being a best-fit regression applied to a thickness of the optical film as a function of layer number, such that in a region extending from the first layer to the Nth layer, a difference between a maximum slope and a minimum slope of the fitted curve is less than about 0.70 nm/layer.

Clause 186: In some examples of the optical film of clause 185, each layer in the plurality of layers has an average thickness less than about 200 nm.

Clause 187: In some examples of the optical film of clause 181, the numbered layers in the plurality of layers are sequentially arranged.

Clause 188: In one example, an optical film transmitting at least 80% of light having a first polarization state in a predetermined wavelength range and reflecting at least 80% of light having an orthogonal second polarization state in the predetermined wavelength range, the optical film comprising a stack of N layers, N an integer greater than 50 and less than 800, such that, for a plurality of non-overlapping groups of sequentially arranged layers in the stack of N layers, the layers in each group numbered from one to m, m greater than N/10, for each group: a fitted curve is a best-fit regression applied to a thickness of the group as a function of layer number; and in a region extending from the first layer in the group to the mth layer in the group, the fitted curve has an average slope, such that, a maximum difference between the average slopes of the fitted curves in the plurality of non-overlapping groups is less than 0.70 nm/layer.

Clause 189: In one example, an optical film comprising a plurality of alternating first and second layers, each first layer and each second layer reflecting or transmitting light primarily by optical interference, a total number of each of the first and second layers being less than 400 and greater than 100, for each pair of adjacent first and second layers: in a plane of the first layer, the first layer has a maximum index of refraction $n1_x$ along an x-direction; the second layer has an index of refraction $n2_x$ along the x-direction; a difference between $n1_x$ and $n2_x$ is greater than about 0.24; and a maximum angular range of the x-directions of the first layers is less than about 2 degrees.

Clause 190: In some examples of the optical film of clause 189, the plurality of alternating first and second layers are sequentially arranged.

Clause 191: In one example, an optical film comprising a plurality of alternating higher index and lower index interference layers, each interference layer reflecting or transmitting light primarily by optical interference, a total number of the layers greater than 300, an optical power of the optical film per interference layer greater than about 0.7.

Clause 192: In some examples of the optical film of clause 191, the total number of the interferences layers is less than 800.

Clause 193: In one example, an optical film comprising a plurality of alternating higher index and lower index interference layers, each interference layer reflecting or transmitting light primarily by optical interference, an optical power of the plurality of the interference layers per interference layer being greater than −0.0012*N+1.5, where N is a total number of the interference layers, N being greater than 100 and less than 1000.

Clause 194: In one example, an optical film comprising a plurality of interference layers reflecting and transmitting light primarily by optical interference, such that for a substantially normally incident light in a predetermined wavelength range, the plurality of the interference layers transmit at least 80% of light having a first polarization state, reflect at least 80% of light having an orthogonal second polarization state, and have an average optical density greater than about 2.5, the plurality of the interference layers divided into a plurality of optical stacks, each pair of adjacent optical stacks separated by one or more spacer layers not reflecting or transmitting light primarily by optical interference, each optical stack transmitting at least 50% of light having the first polarization state in the predetermined wavelength range and reflecting at least 50% of light having the second polarization state in the predetermined wavelength range, the interference layers in each optical stack sequentially numbered, each optical stack having a best-fit linear equation correlating a thickness of the optical stack to interference layer number, the linear equation having an average slope in a region extending from the first interference layer in the stack to the last interference layer in the stack, a maximum difference between the average slopes of the linear equations of the plurality of optical stacks being less than about 20%.

Clause 195: In some examples of the optical film of clause 194, each optical stack includes at least 50 interference layers of the plurality of the interference layers.

Clause 196: In one example, a display system comprising: a light source; a liquid crystal layer configured to be illuminated by the light source; one or more brightness enhancement films disposed between the light source and the liquid crystal layer for increasing an axial brightness of the display system; and a reflective polarizer disposed between the one or more brightness enhancement films and the liquid crystal layer and configured to substantially transmit light having a first polarization state and substantially reflect light having an orthogonal second polarization stated, the reflective polarizer having an average optical transmittance less than about 0.2% for the second polarization state, wherein no absorbing polarizer is disposed between the light source and the liquid crystal layer, and wherein a contrast ratio of the display system is at least twice that of a comparative display system having the same construction except that the average transmittance of the reflective polarizer of the comparative display system for the second polarization state is greater than about 1.0%.

Clause 197: In one example, a display system comprising: a light source; a liquid crystal layer configured to be illuminated by the light source; one or more brightness enhancement films disposed between the light source and the liquid crystal layer for increasing an axial brightness of the display system; and a reflective polarizer disposed between the one or more brightness enhancement films and the liquid crystal layer and comprising a plurality of interference layers transmitting or reflecting light primarily by optical interference, such that for a substantially normally incident light in a predetermined wavelength range, the plurality of the interference layers transmits at least 80% of light having a first polarization state and transmits less than about 0.2% of light having an orthogonal second polarization state, wherein no absorbing polarizer is disposed between the light source and the liquid crystal layer.

Clause 198: In one example, an optical film transmitting at least 80% of light having a first polarization state in a predetermined wavelength range and reflecting at least 80% of light having an orthogonal second polarization state in the predetermined wavelength range, the optical film comprising no less than 200 and no greater than 400 sequentially arranged unit cells, each unit cell comprising a lower index first layer and an adjacent higher index second layer, a difference between the higher and lower indices for each unit cell greater than about 0.24, each unit cell having a total optical thickness equal to one half of a different central wavelength in the predetermined wavelength range, such that for each of at least 80% of pairs of adjacent unit cells in the sequentially arranged unit cells, a ratio of a difference of the central wavelengths of the unit cells to an average of the central wavelengths of the unit cells is less than about 2%.

Clause 199: In one example, an optical film comprising a plurality of interference layers reflecting or transmitting light primarily by optical interference in a predetermined wavelength range, a maximum difference between indices of refraction of the interference layers being Δn, a fitted curve being a best-fit regression applied to a thickness of the optical film as a function of layer number, the fitted curve having an average slope K in a region extending across the plurality of interference layers, Δn/K greater than about 1.2.

Clause 200: In some examples of the optical film of clause 199, Δn/K is greater than about 1.5.

Clause 201: In some examples of the optical film of clause 199, the optical film having an optical density of greater than about 2.0 in the predetermined wavelength range.

Clause 202: In some examples of the optical film of clause 199, the optical film having an optical density of greater than about 3.0 in the predetermined wavelength range.

Clause 203: In one example, an optical film comprising M sequentially arranged first unit cells optimized to transmit or reflect light in a first, but not second, predetermined wavelength range, and N sequentially arranged second unit cells optimized to transmit or reflect light in the second, but not the first, predetermined wavelength range, each first and second unit cell comprising a lower index layer and an adjacent higher index layer, such that: for the M sequentially arranged first unit cells, a ratio of an average of indices of refraction of the first layers to an average of indices of refraction of the second layers times M is greater than about 300; and for the N sequentially arranged second unit cells, a ratio of an average of indices of refraction of the first layers to an average of indices of refraction of the second layer times N is greater than about 300, wherein for light incident on the optical film at any incidence angle from about zero degree to about 30 degrees having any wavelength in the first and second predetermined wavelength ranges, a ratio of an average optical transmittance $T_a$ of the optical film for a first polarization state to an average optical transmittance $T_b$ of the optical film for an orthogonal second polarization state is no less than about 1000, Clause 204: In some examples of the optical film of clause 203, the first and second predetermined wavelength ranges are in respective visible and infrared ranges of an electromagnetic spectrum.

Clause 205: In one example, a polarizing beam splitter (PBS) comprising a reflective polarizer disposed between and adhered to first and second prisms, the reflective polarizer substantially reflecting polarized light having a first polarization state and substantially transmitting polarized light having an opposite second polarization state, such that when an incident light having a pre-determined wavelength enters the PBS from an input side of the PBS and exits the PBS from an output side of the PBS after encountering the reflective polarizer at least once, a ratio of an average intensity of the exiting light to an average intensity of the incident light is: greater than about 90% when the incident light has the first polarization state; and less than about 0.2% when the incident light has the second polarization state.

Clause 206: In some examples of the PBS of clause 205, at least one of the first and second prisms is polymeric.

Clause 207: In some examples of the PBS of clause 205, the reflective polarizer comprises N sequentially numbered layers, N an integer greater than 50, each layer having an average thickness less than about 200 nm, a fitted curve being a best-fit regression applied to a thickness of the optical film as a function of layer number, an average slope of the fitted curve in a region extending from the first layer to the Nth layer being less than about 0.2 nm.

Clause 208: In some examples of the PBS of clause 205, the pre-determined wavelength is in a range from about 400 nm to about 700 nm.

Clause 209: In some examples of the PBS of clause 205, the reflective polarizer comprises an optical film as described in any of the preceding clauses.

Clause 210: In one example, an optical system for displaying an object to a viewer centered on an optical axis and comprising: one or more optical lenses having a non-zero optical power; a reflective polarizer disposed on and conforming to a first surface of the one or more optical lenses, the reflective polarizer substantially transmitting light having a first polarization state and substantially reflecting light having an orthogonal second polarization state; and a partial reflector disposed on and conforming to a different second surface of the one or more optical lenses, the partial reflector having an average optical reflectance of at least 30% for a predetermined wavelength range, such that an average optical transmittance of the optical system for an incident light along the optical axis having the second polarization state is less than about 0.1%.

Clause 211: In some examples of the optical system of clause 210, the reflective polarizer comprises N sequentially numbered layers, N an integer greater than 50, each layer having an average thickness less than about 200 nm, a fitted curve being a best-fit regression applied to a thickness of the optical film as a function of layer number, an average slope of the fitted curve in a region extending from the first layer to the Nth layer being less than about 0.2 nm.

Clause 212: In some examples of the optical system of clause 210, the first surface of the one or more optical lenses is curved along at least a first direction.

Clause 213: In some examples of the optical system of clause 210, the second surface of the one or more optical lenses is curved along at least a first direction.

Clause 214: In some examples of the optical system of clause 210, each of the first and second surfaces is curved along two mutually orthogonal directions.

Clause 215: In some examples of the optical system of clause 210, the reflective polarizer comprises an optical film as described in any of the preceding clauses.

Clause 216: In one example, an optical stack comprising: a reflective polarizer comprising a plurality of interference layers, each interference layer reflecting or transmitting light primarily by optical interference, for a substantially normally incident light having a predetermined wavelength, the plurality of interference layers having an optical transmittance greater than about 85% for a first polarization state, an optical reflectance greater than about 80% for an orthogonal second polarization state, and an optical transmittance less than about 0.1% for the second polarization state; and an absorbing polarizer bonded to and substantially co-extensive with the reflective polarizer, for a substantially normally incident light having the predetermined wavelength, the absorbing polarizer having a first optical transmittance for the first polarization state, an optical absorption greater than about 50% for the second polarization state, and a second optical transmittance for the second polarization state, a ratio of the second optical transmittance to the first optical transmittance being greater than about 0.001.

Clause 217: In some examples of the optical stack of clause 216, the predetermined wavelength is about 550 nm.

Clause 218: In some examples of the optical film of any one of the above clauses, the predetermined wavelength range of the optical film is from about 430 nm to about 465 nm, 490 nm to about 555 nm, and about 600 nm to about 665 nm.

Clause 219: In some examples of the optical film of any one of the above clauses, the predetermined wavelength range of the optical film is from about 400 nm to about 430 nm, 450 nm to about 500 nm, and about 550 nm to about 600 nm.

Various examples have been described. These and other examples are within the scope of the following claims.

What is claimed is:

1. An optical film comprising:
a plurality of layers sequentially numbered from one to N, wherein N is an integer greater than 50 and less than 1000, the optical film transmitting at least 80% of light having a first polarization state in a predetermined wavelength range and reflecting at least 80% of light having an orthogonal second polarization state in the predetermined wavelength range, a fitted curve being a best-fit regression applied to a layer thickness of the optical film as a function of layer number, such that in a region extending from the first layer to the Nth layer, a difference between a maximum slope and a minimum slope of the fitted curve is less than about 0.70 nm/layer, wherein the maximum slope and the minimum slope are each evaluated over any group of 25 to 50 adjacent layers.

2. The optical film of claim 1, wherein each layer in the plurality of layers has an average thickness less than about 200 nm.

3. The optical film of claim 1, an average slope of the fitted curve in a region extending from the first layer to the Nth layer is less than about 0.2 nm/layer.

4. The optical film of claim 1, wherein the average thickness of at least one layer in the plurality of layers sequentially numbered from one to N is less than about 50 nm, and the average thickness of at least one other layer in the plurality of layers sequentially numbered from one to N is greater than about 100 nm.

5. The optical film of claim 1, wherein, for a substantially normally incident light in a predetermined wavelength range, the optical film has an average optical transmittance Ta and an average optical reflectance Ra for the first polarization state, and an average optical transmittance Tb and an average optical reflectance Rb for the orthogonal second polarization state, Tb/Rb less than about 0.002 and Ra/Ta less than about 0.17.

6. The optical film of claim 1, wherein the predetermined wavelength range is from about 400 nm to about 700 nm.

7. The optical film of claim 1, wherein the predetermined wavelength range is from about 400 nm to about 700 nm and from about 800 nm to about 1300 nm.

8. The optical film of claim 1, wherein the optical film has a thickness of less than about 60 μm.

9. The optical film of claim 1, wherein the plurality of layers comprises a plurality of alternating higher index first and lower index second layers, each first layer comprising polyethylene naphthalate polymer or a copolymer of polyethylene naphthalate and polyethylene terephthalate.

10. An optical film transmitting at least 80% of light having a first polarization state in a predetermined wavelength range and reflecting at least 80% of light having an orthogonal second polarization state in the predetermined wavelength range, the optical film comprising:
a stack of N layers, wherein N is an integer greater than 50 and less than 1000, such that, for a plurality of non-overlapping groups of sequentially arranged layers in the stack of N layers, the layers in each group numbered from one to m, m greater than 25, for each non-overlapping group a fitted curve is a best-fit regression applied to a layer thickness of the group as a function of layer number, wherein in a region extending from the first layer in the group to the mth layer in the group, the fitted curve has an average slope such that, a maximum difference between the average slopes of the fitted curves in the plurality of non-overlapping groups is less than 0.70 nm/layer.

11. The optical film of claim 10, wherein the average thickness of at least one layer in the stack of N layers is less than about 50 nm, and the average thickness of at least one other layer in the stack of N layers is greater than about 100 nm.

12. The optical film of claim 10, wherein, for a substantially normally incident light in a predetermined wavelength range, the optical film has an average optical transmittance Ta and an average optical reflectance Ra for a first polarization state, and an average optical transmittance Tb and an average optical reflectance Rb for an orthogonal second polarization state, Tb/Rb less than about 0.002 and Ra/Ta less than about 0.17.

13. The optical film of claim 10, wherein the optical film has a thickness of less than about 60 μm.

14. The optical film of claim 10, wherein the stack of N layers comprises a plurality of alternating higher index first and lower index second layers, each first layer comprising polyethylene naphthalate polymer or a copolymer of polyethylene naphthalate and polyethylene terephthalate.

* * * * *